(12) United States Patent
Ito et al.

(10) Patent No.: US 8,987,157 B2
(45) Date of Patent: Mar. 24, 2015

(54) SINTERED ZIRCONIA, AND COMPOSITION FOR SINTERING AND CALCINED BODY THEREFOR

(75) Inventors: Yoshihisa Ito, Aichi (JP); Shinji Kato, Aichi (JP)

(73) Assignee: Noritake Co., Limited, Aichi (JP)

( * ) Notice: Subject to any disclaimer, the term of this patent is extended or adjusted under 35 U.S.C. 154(b) by 35 days.

(21) Appl. No.: 13/817,951

(22) PCT Filed: Aug. 19, 2011

(86) PCT No.: PCT/JP2011/068745
§ 371 (c)(1),
(2), (4) Date: Apr. 10, 2013

(87) PCT Pub. No.: WO2012/023601
PCT Pub. Date: Feb. 23, 2012

(65) Prior Publication Data
US 2013/0190164 A1   Jul. 25, 2013

(30) Foreign Application Priority Data
Aug. 20, 2010  (JP) ................................ 2010-185586

(51) Int. Cl.
*C04B 35/48* (2006.01)
*C04B 35/49* (2006.01)
(Continued)

(52) U.S. Cl.
CPC .............. *C01G 25/02* (2013.01); *C04B 35/481* (2013.01); *C04B 35/486* (2013.01);
(Continued)

(58) Field of Classification Search
CPC .... C04B 35/447; C04B 35/486; C04B 35/48; C04B 35/484; C04B 35/119
USPC .................................. 501/102, 103, 104, 105
See application file for complete search history.

(56) References Cited

U.S. PATENT DOCUMENTS

| 4,525,464 | A |   | 6/1985 | Claussen et al. |           |
|-----------|---|---|--------|-----------------|-----------|
| 5,023,218 | A | * | 6/1991 | Zanoli et al.   | ... 501/105 |

(Continued)

FOREIGN PATENT DOCUMENTS

| CN | 1103283 A  | 6/1995 |
|----|------------|--------|
| DE | 4403161 A1 | 8/1994 |

(Continued)

OTHER PUBLICATIONS

International Search Report (PCT/ISA/210) issued on Nov. 22, 2011, by the Japanese Patent Office as the International Searching Authority for International Application No. PCT/JP2011/068745.

(Continued)

*Primary Examiner* — Noah Wiese
(74) *Attorney, Agent, or Firm* — Buchanan, Ingersoll & Rooney PC

(57) ABSTRACT

A sintering composition and calcined object which are precursors for a sintered zirconia. The burned surface of the sintered zirconia gives an X-ray diffraction pattern in which the ratio of the height of the peak present around the location where a [200] peak assigned to the cubic system is to appear to the height of the peak present around the location where a [200] peak assigned to the tetragonal system is to appear is 0.4 or more, and a region located at a depth of 100 μm or more from the burned surface gives an X-ray diffraction pattern in which the ratio of the height of the peak present around the location where a [200] peak assigned to the cubic system is to appear to the height of the peak present around the location where a [200] peak assigned to the tetragonal system is to appear is 0.3 or less.

20 Claims, 34 Drawing Sheets

(51) Int. Cl.
*C01G 25/02* (2006.01)
*C04B 35/486* (2006.01)
*C04B 35/488* (2006.01)
*C04B 35/645* (2006.01)

(52) U.S. Cl.
CPC ........ *C04B 35/4885* (2013.01); *C04B 35/6455* (2013.01); *C04B 2235/3246* (2013.01); *C04B 2235/762* (2013.01); *C04B 2235/765* (2013.01); *C04B 2235/3206* (2013.01); *C04B 2235/3208* (2013.01); *C04B 2235/3217* (2013.01); *C04B 2235/3222* (2013.01); *C04B 2235/3409* (2013.01); *C04B 2235/3418* (2013.01); *C04B 2235/3463* (2013.01); *C04B 2235/3821* (2013.01); *C04B 2235/386* (2013.01); *C04B 2235/3873* (2013.01); *C04B 2235/428* (2013.01); *C04B 2235/441* (2013.01); *C04B 2235/447* (2013.01); *C04B 2235/72* (2013.01); *C04B 2235/727* (2013.01); *C04B 2235/96* (2013.01); *C04B 2235/42* (2013.01); *C04B 2235/656* (2013.01); *C04B 2235/662* (2013.01); *C04B 2235/75* (2013.01); *C04B 2235/785* (2013.01); *C04B 2235/9669* (2013.01)
USPC .......................... 501/103; 501/104; 501/105

(56) References Cited

U.S. PATENT DOCUMENTS

| | | | |
|---|---|---|---|
| 5,086,020 | A | 2/1992 | Ishino et al. |
| 5,306,673 | A | 4/1994 | Hermansson et al. |
| 5,344,801 | A | 9/1994 | Kida et al. |
| 5,466,643 | A | 11/1995 | Ishino et al. |
| 5,827,572 | A | 10/1998 | Song et al. |
| 5,849,068 | A | 12/1998 | Hofmann et al. |
| 5,916,498 | A | 6/1999 | Hofmann et al. |
| 6,121,177 | A * | 9/2000 | Guigonis et al. .............. 501/105 |
| 6,126,732 | A | 10/2000 | Hofmann et al. |
| 7,871,950 | B2 | 1/2011 | Nakasuga et al. |
| 2010/0240519 | A1 | 9/2010 | Nakasuga et al. |
| 2012/0046156 | A1 | 2/2012 | Gaubil et al. |
| 2012/0214661 | A1 | 8/2012 | Ito et al. |

FOREIGN PATENT DOCUMENTS

| | | |
|---|---|---|
| EP | 0403387 A1 | 12/1990 |
| EP | 0431445 A1 | 6/1991 |
| EP | 0 631 995 A1 | 1/1995 |
| JP | 60-108366 A | 6/1985 |
| JP | 01-115360 A | 5/1989 |
| JP | 02-255570 A | 10/1990 |
| JP | 3-115166 A | 5/1991 |
| JP | 03-237059 A | 10/1991 |
| JP | 04-504403 A | 8/1992 |
| JP | 6-092728 A | 4/1994 |
| JP | 06-128031 A | 5/1994 |
| JP | 6-239662 A | 8/1994 |
| JP | 7-215758 A | 8/1995 |
| JP | 8-033701 A | 2/1996 |
| JP | 09-194257 A | 7/1997 |
| JP | 9-227228 A | 9/1997 |
| JP | 2001-080962 A | 3/2001 |
| JP | 2003-323903 A | 11/2003 |
| JP | 2004-075532 A | 3/2004 |
| JP | 2006-315912 A | 11/2006 |
| JP | 2007-332026 A | 12/2007 |
| JP | 2009-023850 A | 2/2009 |
| WO | WO 2007/108416 A1 | 9/2007 |
| WO | WO 2010/097769 A1 | 9/2010 |
| WO | WO 2011/021698 A1 | 2/2011 |

OTHER PUBLICATIONS

Written Opinion (PCT/ISA/237) issued on Nov. 22, 2011, by the Japanese Patent Office as the International Searching Authority for International Application No. PCT/JP2011/068745.
International Report on Patentability (PCT/IPEA/409) issued on Dec. 25, 2012, by the Japanese Patent Office as the International Searching Authority for International Application No. PCT/JP2011/068745.
Yamamoto et al., "Improvement of heat resistance degradation by surface improvement of Y-TZP", Zirconia ceramics 13 and 14, 1998 (month unknown), pp. 147-163 (English abstract enclosed).
Japanese Office Action dated Feb. 4, 2014, issued by the Japanese Patent Office in corresponding Japanese Patent Application No. 2010-185586, and English language translation of Office Action. (6 pages).
Written Opinion (Form PCT/ISA/237) issued on Nov. 15, 2010, by Japanese Patent Office as the International Searching Authority for international Application No. PCT/JP2010/064111. (6 pages).
International Search Report (Form PCT/ISA/210) issued on Nov. 30, 2010, by Japanese Patent Office as the International Searching Authority for international Application No. PCT/JP2010/064111. (3 pages).
Notification of Transmittal of Copies of Translation of the International Preliminary Report on Patentability (Form PCT/IB/338 and PCT/IB/373) and the Written Opinion of the International Searching Authority (Form PCT/ISA/237) issued on Mar. 22, 2012, by the International Bureau of WIPO for International Application No. PCT/JP2010/064111. (10 pages).
Extended European Search Report dated May 7, 2013, issued by the European Patent Office in the European Application No. 10810039.7. (6 pages).
Office Action (Notice of the Grounds for Rejection) dated May 21, 2013, issued in corresponding Japanese Patent Application No. 2010-044967, and an English Translation of the Office Action. (6 pages).
Cosentino et al., "The Effect of Bismuth Oxide Addition on the Electrical Properties of Zirconia-Magnesia Solid Electrolytes" Journal of Materials Science Letters, (1993), vol. 12, pp. 1022-1024.
Office Action (1st Notice of Grounds for Rejection) dated Jun. 4, 2013, issued in Chinese Patent Application No. 201080037193.8, and an English Translation of the Office Action. (10 pages).
English-language Translation of International Report on Patentability (PCT/IPEA/409) issued on Dec. 25, 2012, by the Japanese Patent Office as the International Searching Authority for International Application No. PCT/JP2011/068745.
Juan Liu et al: "The hindering function of phosphate on the grain growth behavior of nanosized zirconia powders calcined at high temperatures", Ceramics International, Elsevier, Amsterdam, NL, vol. 37, No. 3, Oct. 14, 2010, pp. 843-849 (8 pages).
Extended Search Report issued on Oct. 15, 2014, by the European Patent Office in corresponding European Patent Application No. 11818241.9-1354 (6 pages).

* cited by examiner

SINTERED ZIRCONIA, AND COMPOSITION FOR SINTERING AND CALCINED BODY THEREFOR

REFERENCE TO RELATED APPLICATION

The present invention is based upon and claims the benefit of the priority of Japanese patent application No. 2010-185586 filed on Aug. 20, 2010, the disclosure of which is incorporated herein in its entirety by reference thereto.

TECHNICAL FIELD

The present invention relates to a zirconia sintered body. The present invention also relates to a composition for sintering and a calcined body of the zirconia sintered body.

BACKGROUND

In zirconium oxide (IV) ($ZrO_2$) (referred to as "zirconia" hereinafter), there are polymorphs, and zirconia is subject to phase transition between the polymorphs. Tetragonal zirconia changes to monoclinic zirconia by the phase transition, for example. Therefore, since the phase transition leads to destruction of the crystal structure even though a sintered body is made of only zirconia, there is a problem that the sintered body of only zirconia does not have enough strength for a product. There is also another problem that a size of the sintered body of only zirconia is changed by volume change caused by the phase transition.

Therefore, stabilized zirconia and partially-stabilized zirconia (PSZ) have been used, in which the phase transition is inhibited by adding oxide, such as calcium oxide, magnesium oxide, yttrium oxide and cerium oxide, as a stabilizing agent to zirconia. In particular, the partially-stabilized zirconia is a ceramic having an outstanding property such as high strength and high toughness, and a sintered body of the partially-stabilized zirconia has been used in various ways such as a prosthetic material for dental treatment, a tool, and the like.

However, a problem of lack of long-term stabilization has not been solved yet because the partially-stabilized zirconia is nothing but a partially stabilized body. When the partially-stabilized zirconia sintered body is heated to 200 degrees Celsius under a presence of water, for example, the phase transition from the tetragonal system to the monoclinic system occurs, and this degrades the strength of the partially-stabilized zirconia sintered body (referred to as "low-temperature degradation" hereinafter). Accordingly, an art for manufacturing the zirconia sintered body has been developed to inhibit the low-temperature degradation (see Patent Literature 1 to Patent Literature 5, for example).

In the background arts according to Patent Literature 1 and Patent Literature 2, minute powder of the partially-stabilized zirconia having an average particle size of 0.5 µm or less is sintered at a temperature of 1200-1400 degrees Celsius to manufacture the zirconia sintered body.

In background arts according to Patent Literature 3 and Non-Patent Literature 1, in order to obtain a zirconia sintered body in which the low-temperature degradation phenomenon does not occur, the zirconia sintered body is manufactured by applying a solution including a compound such as Y to a surface of a unburned compact of a zirconia material including $Y_2O_3$ and the like and then burning it at a temperature of 1300-1800 degrees Celsius.

A zirconia sintered body disclosed in Patent Literature 4 is a zirconia sintered body including $ZrO_2$, a rare earth metal oxide ($R_2O_3$) such as $Y_2O_3$ and the like, a boron compound, $SiO_2$ and $Al_2O_3$, wherein a molar ratio of $Al_2O_3$ to a ingredient (M) including $ZrO_2$, the rare earth metal oxide ($R_2O_3$), the boron compound and $SiO_2$ ($Al_2O_3$/M) is 10/90-50/50, and a molar ratio of the rare earth metal oxide ($R_2O_3$) to $ZrO_2$ ($R_2O_3/ZrO_2$) is 1/99-6/94, and crystal particles of $ZrO_2$ are mainly formed from a phase of a tetragonal system or a mixed phase of the tetragonal system and a cubic system, a content of boron (B) to the total content of $ZrO_2$ and the rare earth metal oxide ($R_2O_3$) is 0.05-2 mol %, and a content of $SiO_2$ is 0.05-1.5 mol %. A zirconia material for medical use disclosed in Patent Literature 5 is based on $ZrO_2$, it including oxide of rare earth metal such as $Y_2O_3$ and the like, a boron compound and $Al_2O_3$ and/or $SiO_2$, a molar ratio of the oxide of the rare earth metal to $ZrO_2$ being 1.5/98.5-5/95, a content of the boron compound being 0.05-8 mol % which is converted into a content of boron (B), a content of $Al_2O_3$ being 0.1-5 mol %, a content of $SiO_2$ being 0.05-1.5 mol %.

Patent Literature 6 discloses a block for dental processing to manufacture a frame which is easy to grind or to grinding process after being completely sintered and which has flexural strength applicable to a bridge for multiple teeth loss. The block for the dental processing disclosed in Patent Literature 6 is a completely-sintered body of metal oxide having at least one of zirconia, alumina, mullite and spinel as a principle material and includes lanthanum phosphate and/or aluminum phosphate of 1 weight part to 23 weight parts in a crystal form to the metal oxide of 100 weight parts.

[PATENT LITERATURE 1] JP Patent Kokai Publication No. JP-P2001-80962A

[PATENT LITERATURE 2] JP Patent Kokai Publication No. JP-P2007-332026A

[PATENT LITERATURE 3] JP Patent Kokai Publication No. JP-A-03-115166

[PATENT LITERATURE 4] JP Patent Kokai Publication No. JP-A-07-215758

[PATENT LITERATURE 5] JP Patent Kokai Publication No. JP-A-08-33701

[PATENT LITERATURE 6] JP Patent Kokai Publication No. JP-P2009-23850A

[NON-PATENT LITERATURE 1] Taiji Yamamoto, Ichiro Kakei, "Improvement of heat resistance degradation by surface improvement of Y-TZP", Zirconia ceramics 13 and 14, Uchida Rokakuho, 1998, pp. 147-163

SUMMARY

The entire disclosures of the above mentioned Patent Literatures and Non-Patent Literature are incorporated herein by reference thereto. The following analyses are given by the present invention.

A zirconia sintered body including many monoclinic crystals to which the phase transition occurs from the tetragonal crystals and a zirconia sintered body making rapid progress of the phase transition from the tetragonal system to the monoclinic system can not maintain enough strength to obtain high reliability for industrial products (dental prosthesis, for example) because of risk of breakage.

In the background arts disclosed in Patent Literature 1 and Patent Literature 2, the zirconia sintered body is obtained by making partially-stabilized zirconia particles extremely minute so as to be sintered easily and sintering the particles at the low temperature of 1200-1400 degrees Celsius. However, in order to enhance the strength and size stability of the zirconia sintered body, the particles are required to be sintered at higher temperature.

If the partially-stabilized zirconia particles are sintered at higher temperature (temperature higher than 1400 degrees Celsius, for example) in order to enhance the strength of the zirconia sintered body, even though the minute partially-stabilized zirconia particles as disclosed in Patent Literature 1 and Patent Literature 2 are used, the sintered body easily makes progress in the low-temperature degradation. This sintered body has problems in view of maintenance of the strength and life span of the product. Moreover, since the progress of the phase transition changes the size of the sintered body, the sintered body can not be used for the product with high precision.

In the background arts disclosed in Patent Literature 1 and Patent Literature 2, the limited particle size of the partially-stabilized zirconia particle restricts manufacturing the sintered body, and, in order to confirm the reliability of the sintered body, the size of the material particles have to be measured before making the sintered body.

In the background arts disclosed in Patent Literature 3 and Non-Patent Literature 1, a cubic system is formed near the surface of the zirconia sintered body by applying the solution of the compound including yttria ($Y_2O_3$) or the like to an unburned surface. The cubic system is formed from the burned surface to a region having a depth of 200 μm or more. The particles in the burned surface grow to a particle size of about 0.3 μm to about 2.5 μm. Therefore, the zirconia sintered body having high flexural strength and fracture toughness can not be obtained. In the methods disclosed in Patent Literature 3 and Non-patent Literature 1 each time the cubic system is intended to be formed, it is necessary to use the stabilizing agent to be applied to the surface in addition to the stabilizing agent included in the material particles. The manufacturing cost becomes high because the stabilizing agent using the rare-earth element is expensive and the applying work is particularly troublesome.

In the background art disclosed in Patent Literature 4, a zirconia sintered body having enough flexural strength and fracture toughness could not be obtained. On the other hand, a crystal system of crystal particles in the zirconia sintered body disclosed in Patent Literature 5 is a tetragonal system or a mixed phase of the tetragonal system and the cubic system. In the zirconia sintered body, when the cubic crystals are included into their interior, the flexural strength and the fracture toughness are decreased. Therefore, according to the zirconia sintered body disclosed in Patent Literature 5, the sintered body having both high flexural strength and high fracture toughness has not been obtained.

Although the block for dental processing disclosed in Patent Literature 6 provides the zirconia sintered body easy to grind and to grinding process, there are the same problems as those of the arts disclosed Patent Literature 1 and Patent Literature 2 because the manufacturing method of the sintered body is same.

On the other hand, in a fully-stabilized zirconia, although the phase transition to the monoclinic system can be inhibited, the toughness and strength become lower than those of the partially-stabilized zirconia.

Although colorlessness and semi-transparency besides the strength are necessary for using the zirconia sintered body as the dental prosthesis, some stabilizing agents make coloration and loss of the transparency.

Inventors invented a zirconia sintered body, in which the progress of the low-temperature degradation is inhibited even though it is sintered at a high temperature without limitation of particle sizes of raw material particles, by adding a predetermined amount of an element such as phosphorus (See Japanese patent application No. 2009-192287 (PCT/JP2010/064111)). According to this invention, the higher the temperature for sintering is, the more the low-temperature degradation inhibitive effect could be enhanced. On the other hand, the low-temperature degradation inhibitive effect tends to decrease when sintering the particles at a low temperature of 1500 degrees Celsius or less.

An object of the prevent invention is to provide a zirconia sintered body capable of inhibiting the low-temperature degradation even though the low temperature sintering is performed. An object of the present invention is also to provide a zirconia sintered body having high strength and high fracture toughness even though the low temperature sintering is performed. Further, an object of the present invention is also to provide a composition for sintering and a calcined body which are precursors of the zirconia sintered body.

According to a first aspect of the present invention, a zirconia sintered body is provided, wherein, in an X-ray diffraction pattern in a burned surface, a first peak ratio is 0.4 or more, the first peak ratio being a ratio of a height of a peak existing near a position where a cubic [200] peak appears to a height of a peak existing near a position where a tetragonal [200] peak appears and in an X-ray diffraction pattern of a region having a depth of 100 μm or more from the burned surface, a second peak ratio is 0.3 or less, the second peak ratio being the ratio of the height of the peak existing near the position where the cubic [200] peak appears to the height of the peak existing near the position where the tetragonal [200] peak appears.

According to a second aspect of the present invention, a zirconia sintered body is provided, wherein, when a burned surface or an exposed surface is ground so that a surface, in which a third peak ratio is 0.3 or less, is exposed and then burned again, in an X-ray diffraction pattern, the third peak ratio being a ratio of a height of a peak existing near a position where a cubic [200] peak appears to a height of a peak existing near a position where a tetragonal [200] peak appears, in an X-ray diffraction pattern of a re-burned surface, a forth peak ratio is 0.4 or more, the forth peak ratio being the ratio of the height of the peak existing near a position where a cubic [200] peak appears to the height of the peak existing near a position where a tetragonal [200] peak appears.

According to a preferred mode of the above second aspect, in an X-ray diffraction pattern of a region having a depth of 100 μm or more from the re-burned surface, a fifth peak ratio is 0.3 or less, the fifth peak ratio being the ratio of a height of a peak existing near the position where the cubic [200] peak appears to a height of a peak existing near the position where the tetragonal [200] peak appears.

According to a third aspect, a zirconia sintered body is provided, wherein, a value of a fracture toughness measured in conformity with JISR1607 is 8 MPa·m$^{1/2}$ or more and a flexural strength measured in conformity with JISR1601 is 1200 MPa or more.

According to a preferred mode of the above third aspect, a value of a fracture toughness measured in conformity with JISR1607 is 8 MPa·m$^{1/2}$ or more and less than 9 MPa·m$^{1/2}$. A flexural strength measured in conformity with JISR1601 is 1700 MPa or more.

According to a preferred mode of the above third aspect, a value of a fracture toughness measured in conformity with JISR1607 is 9 MPa·m$^{1/2}$ or more and less than 10 MPa·m$^{1/2}$. A flexural strength measured in conformity with JISR1601 is 1600 MPa or more.

According to a preferred mode of the above third aspect, a value of a fracture toughness measured in conformity with JISR1607 is 10 MPa·m$^{1/2}$ or more and less than 12 MPa·m$^{1/2}$. A flexural strength measured in conformity with JISR1601 is 1200 MPa or more.

According to a fourth aspect, a zirconia sintered body comprising partially-stabilized zirconia as a matrix phase is provided. The zirconia sintered body includes 0.001 mass % to 1 mass % of the element phosphorus (P) to a mass(weight) of the zirconia sintered body. The zirconia sintered body includes $3 \times 10^{-4}$ mass % to $3 \times 10^{-1}$ mass % of the element boron (B) to a mass(weight) of the zirconia sintered body.

According to a fifth aspect, it is provided that a zirconia sintered body comprising at least 2 modes of the above first to fourth aspects.

According to a preferred mode of the above first to fifth aspects, when a low-temperature degradation acceleration test is applied to the zirconia sintered body at a temperature of 180 degrees Celsius and a pressure of 1 MPa for 5 hours, in an X-ray diffraction pattern of a surface of the zirconia sintered body after the low-temperature degradation acceleration test, a sixth peak ratio is 1 or less, the sixth peak ratio being a ratio of a height of a peak existing near a position where a monoclinic [11-1] peak appears to a height of a peak existing near a position where a tetragonal [111] peak appears.

According to a preferred mode of the above first to fifth aspects, the zirconia sintered body comprising partially-stabilized zirconia including a stabilizing agent(s), as a matrix phase. The zirconia sintered body has a region in which a content rate of the stabilizing agent(s) decreases from a burned surface side toward an interior side.

According to a preferred mode of the above first to fifth aspects, a concentration gradient of the stabilizing agent(s) occurs by the burning.

According to a preferred mode of the above first to fifth aspects, the zirconia sintered body comprises partially-stabilized zirconia including a stabilizing agent(s), as a matrix phase, wherein in a sample surface of the zirconia sintered body, when a region of 10 μm×10 μm region is partitioned into a grid pattern of 256×256 squares, and a content of the stabilizing agent(s) in each square, is expressed as a mass %, a standard deviation of a surface content of the stabilizing agent(s) is 0.8 or more.

According to a preferred mode of the above first to fifth aspects, the zirconia sintered body includes 0.2 mass % to 25 mass % of aluminum oxide to the mass(weight) of the zirconia sintered body.

According to a preferred mode of the above first to fifth aspects, the zirconia sintered body further includes 0.03 mass % to 3 mass % of silicon dioxide to the mass(weight) of the zirconia sintered body.

According to a preferred mode of the above first to fifth aspects, the zirconia sintered body is manufactured by being sintered at a temperature ranging from 1350 degrees Celsius to 1550 degrees Celsius.

According to a sixth aspect of the present invention, a composition for sintering of a zirconia sintered body including a partially-stabilized zirconia powder including a stabilizing agent(s), $4 \times 10^{-5}$ mol to $5 \times 10^{-2}$ mol of the element phosphorus (P) to 1 mol of zirconium oxide (IV) and $4 \times 10^{-2}$ mol to $5 \times 10^{-2}$ mol of the element boron (B) to 1 mol of zirconium oxide (IV) is provided.

According to a preferred mode of the above sixth aspect, the zirconia sintered body includes 0 mol to 0.2 mol of aluminum oxide to 1 mol of zirconium oxide (IV).

According to a preferred mode of the above sixth aspect, the zirconia sintered body includes $7 \times 10^{-4}$ mol to $7 \times 10^{-2}$ mol of silicon dioxide to 1 mol of zirconium oxide (IV).

According to a preferred mode of the above sixth aspect, the composition for sintering of the zirconia sintered body includes low-stabilized zirconia particles including a stabilizing agent(s) or not and high-stabilized zirconia particles which include the stabilizing agent (s) more than the low-stabilized zirconia particles. A content rate of the stabilizing agent(s) in the high-stabilized zirconia particles to the total molar number of zirconia [sic. zirconium] oxide and the stabilized agent(s) is by 1 mol % to 6 mol % higher than a content rate of the stabilizing agent(s) in the low-stabilized zirconia particles relative to the total molar number of zirconium oxide and the stabilized agent(s).

According to a preferred mode of the above sixth aspect, the content rate of the stabilizing agent(s) in the low-stabilized zirconia particles is 0 mol % or more and less than 2 mol % relative to the total molar number of zirconium oxide and the stabilizing agent(s). The content rate of the stabilizing agent(s) in the high-stabilized zirconia particles is 2 mol % or more and less than 8 mol % relative to the total molar number of zirconium oxide and the stabilizing agent(s).

According to a seventh aspect of the present invention, a composition for sintering of a zirconia sintered body, becoming the zirconia sintered body according to any of the modes of the above first to fifth aspects by sintering the composition at a temperature ranging from 1350 degrees Celsius to 1550 degrees Celsius, is provided.

According to an eighth aspect of the present invention, a calcined body of a zirconia sintered body including zirconia including a stabilizing agent(s), $4 \times 10^{-5}$ mol to $5 \times 10^{-2}$ mol of the element phosphorus (P) to 1 mol of zirconium oxide (IV), and $4 \times 10^{-5}$ mol to $5 \times 10^{-2}$ mol of the element boron (B) to 1 mol of zirconium oxide (IV), is provided.

According to a preferred mode of the above eighth aspect, the calcined body of the zirconia sintered body includes 0 mol to 0.2 mol of aluminum oxide to 1 mol of zirconium oxide (IV).

According to a preferred mode of the above eighth aspect, the calcined body of the zirconia sintered body includes $7 \times 10^{-4}$ mol to $7 \times 10^{-2}$ mol of silicon dioxide to 1 mol of zirconium oxide (IV).

According to a preferred mode of the above eighth aspect, the calcined body of the zirconia sintered body includes low-stabilized zirconia particles including a stabilizing agent(s) or not and high-stabilized zirconia particles which include the stabilizing agent(s) more than the low-stabilized zirconia particles. A content rate of the stabilizing agent(s) in the high-stabilized zirconia particles to the total molar number of zirconia [sic. zirconium] oxide and the stabilized agent(s) is by 1 mol % to 6 mol % higher than a content rate of the stabilizing agent(s) in the low-stabilized zirconia particles relative to the total molar number of zirconium oxide and the stabilized agent(s).

According to a preferred mode of the above eighth aspect, the content rate of the stabilizing agent(s) in the low-stabilized zirconia particles is 0 mol % or more and less than 2 mol % relative to the total molar number of zirconium oxide and the stabilizing agent(s). The content rate of the stabilizing agent(s) in the high-stabilized zirconia particles is 2 mol % or more and less than 8 mol % relative to the total molar number of zirconium oxide and the stabilizing agent(s).

According to a ninth aspect of the present invention, a calcined body for a zirconia sintered body is turned to the zirconia sintered body according to any of the modes of the above first to fifth aspects by being sintered the calcined body at a temperature ranging from 1350 degrees Celsius to 1550 degrees Celsius, is provided.

According to a tenth aspect of the present invention, a calcined body for a zirconia sintered body is formed by calcining the composition for sintering according to any of the modes of the above sixth to seventh aspects at a temperature ranging from 800 degrees Celsius to 1200 degrees Celsius, is provided.

The zirconia sintered body of the present invention includes not only a sintered body in which molded zirconia particles are sintered under atmospheric pressure or without applying additional pressure but also a sintered body densified by the high temperature and pressure treatment, for example, HIP (Hot Isostatic Pressing) treatment and the like.

In the present invention, the term "low-temperature degradation acceleration test" is a test conforming to ISO13356. With the proviso, although a condition provided in ISO13356 is "134 degrees Celsius, 0.2 MPa, 5 hours", a corresponding condition of the acceleration test in the prevent invention is changed to "180 degrees Celsius, 1 MPa" to make the condition of the acceleration test severer, and a test time is suitably determined corresponding to a purpose. Hereinafter, "the low-temperature degradation acceleration test" is also expressed as "a hydrothermal treatment" or "a hydrothermal treatment test".

The present invention has at least one of the following effects.

According to the present invention, a zirconia sintered body having long term stability in which the low-temperature degradation is inhibited can be obtained, even though the sintering is performed at low temperature (for example, 1500 degrees Celsius or less). Therefore, the zirconia sintered body can be manufactured at more reduced cost.

In the present invention, during the burning, a stabilizing agent(s) in raw materials migrates toward a surface. Therefore, only an extremely thin region of the burned (as-sintered) surface has high content of the stabilizing agent(s), and a cubic system increases in this region. On the other hand, the content of the stabilizing agent in the interior of the zirconia sintered body hardly changes because the stabilizing agent(s) concentrates in only the burned surface, and therefore a crystal system in the interior of the zirconia sintered body can maintain a tetragonal system. That is, according to the present invention, a cover of a layer including a large amount of the cubic crystals can be formed only in the burned (as-sintered) surface of the zirconia sintered body. It is considered that the layer including a large amount of the cubic crystals can inhibit the zirconia sintered body from being degraded by the hydrothermal treatment.

The crystal system in the interior of the zirconia sintered body can maintain the tetragonal system, and therefore the flexural strength and fracture toughness do not decrease. A zirconia sintered body in which both of the flexural strength and the fracture toughness, which are generally in inverse proportion (i.e., trade-off relation), are improved can be obtained.

As a result, the zirconia sintered body of the present invention can be used for a product requiring high reliability and long life span (or durable life). In addition, the zirconia sintered body of the present invention can be also used for a product requiring high precision because size change caused by the phase transition is reduced.

In the present invention, it is unnecessary to apply a separate stabilizing agent on the surface in order to make a large amount of the cubic crystals be included in the burned (as-sintered) surface, and it is merely necessary to burn materials, adding inexpensive additives, as a result which there is no increase of a manufacturing cost.

In the zirconia sintered body of the present invention, even if a surface of the tetragonal system is exposed by processing the burned (as-sintered) surface, by burning it again, the cubic system can be formed near the re-burned surface (exposed surface) again. Accordingly, even if a surface whose main crystal system is tetragonal is exposed by processing the as-sintered body to a desired shape, the sintered body can be covered with the layer including the cubic crystals through the second burning, and a product in which the progress of the hydrothermal degradation can be inhibited can be manufactured.

Consequently, according to the present invention, a zirconia sintered body having low low-temperature degradation, high strength and high fracture toughness can be obtained without increasing the manufacturing cost. Moreover, this can be achieved regardless of any shape even in a case of a complex shape.

In the present invention, a zirconia sintered body having columnar or needle crystal which serves as a reinforcing fiber can be obtained. Therefore, the strength of the zirconia sintered body can be enhanced even though sintering the zirconia sintered body at low temperature (for example, 1500 degrees Celsius or less).

A zirconia sintered body of the present invention has colorlessness and semi-transparency and therefore can be used for a product requiring the transparency such as dental prosthesis.

PREFERRED MODES

Figure 1:
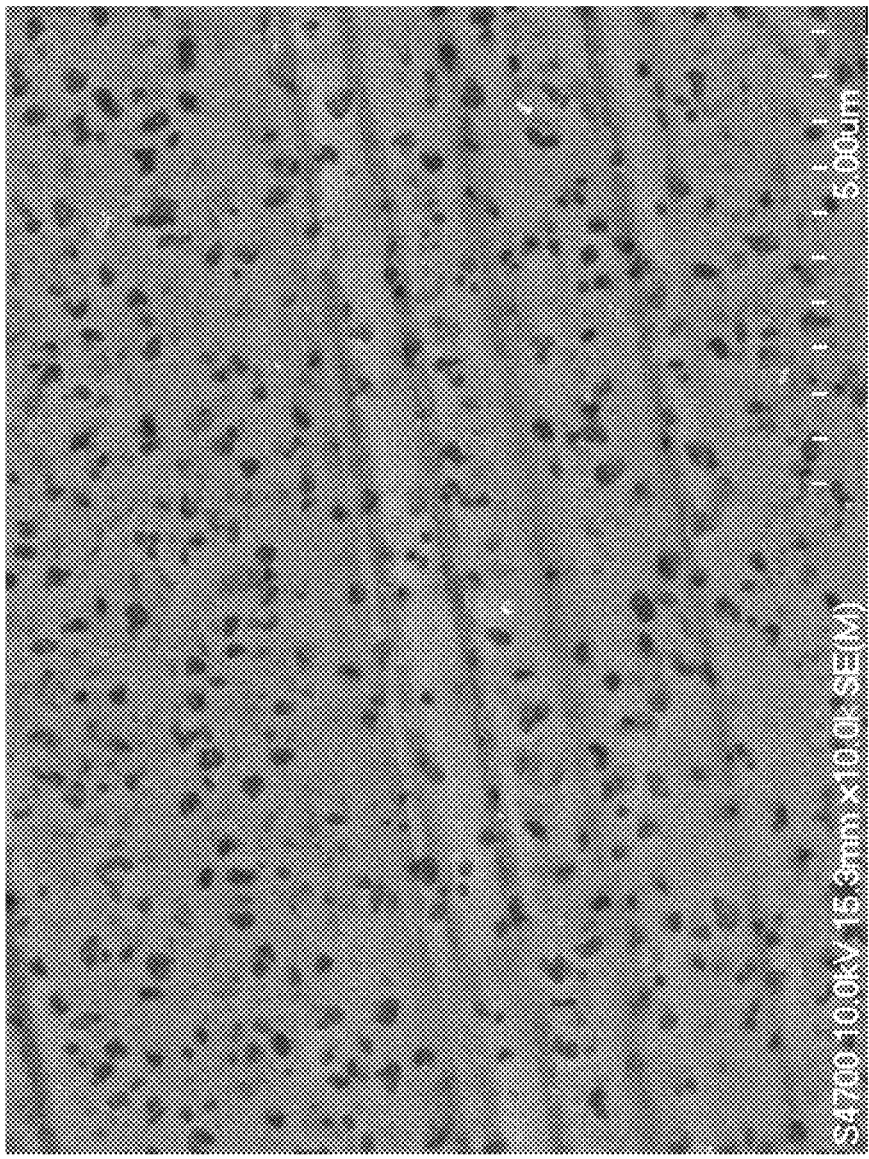
FIG. 1 is a SEM picture of a zirconia sintered body burned at 1350 degrees Celsius at 10,000 magnification, in Example 10.

Contents disclosed in claims, description, drawings and abstract of Japanese patent application No. 2009-192287 (PCT/JP2010/064111) and Japanese patent application No. 2010-44967 are incorporated herein.

A zirconia sintered body of the present invention will be explained. The zirconia sintered body of the present invention is a sintered body in which partially-stabilized zirconia crystal particles are mainly (as a main component) sintered, and has the partially-stabilized zirconia as a matrix phase. Oxides such as calcium oxide, magnesium oxide, yttrium oxide, cerium oxide and/or the like are mentioned as an example of a stabilizing agent for the partially-stabilized zirconia crystal particles. It is preferred that an amount of the stabilizing agent(s) is enough to partially stabilize the zirconia particles. If yttrium oxide is used as the stabilizing agent, for example, the content rate of yttrium oxide may be preferably 2 mol % to 5 mol % (about 3 mass % to 9 mass %) to the partially-stabilized zirconium oxide in the entire zirconia sintered body. The content rate of the stabilizing agent in the zirconia sintered body may be measured by the inductively coupled plasma (ICP) emission spectroscopy, for example.

In a burned (as-sintered) surface of the zirconia sintered body, the stabilizing agent(s) has a content rate enough to completely stabilize the burned surface, and in an interior (a region other than the burned surface) of the zirconia sintered body, the stabilizing agent(s) has a content rate that may partially stabilize the sintered body. It is considered that the zirconia sintered body has a region in which the content rate of the stabilizing agent(s) decreases from the burned surface of the zirconia sintered body toward the interior. According to a secondary ion mass spectrometry (SIMS), the region is considered to have a depth of 4 μm to 8 μm from the burned surface, for example. According to an X-ray photoelectron spectroscopy (XPS), a region from the burned surface to the depth of at least 5 nm is considered to have the stabilizing agent(s) of 5 mol % or more and to preferably have the stabilizing agent(s) of 8 mol % or more, for example. An interior deeper than 100 μm from the burned surface of the zirconia sintered body is considered to have a content rate of the stabilizing agent of 2 mol % or more and less than 5 mol % and to preferably have the stabilizing agent(s) of 4 mol % or less, for example. As a method to increase the content rate of the stabilizing agent(s) in the burned surface of the zirconia sintered body, it is preferred not that the stabilizing agent is added from the outside of a compact before the burning but that a part of the stabilizing agent(s) included in raw materials migrates toward the burned surface during the burning.

In the following explanation, the term simply referred to as "zirconia" means the partially-stabilized zirconia.

A main crystal system of the zirconia crystal particles in the zirconia sintered body of the present invention is a tetragonal system. It is preferred that any monoclinic crystal in the zirconia sintered body of the present invention is substantially not detected in an X-ray diffraction pattern before a low-temperature degradation acceleration test (hydrothermal test). Even though the monoclinic crystal is included in the zirconia sintered body of the present invention (in a state before the hydrothermal test), it is preferred that a ratio of a height of a peak existing near a position around 28° of 2θ where a [11-1] peak of the monoclinic system appears to a height of a peak existing near a position around 30° of 2θ where a [111] peak of the tetragonal system appears (that is, "the height of the peak existing near the position around 28° of 2θ where the [11-1] peak of the monoclinic system appears"/"the height of the peak existing near the position around 30° of 2θ where the [111] peak of the tetragonal system appears"; referred to as "the peak ratio of the monoclinic system" hereinafter) is 0.2 or less and preferably 0 to 0.1.

The burned (as-sintered) surface (and the neighborhood) of the zirconia sintered body of the present invention includes the cubic crystals more than the interior of the zirconia sintered body. Although the cubic crystals are observed when the X-ray diffraction pattern of the burned surface is measured, for example, the cubic crystals are not substantially observed when the X-ray diffraction pattern of a surface exposed by grinding the burned surface by a depth of at least 100 μm is measured.

When the X-ray pattern of the burned surface of the zirconia sintered body of the present invention is measured and a peak height of the tetragonal crystals is compared with a peak height of the cubic crystals, it is preferred that a ratio of a height of a peak existing near a position around 35.2° of 2θ where a [200] peak of the cubic system appears to a height of a peak existing near a position around 35.3° of 2θ where a [200] peak of the tetragonal system appears (that is, "the height of the peak existing near the position around 35.2° of 2θ where the [200] peak of the cubic system appears"/"the height of the peak existing near the position around 35.3° of 2θ where the [200] peak of the tetragonal system appears"; referred as "the peak ratio of the cubic system" hereinafter) is 0.35 or more, preferably 0.5 or more, and more preferably 1 or more.

The region having a depth of 100 μm or more from the burned surface of the zirconia sintered body of the present invention includes a large amount of tetragonal crystals and, preferably, substantially has the tetragonal system. In case where the burned surface of the zirconia sintered body of the present invention is ground by the depth of 100 μm or more, the X-ray diffraction pattern of the exposed surface is measured, and the peak height of the tetragonal crystals is compared with the peak height of the cubic crystals, it is preferred that the peak ratio of the cubic system is 0.3 or less, preferably 0.1 or less, more preferably 0.05 or less, and further preferably that any cubic crystal is substantially not detected. If the interior of the sintered body includes a large amount of the cubic crystals, it is considered that the flexural strength and fracture toughness are degraded. In the present invention, the term "grinding" includes polishing.

That the neighborhood of the burned surface of the zirconia sintered body of the present invention includes a large amount of the cubic crystals can be confirmed by the thin film X-ray diffraction method. In a region from the burned surface to the depth of about 8 μm (a region to the extent of an X-ray incident angle of 0° to 11°), when the peak height of the cubic crystal is compared with that of the tetragonal crystal, it is preferred that a ratio of a height of a peak existing near a position around 70.5° of 2θ where a [311] peak of the cubic system appears to a height of a peak existing near a position around 71.0° of 2θ where a [211] peak of the tetragonal system appears (that is, "the height of the peak existing near the position around 70.5° of 2θ where the [311] peak of the cubic system appears"/"the height of the peak existing near the position around 71.0° of 2θ where the [211] peak of the tetragonal system appears"; referred to as "the peak ratio of the burned surface" hereinafter) is preferably 1 or more, more preferably 2 or more, further preferably 3 or more, and further preferably 5 or more.

In the zirconia sintered body of the present invention, even if a surface whose crystal system is mainly the tetragonal system is exposed by grinding the burned surface (the exposed surface after being sintered) or the surface of the zirconia sintered body, when the zirconia sintered body (the sintered body in which the ground surface is exposed) is burned again, it was found that, in the same way as the sintering, the cubic crystals more than those after grinding before re-burning are formed near the re-burning surface without any special treatment such as applying the stabilizing agent. This result is remarkable and exceeds expectations. When the burned surface or exposed surface of the zirconia sintered body of the present invention is ground, the surface in which the ratio of the height of the peak existing near the position where the [200] peak of the cubic system appears to the height of the peak existing near the position where the [200] peak of the tetragonal system appears is 0.3 or less, more preferably 0.1 or less and further preferably 0.05 or less is exposed and burned again, in the X-ray diffraction pattern of the re-burned surface, the ratio of the height of the peak existing near the position where the [200] peak of the cubic system appears to the height of the peak existing near the position where the [200] peak of the tetragonal system appears is 0.4 or more, preferably 1 or more, more preferably 2 or more, further preferably 3 or more, and further preferably 5 or more.

In the interior after the re-burning, main crystal system is the tetragonal system. In the X-ray diffraction pattern of the region having the depth of 100 μm or more from the re-burned surface, the ratio of the height of the peak existing near the position where the peak of the cubic system appears to the height of the peak existing near the position where the [200] peak of the tetragonal system appears is 0.3 or less, more preferably 0.1 or less and further preferably 0.05 or less.

The re-burning temperature is preferably same as the sintering temperature and preferably ranging from 1350 degree Celsius to 1500 degree Celsius. The term "re-burning" in the present invention includes the HIP treatment, too.

In the zirconia sintered body of the present invention, even if a surface whose main crystal system is the tetragonal system is exposed by cutting or grinding the sintered body to a desired shape, by burning it again, a product can be obtained, in which the cubic system is included in the surface and the progress of the hydrothermal degradation can be inhibited.

It is preferred that the zirconia sintered body of the present invention includes boron (B). It is preferred that a content rate of boron (element) in the zirconia sintered body is $3 \times 10^{-4}$ mass % or more, and more preferably $3 \times 10^{-2}$ mass % or more to the mass of the zirconia sintered body. It is preferred that the content rate of boron (element) is 0.3 mass % or less to the total mass(weight) of the zirconia sintered body. By including boron, a progress of a phase transition can be inhibited while decreasing sintering temperature.

The content rate of boron in the zirconia sintered body may be measured by a composition analysis of the zirconia sintered body. The content rate of boron in the zirconia sintered body may be measured by the inductively coupled plasma (ICP) emission spectroscopy, for example. An addition rate of boron to the total mass(weight) of partially-stabilized zirconia and aluminum oxide may be regarded as the content rate of boron in the zirconia sintered body, if the addition rate of boron added upon making the zirconia sintered body (namely, the content rate before the burning) can be substantially considered as the content rate of boron in the zirconia sintered body (namely, the content rate after the burning).

Boron may be present in the zirconia crystal particle and in crystal grain boundary. That is, boron may be added upon making the zirconia crystal particles and may be mixed with the zirconia crystal particles before being shaped to a predetermined form.

The zirconia sintered body of the present invention includes the element phosphorus (P). In view of the phase transition inhibitive effect, it is preferred that the content rate of phosphorus in the zirconia sintered body of the present invention is 0.001 mass % or more, and more preferably 0.05 mass % or more, further preferably 0.1 mass % or more to the mass(weight) of the zirconia sintered body. It is preferred that the content rate of phosphorus in the zirconia sintered body of the present invention is 1 mass % or less, more preferably 0.6 mass % or less, further preferably 0.5 mass % or less.

The content rate of the element phosphorus in the zirconia sintered body may be measured by the composition analysis of the zirconia sintered body. An addition rate of phosphorus to the total mass(weight) of partially-stabilized zirconia and aluminum oxide upon making a composition for sintering (including phosphorus in the zirconia particles of a raw material) may be regarded as the content rate of phosphorus in the zirconia sintered body. Provided that some ingredient disappears from the zirconia sintered body by the burning, and the content rate before the burning is substantially not considered as the content rate after the burning, the content rate is measured by the composition analysis. The content rate of the element phosphorus in the zirconia sintered body may be measured by the inductively coupled plasma (ICP) emission spectroscopy, for example.

The element phosphorus may be present in the zirconia crystal particle and in crystal grain boundary. That is, the element phosphorus may be added upon making the zirconia crystal particles and may be mixed with the zirconia crystal particles before being shaped to a predetermined form.

It is preferred that the zirconia sintered body of the present invention includes aluminum oxide (preferably alpha-alumina). If aluminum oxide is included, it promotes the burning as a sintering additive and can inhibit the progress of the low-temperature degradation. It is preferred that the content rate of aluminum oxide in the zirconia sintered body of the present invention is 0 mass % or more, and more preferably 0.2 mass % or more, and further preferably 4 mass % or more to the mass(weight) of the zirconia sintered body. It is preferred that the content rate of aluminum oxide in the zirconia sintered body of the present invention is 25 mass % or less, and more preferably 20 mass % or less, and further preferably 10 mass % or less to the mass(weight) of the zirconia sintered body. The zirconia sintered body of the present invention can inhibit the low-temperature degradation without including aluminum oxide.

The content rate of aluminum oxide in the zirconia sintered body may be measured by the composition analysis of the zirconia sintered body. An addition rate of aluminum oxide to the total mass(weight) of partially-stabilized zirconia and aluminum oxide upon making a composition for sintering (including aluminum oxide in the zirconia particles of a raw material) may be regarded as the content rate of aluminum oxide in the zirconia sintered body. Provided that some ingredient disappears from the zirconia sintered body by the burning, and the content rate before the burning is substantially not considered as the content rate after the burning, the content rate is measured by the composition analysis. The content rate of aluminum oxide in the zirconia sintered body may be measured by the inductively coupled plasma (ICP) emission spectroscopy, for example.

Aluminum oxide may be present in the zirconia crystal particle and in crystal grain boundary. That is, aluminum oxide may be added upon making the zirconia crystal particles and may be mixed with the zirconia crystal particles before being shaped to a predetermined form.

It is preferred that at least a part of aluminum oxide (preferably alpha-alumina) existing in the zirconia sintered body of the present invention is a columnar crystal or a needle crystal (whisker) (expressed as "columnar crystal" hereinafter). For example, the columnar crystal may be made by being burned at a temperature ranging from 1357 degrees Celsius to 1500 degrees Celsius under a presence of boron. The existence of the columnar crystal may be confirmed by a scanning electron microscope, for example (see FIGS. 1 to 15). If the observation is performed two-dimensionally by the electron microscope, the length of the columnar crystal appears from 1 μm to 5 μm, for example. That the columnar crystal is alpha-alumina can be identified by the X-ray diffraction pattern.

An aspect ratio of the columnar crystal is 2 or more, preferably 5 or more, and more preferably 10 or more. It is considered that the columnar crystal is that an aluminum oxide crystal whose aspect ratio is about 1 (at least less than 2, apparently spherical), existing in the composition for sintering of the zirconia sintered body, grew into a columnar or needle shape when the sintering of zirconia particles (preferably at a sintering temperature ranging from 1375 degrees Celsius to 1500 degrees Celsius). By allowing aluminum oxide to be the columnar crystal, it functions as a reinforcing fiber, thus the strength and the fracture toughness of the zirconia sintered body can be enhanced. In particular, when the sintering temperature ranges from 1375 degrees Celsius to 1450 degrees Celsius, the aspect ratio of aluminum oxide crystal can be more increased. Although the crystal of aluminum oxide forms spherical depending on a combination of an additive agent(s), even if it forms spherical, the strength and the fracture toughness of the zirconia sintered body are not decrease.

Since the change of the crystal formation of aluminum oxide at the time of the sintering is not observed when boron is not added, it is considered that the change occurs by the addition of boron. Generally, the columnar crystal or the needle crystal of aluminum oxide is not commercially available. Therefore the columnar crystal can not be added as a raw material. If the columnar crystals can be obtained, since zirconia crystal particles are spherical in shape, even though both zirconia particles (spherical shape) and aluminum oxide particles (columnar shape) are mixed at the time of making a mixture, they can not be mixed uniformly, and it is hard to make a sintered body in which the columnar aluminum oxide particles are uniformly dispersed. However, according to the present invention, by adding boron to a composition, a spherical aluminum oxide can be changed easily to a columnar aluminum oxide at the time of the sintering.

The zirconia sintered body may include an inorganic composite(s) (for example, spinel, mullite and the like) including the ingredient of $Al_2O_3$ in addition to aluminum oxide or instead of aluminum oxide. By including the inorganic composite(s), abrasion resistance and thermal stability can be enhanced.

It is preferred that the zirconia sintered body of the present invention further includes silicon dioxide. If the element phosphorus and silicon dioxide are included in the zirconia sintered body, the phase transition inhibitive effect can be further enhanced than the case of the element phosphorus alone. In view of the phase transition inhibitive effect, it is preferred that the content rate of silicon dioxide in the zirconia sintered body of the present invention is 0.03 mass % or more, more preferably 0.05 mass % or more, and further preferably 0.1 mass % or more to the mass(weight) of the zirconia sintered body. In view of the phase transition inhibitive effect, it is preferred that the content rate of silicon dioxide in the zirconia sintered body of the present invention is 3 mass % or less, more preferably 1 mass % or less, and further preferably 0.8 mass % or less to the mass(weight) of the zirconia sintered body.

The content rate of silicon dioxide in the zirconia sintered body may be measured by the composition analysis of the zirconia sintered body. An addition rate of silicon dioxide to the total mass(weight) of partially-stabilized zirconia and aluminum oxide upon making a composition for sintering (including silicon dioxide in the zirconia particles of a raw material) may be regarded as the content rate of silicon dioxide in the zirconia sintered body. Provided that some ingredient disappears from the zirconia sintered body by the burning, and the content rate before the burning is substantially not considered as the content rate after the burning, the content rate is measured by the composition analysis. The content rate of silicon dioxide in the zirconia sintered body may be measured by the inductively coupled plasma (ICP) emission spectroscopy, for example.

Silicon dioxide may be included in the zirconia crystal particle and in crystal grain boundary. That is, silicon dioxide may be added upon making the zirconia crystal particles and may be mixed with the zirconia crystal particles before being shaped to a predetermined form.

According to the SISM, the content rates of boron, phosphorus and silicon dioxide in the neighborhood of the burned surface, especially the region having the high content rate of the cubic crystals (the region having the high content rate of the stabilizing agent) are lower than in the interior of the sintered body. For example, it is considered that the content rates of boron, phosphorus and silicon dioxide are low in the region from the burned surface to the depth of 4 μm, and that the content rates have a tendency to increase in the region having at least the depth of 4 μm to 6 μm from the burned surface.

By the burning to sinter the raw material powder, as described above, the burned surface of the zirconia sintered body of the present invention has the high content rate of the stabilizing agent and high presence rate of the cubic crystals. In the zirconia sintered body of the present invention, even if the layer including a large amount of the cubic crystals (the layer having the high content rate of the stabilizing agent) is removed by grinding the burned surface, and the exposed layer including a large amount of the tetragonal crystals is re-burned, as described above, in the re-burned surface, the content rate of the stabilizing agent(s) can be increased, and the presence rate of the cubic crystals can also be increased. Accordingly, in the present invention, by re-burning the zirconia sintered body processed to a desired shape, the zirconia sintered body in which a speed of the hydrothermal degradation is reduced can be obtained. That is, the zirconia sintered body also having high precision of the processing size can be obtained.

It is considered that, in the zirconia sintered body of the present invention, boron and phosphorus have an effect to migrate the stabilizing agent(s) toward the burned surface by the burning. The effect can be obtained even though the addition of boron alone or the addition of phosphorus alone, the effect is enhanced by adding both boron and phosphorus and a combine effect is obtained.

In the preferred zirconia sintered body of the present invention, even if the hydrothermal treatment test (a low-temperature degradation acceleration test) is performed, the phase transition from the tetragonal crystal to the monoclinic crystal can be inhibited. Especially, in the sintered body burned at 1450 degrees Celsius or more, the phase transition inhibitive effect is outstanding. When the hydrothermal treatment at a temperature of 180 degrees Celsius and a pressure of 1 MPa for five hours is applied to the zirconia sintered body of the present invention for example, in the X-ray diffraction pattern of the surface of the zirconia sintered body after the hydrothermal treatment, it is preferred that the peak ratio of the monoclinic system is 1 or less, preferably 0.5 or less, more preferably 0.1 or less, further preferably 0.05 or less, and further preferably 0.01 or less.

When the hydrothermal treatment at the temperature of 180 degrees Celsius and the pressure of 1 MPa for 24 hours is applied to the zirconia sintered body of the present invention, in the X-ray diffraction pattern of the surface of the zirconia sintered body after the hydrothermal treatment, it is preferred that the peak ratio of the monoclinic system is 3 or less, more preferably 2 or less, further preferably 1.5 or less, further preferably 1 or less, and further preferably 0.5 or less.

Even if the hydrothermal treatment is applied to the preferred zirconia sintered body of the present invention, the size change is small, and therefore the size precision can be kept high. When the hydrothermal treatment at the temperature of 180 degrees Celsius and the pressure of 1 MPa for 24 hours is applied to the zirconia sintered body of the present invention, it is preferred that an expansion rate of a width of the test piece of the zirconia sintered body after the hydrothermal treatment, which is made in conformity to JISR1601, is 0.6% or less, more preferably 0.5% or less, further preferably 0.3% or less, further preferably 0.1% or less, and further preferably 0.05% or less, to the width of the test piece before the hydrothermal treatment.

Since the effects and advantages of the addition of the element phosphorus and silicon dioxide are also disclosed in claims, description and drawings of Japanese patent application No. 2009-192287 (PCT/JP2010/064111), further explanations on this description is omitted by reference thereto.

The stabilizing agent(s) may unevenly exist in the zirconia sintered body as a whole. By distributing the stabilizing agent(s) unevenly, a value of the fracture toughness can be enhanced. A preferred degree of unevenness of the stabilizing agent(s) can be represented by a standard deviation of a content of the stabilizing agent(s), for example. In the case where a content of the stabilizing agent(s) in a sample surface of the zirconia sintered body is represented in mass %, for example, the standard deviation of the contents of the stabilizing agent(s) in the total of, e.g., 50000 points or more is preferably 0.8 or more, more preferably 1 or more and further preferably 1.5 or more. Also, the standard deviation of the contents of the stabilizing agent(s) is preferably 2 or less. When the standard deviation of the contents of the stabilizing agent(s) is 0.8 or more, the value of the fracture toughness of the zirconia sintered body can be enhanced. When the standard deviation of the contents of the stabilizing agent(s) is greater than 2, instability becomes too high.

It is preferred that the standard deviation is calculated based on the contents at 50000 or more points in a region of 10 μm×10 μm in the sample surface of the zirconia sintered body. For example, a measuring method of the standard deviation of the contents of the stabilizing agent(s) includes partitioning a square region of 10 μm×10 μm into a grid pattern of 256 squares in column and 256 squares in row on a surface of a sample of the zirconia sintered body, measuring a content of the stabilizing agent(s) in each square (total 65536 squares) and then calculating the standard deviation thereof.

The content of the stabilizing agent(s) in the sample surface may be measured by using a field effect electron probe micro analyzer (FE-EPMA) and the like, for example. Without depending on the content of the sample surface, the method for measuring the content may includes taking a part of the zirconia sintered body.

Items relating to the content of the stabilizing agent(s), standard deviation and measuring methods thereof and the like in the zirconia sintered body are same as in a calcined body for the zirconia sintered body, and explanations are omitted herein.

The phase transition inhibitive effect in the zirconia sintered body of the present invention is not affected by the particle size in the zirconia sintered body. Accordingly, the particle size may be suitably determined in accordance with a use.

The zirconia sintered body of the present invention preferably has a semi-transparency and colorlessness. An appearance of the zirconia sintered body of the present invention can be adjusted by adding pigment or the like in accordance with a use. The zirconia sintered body of the present invention may be preferably used as a dental material such as prosthesis. It is preferred that the zirconia sintered body of the present invention does not have mat and un-sintered appearance.

Both the flexural strength and the fracture toughness between which there is a trade-off relationship can be enhanced in the zirconia sintered body in the present invention. For example, according to the present invention, a value of the fracture toughness in the zirconia sintered body of the present invention, measured in conformity with JISR1607, is 8 MPa·m$^{1/2}$ or more and 12 MPa·m$^{1/2}$ or less, the flexural strength measured in conformity with JISR1601 is 1200 MPa or more, preferably 1300 MPa or more, and more preferably 1550 MPa or more. In particular, when the value of the fracture toughness is 8 MPa·m$^{1/2}$ or more and less than 9 MPa·m$^{1/2}$, the zirconia sintered body having the flexural strength of 1700 MPa or more, preferably 1800 MPa or more, can be obtained. When the value of the fracture toughness is 8 MPa·m$^{1/2}$ or more and less than 9 MPa·m$^{1/2}$, the flexural strength can be enhanced, at least, up to 2000 MPa. Preferably, when the value of the fracture toughness is 9 MPa·m$^{1/2}$ or more and less than 10 MPa·m$^{1/2}$, the zirconia sintered body having the flexural strength of 1600 MPa or more can be obtained. When the value of the fracture toughness is 9 MPa·m$^{1/2}$ or more and less than 10 MPa·m$^{1/2}$, the flexural strength can be enhanced, at least, up to 1800 MPa. When the value of the fracture toughness is 10 MPa·m$^{1/2}$ or more and less than 12 MPa·m$^{1/2}$, the zirconia sintered body having the flexural strength of 1200 MPa or more, preferably 1500 MPa or more, can be obtained. When the value of the fracture toughness is 10 MPa·m$^{1/2}$ or more and less than 12 MPa·m$^{1/2}$, the flexural strength can be enhanced, at least, up to 1700 MPa.

The zirconia crystal particle in the interior of the zirconia sintered body of the present invention may have an average particle size of a primary particle of 0.1 μm to 5 μm. The average particle size of the primary particle may be given as an average value of major axes and minor axes of 100 primary particles chosen from a SEM (Scanning Electron Microscope) picture at random. According to the SEM picture, in the region from the burned surface to the depth of 5 μm, the zirconia crystal particles do not show a clear contour or boundary and are in a fused state. In an entire disclosure of the present invention, each value range includes a free intermediate value among the range even though it is not recited clearly, and the recitation of the intermediate value is omitted for convenience.

Next, a composition for sintering and a calcined body of the zirconia sintered body of the present invention will be explained. The composition for sintering and the calcined body of the zirconia sintered body are a precursor (an intermediate product) of the zirconia sintered body of the present invention. That is, on the basis of the composition for sintering and the calcined body of the zirconia sintered body of the present invention, a zirconia sintered body having at least one property among the above properties can be obtained. The composition for sintering includes a powder, a fluid that the powder is added to a solvent and a compact that the powder is molded into a predetermined shape.

The composition for sintering of the present invention includes partially-stabilized zirconia crystal particles, a simple substance of the element phosphorus or a compound including the element phosphorus, and a compound including boron.

Oxides such as calcium oxide, magnesium oxide, yttrium oxide, cerium oxide and the like are given as an example of a stabilizing agent for the partially-stabilized zirconia crystal particles. It is preferred that an amount of the stabilizing agent(s) is present enough to partially stabilize the zirconia particles. If yttrium oxide is used as the stabilizing agent(s), for example, the content rate of yttrium oxide may be preferably 2 mol % to 5 mol % (about 3 mass % to 9 mass %) to the partially-stabilized zirconium oxide. The content rate of the stabilizing agent(s) in the zirconia crystal particles may be measured by the inductively coupled plasma (ICP) emission spectroscopy, for example.

In the composition for sintering (unburned, green material), the surface (exposed surface) of the compact does not include more stabilizing agent(s) than the interior of the compact (shaped or molded body). Between a part to become the surface of the sintered body and a part to become the interior of the sintered body, the content rates of the stabilizing agent(s) are same.

The simple substance of the element phosphorus or the compound including the element phosphorus may be included in the zirconia crystal particles, may exist between the zirconia crystal particles. The zirconia crystal particles may be granulated. In view of the phase transition inhibitive effect, it is preferred that the content rate of the element phosphorus in the composition for sintering is $4\times10^{-5}$ mol or more, more preferably $4\times10^{-3}$ mol or more and further preferably $9\times10^{-3}$ mol or more to 1 mol of zirconium oxide. In view of the phase transition inhibitive effect, it is preferred that the content rate of the element phosphorus in the composition for sintering is $5\times10^{-2}$ mol or less, more preferably $4\times10^{-2}$ mol or less and further preferably $3\times10^{-2}$ mol or less to 1 mol of zirconium oxide. If two or more element phosphorus are included in one molecule of the compound including the element phosphorus, the content rate of the element phosphorus is calculated not on the basis of the number of molecules of the compound including the element phosphorus but on the basis of the number of atoms of the element phosphorus.

As a compound including phosphorus, phosphoric acid ($H_3PO_4$), aluminum phosphate ($AlPO_4$), magnesium phosphate ($Mg_3(PO_4)_2$), calcium phosphate ($Ca_3(PO_4)_2$), magnesium hydrogenphosphate ($MgHPO_4$), magnesium dihydrogenphosphate ($Mg(H_2PO_4)_2$), calcium hydrogenphosphate ($CaHPO_4$), ammonium dihydrogenphosphate (($NH_4$)$H_2PO_4$), and the like may be mentioned, for example.

A compound including boron may be included in the zirconia crystal particle or may exist between the zirconia crystal particles. It is preferred that the content rate of boron (element) in the composition for sintering is $4\times10^{-5}$ mol or more, more preferably $8\times10^{-3}$ mol or more to 1 mol of zirconium oxide. It is preferred that the content rate of boron (element) is at least $4\times10^{-2}$ mol or less to 1 mol of zirconium oxide.

As a compound including boron, boron oxide ($B_2O_3$), boron nitride (BN), boron carbide ($B_4C$), boric acid ($H_3BO_3$, $HBO_2$, $H_2B_4O_7$), a compound of boron and an element which can be added as a stabilizing agent and additive agent in the present invention (for example, Zr, Al, Si, Y, P etc.), and the like may be used, for example.

It is preferred that the composition for sintering of the present invention further includes aluminum oxide (preferably alpha-alumina). Aluminum oxide may be included in the zirconia crystal particle or may exist between the zirconia crystal particles. It is preferred that the content rate of aluminum oxide in the composition for sintering is $2\times10^{-3}$ mol or more, more preferably $5\times10^{-2}$ mol or more to 1 mol of zirconium oxide. It is preferred that the content rate of aluminum oxide in the composition for sintering is 0.5 mol or less, more preferably 0.3 mol or less and more preferably 0.2 mol or less to 1 mol of zirconium oxide.

An aspect ratio of aluminum oxide existing in the compound for sintering is less than 2 in two-dimensional observation. At least a part of aluminum oxide existing in the composition for sintering becomes a columnar or a needle shape at the time of the sintering of partially-stabilized zirconia (for example, the aspect ratio is 5 or more, more preferably 10 or more).

The compound for sintering may include an inorganic composite(s) (for example, spinel, mullite and the like) including the ingredient of $Al_2O_3$ in addition to aluminum oxide or instead of aluminum oxide.

It is preferred that the composition for sintering in the present invention further includes silicon dioxide. Silicon dioxide may be included in the zirconia crystal particles or may exist between the zirconia crystal particles. If the element phosphorus and silicon dioxide are included in the composition for sintering, the phase transition inhibitive effect on the low-temperature degradation of the zirconia sintered body can be further enhanced than the case of the element phosphorus alone. In view of the phase transition inhibitive effect, it is preferred that the content rate of silicon dioxide in the composition for sintering in the present invention is $7 \times 10^{-4}$ mol or more, more preferably $1 \times 10^{-3}$ mol or more, and further preferably $2 \times 10^{-3}$ mol or more to 1 mol of zirconium oxide. In view of the phase transition inhibitive effect, it is preferred that the content rate of silicon dioxide in the composition for sintering in the present invention is $7 \times 10^{-2}$ mol or less, more preferably $3 \times 10^{-2}$ mol or less, and further preferably $2 \times 10^{-2}$ mol or less to 1 mol of zirconium oxide.

The composition for sintering may include a substance to become silicon dioxide by the burning (for example, $(C_2H_5O)_4Si$, $Si_3N_4$, Si) in addition to silicon dioxide or instead of silicon dioxide. The composition for sintering may include an inorganic composite(s) including the ingredient of $SiO_2$ (for example, mullite).

The particle size of the zirconia crystal particle is not specially limited. The suitable particle size may be determined for obtaining a desired sintered body.

The composition for sintering may be a powder, paste or wet composition (that is, it may be in a solvent or may include a solvent). The composition for sintering may include an additive agent(s) such as a binder.

If the composition for sintering in the present invention is a compact, it may be formed by any shaping (or compacting) method and may be formed by press molding, injection molding, and stereolithography, for example. The compact of the present invention may be also formed by multi-step processing. A CIP (Cold Isostatic Pressing) may be further applied to the composition for sintering of the present invention after the press molding, for example.

The composition for sintering of the present invention may include low-stabilized zirconia particles including a stabilizing agent(s) or not, and high-stabilized zirconia particles which include a stabilizing agent(s) more than the low-stabilized zirconia particles. That is, a plurality of zirconia particles having different content rates (or concentrations) of the stabilizing agent(s) may be mixed. It is preferred that the content rate of the stabilizing agent(s) in the low-stabilized zirconia particles is 0 mol % or more and less than 2 mol % to the total molar number of zirconium oxide and the stabilizing agent(s). It is preferred that the content rate of the stabilizing agent(s) of the high-stabilized zirconia particles is 2 mol % or more and less than 8 mol % to the total molar number of zirconium oxide and the stabilizing agent(s). It is preferred that the content rate of the stabilizing agent(s) of the high-stabilized zirconia particles is by 0.5 mol % to 7 mol % higher than the content rate of the stabilizing agent(s) of the low-stabilized zirconia particles, more preferably by 1 mol % to 7 mol %, and further preferably by 1.5 mol % to 7 mol %. For example, the content rate of the stabilizing agent(s) of the low-stabilized zirconia particles may be 1 mol %, and the content rate of the stabilizing agent(s) of the high-stabilized zirconia particles may be 3 mol %. As to a mixing ratio of the low-stabilized zirconia particles and high-stabilized zirconia particles, it is preferred that the content rate of the low-stabilized zirconia particles is 5 mass % to 40 mass % to the total mass(weight) of the low-stabilized zirconia particles and high-stabilized zirconia particles, more preferably 10 mass % to 30 mass % and more preferably 15 mass % to 25 mass %. Thereby, a standard deviation of the content of the stabilizing agent(s) is obtained enough to enhance the fracture toughness.

In the present invention, two kinds of zirconia particles that are "high-stabilized zirconia particle" and "low-stabilized zirconia particle" are mixed. However three or more kinds of zirconia particles having different content rates of the stabilizing agent(s) may be mixed. In this case, by suitably adjusting the content rate and the mixing ratio of the stabilizing agent(s) of each zirconia particle, the standard deviation of the contents of the stabilizing agent(s) is adjusted.

The composition for sintering of the present invention is turned to the zirconia sintered body of the present invention by burning it at a temperature ranging from 1350 degrees Celsius to 1550 degrees Celsius. Aluminum oxide existing in the composition for sintering becomes a columnar or a needle crystal at the time of the sintering of zirconia particles (preferably it has 2 or more aspect ratio, more preferably 5 or more, and further preferably 10 or more).

The composition for sintering of the present invention is turned to the calcined body for the zirconia sintered body of the present invention by burning it at a temperature ranging from 800 degrees Celsius to 1200 degrees Celsius.

The calcined body of the present invention is made by burning the composition for sintering of the present invention at a temperature which is insufficient to sinter the zirconia particles or by partially sintering the zirconia particles of the composition for sintering of the present invention. The content rates of the element phosphorus, the element boron, aluminum oxide and silicon dioxide in the calcined body of the present invention are same as those in the composition for sintering of the present invention and therefore explanations are omitted.

The calcined body of the present invention is obtained by burning the composition for sintering of the present invention at a temperature ranging from 800 degrees Celsius to 1200 degrees Celsius. In the sample surface of the calcined body, it is preferred that the stabilizing agent(s) exists unevenly as a whole.

The calcined body of the present invention is turned to the zirconia sintered body of the present invention by burning it at a temperature ranging from 1350 degrees Celsius to 1600 degrees Celsius.

Next, manufacturing methods of the zirconia sintered body of the invention, and the composition for sintering and the calcined body of the zirconia sintered body of the invention will be explained.

As one exemplary embodiment of the present invention, a manufacturing method in which desired amounts of the element boron, the element phosphorus and silicon dioxide are not included in the zirconia crystal particle will be explained below.

First, partially-stabilized zirconia crystal particles are prepared. A kind of a stabilizing agent(s) and a content of the stabilizing agent(s) may be suitably determined. In order to make a content distribution of the stabilizing agent(s) uneven, high-stabilized zirconia crystal particles and low-stabilized zirconia crystal particles may be used. A particle size and a particle size distribution of zirconia crystal particles may be suitably determined.

As a method for adding a stabilizing agent(s) to the zirconia crystal particles, a hydrolysis method, neutralization coprecipitation method, alkoxide method, solid phase method and the like may be used. When $ZrO_2$ with solid-solute $Y_2O_3$ obtained by the solid phase method is used to make the sintered body, the fracture toughness can be enhanced. In particular, if the zirconia sintered body including phosphorus is made by the solid phase method, the zirconia sintered body can have higher fracture toughness by the synergistic effect.

Secondly, the composition for sintering of the present invention is made by mixing the zirconia crystal particles, the compound including the element phosphorus or the simple substance of the element phosphorus, and the compound including boron.

It is preferred that an additive amount of the element phosphorus is $4 \times 10^{-5}$ mol or more, more preferably $4 \times 10^{-3}$ mol or more and further preferably $9 \times 10^{-3}$ mol or more to 1 mol of zirconium oxide. In view of the phase transition inhibitive effect, it is preferred that the additive amount of phosphorus is $5 \times 10^{-2}$ mol or less, more preferably $4 \times 10^{-2}$ mol or less, and further preferably $3 \times 10^{-2}$ mol or less to 1 mol of zirconium oxide. If two or more of the element phosphorus are included in one molecule of the compound including the element phosphorus, the amount of the element phosphorus is calculated not on the basis of the molecule number of the compound including the element phosphorus but on the basis of the number of the atom of the element phosphorus.

The compound including the element phosphorus may be an inorganic compound or organic compound. If the inorganic compound is used, phosphoric acids and phosphates, for example, may be used. In this case, phosphoric acid ($H_3PO_4$), aluminum phosphate ($AlPO_4$), magnesium phosphate ($Mg_3(PO_4)_2$), calcium phosphate ($Ca_3(PO_4)_2$), magnesium hydrogenphosphate ($MgHPO_4$), magnesium dihydrogenphosphate ($Mg(H_2PO_4)_2$), calcium hydrogenphosphate ($CaHPO_4$), ammonium dihydrogenphosphate ($(NH_4)H_2PO_4$, and the like may be used, for example. If the organic compound is used, phosphine oxides may be used, for example.

If the zirconia sintered body of the present invention is used for a human body like a dental prosthesis, it is preferred that the compound including the element phosphorus has a little bad influence on a human body and more preferably is harmless to a human body.

It is preferred that an additive amount of boron (element) is $4 \times 10^{-5}$ mol or more, more preferably $8 \times 10^{-3}$ mol or more to 1 mol of zirconium oxide. It is preferred that the additive amount of boron (element) is $4 \times 10^{-2}$ mol or less to 1 mol of zirconium oxide. If two or more of the element boron are included in one molecule of the compound including the element boron, the amount of the element boron is calculated not on the basis of the molecule number of the compound including the element boron but on the basis of the number of the atom of the element boron.

For example, boron oxide ($B_2O_3$), boron nitride (BN), boron carbide ($B_4C$), boric acid ($H_3BO_3$, $HBO_2$, $H_2B_4O_7$), a compound of boron and an element(s) which can be added as a stabilizing agent and additive agent (for example, Zr, Al, Si, Y, P etc.), and the like, may be used as a compound including boron.

It is preferred that aluminum oxide (preferably alpha-alumina) is further added to the composition for sintering. It is preferred that an additive amount of aluminum oxide is $2 \times 10^{-3}$ mol or more, more preferably $5 \times 10^{-2}$ mol or more. It is preferred that the additive amount of aluminum oxide is 0.5 mol or less, more preferably 0.3 mol or less and more preferably 0.2 mol or less to 1 mol of zirconium oxide.

It is preferred that silicon dioxide is further added to the composition for sintering. It is preferred that an additive amount of silicon dioxide is $7 \times 10^{-4}$ mol or more, more preferably $1 \times 10^{-3}$ mol or more, and further preferably $2 \times 10^{-3}$ mol or more to 1 mol of zirconium oxide. It is preferred that the additive amount of silicon dioxide is $7 \times 10^{-2}$ mol or less, more preferably $3 \times 10^{-2}$ mol or less, and further preferably $2 \times 10^{-2}$ mol or less to 1 mol of zirconium oxide. A substance which is converted to silicon dioxide by the burning (for example, $(C_2H_5O)_4Si$, $Si_3N_4$, Si) may be used in addition to silicon dioxide or instead of silicon dioxide. An inorganic composite including the ingredient of $SiO_2$ (for example, mullite) may be used.

A particle size of the zirconia crystal particle is suitably determined.

A binder may be added to the composition for sintering. Whether or not the binder is added may be suitably determined according to a manufacturing purpose of the sintered body. If the binder is used, a binder of an acrylic type may be used, for example.

A mixing method may be wet mixing or dry mixing. If the wet mixing is performed, water, alcohol and the like may be used as a solvent, for example. The mixing is performed by a manual mixing or mechanical mixing. If the zirconia crystal particles before the mixing form secondary particles, it is preferred that the secondary particles are collapsed as much as possible before the mixing if possible.

Thirdly, the composition for sintering is shaped (formed) to a desired form by the press molding. Preferred methods may be appropriately determined as the press molding method. Applied pressure may be 20 MPa or more, for example. After the press molding, the CIP (Cold Isostatic Pressing) may be applied to the composition for the sintering at a pressure of 150 MPa or more, for example.

Before the press molding, the composition for sintering may be a granule of the zirconia particles. If a solvent is used in the mixing, the solvent is removed before the press molding or a preparatory molding. The solvent may be removed by spray drier when the particles are granulated or by an oven drying.

The composition for sintering may be processed to be a desired shape by grinding or the like after press molding.

Fourthly, the calcined body may be made by calcining the composition for sintering before the sintering. A calcining condition may be determined to be at a calcining temperature of 800 degrees Celsius to 1200 degrees Celsius for a retention time of 1 hour to 3 hours, for example.

The calcined body may be processed to be a desired shape by grinding or the like after the calcining.

Fifthly, the zirconia sintered body is made by burning (sintering) the composition for sintering or the calcined body to sinter the zirconia particles. It is preferred that the burning temperature is 1350 degrees Celsius or more. If the element phosphorus and the element boron are included, it is preferred that the burning temperature is 1350 degrees Celsius or more. If the burning temperature is low, the formation of the cubic system in the burned surface is not enough, and therefore resulting in insufficient inhibition of the low-temperature degradation. If the burning temperature is higher, the phase transition inhibitive effect on the low-temperature degradation can be improved. The zirconia sintered body of the present invention which is made, preferably, by being burned at a temperature of 1400 degrees Celsius or more and, more preferably, at a temperature of 1425 degrees Celsius or more can effectively inhibit the phase transition to the monoclinic crystal which may be caused by the hydrothermal treatment. It is considered that the reason is that the stabilizing agent(s) migrates to the surface by the burning and that a part of the surface becomes the cubic system.

The burning (sintering) may be performed under the atmosphere at an atmospheric pressure.

Sixthly, the HIP treatment may be further applied to the zirconia sintered body in order to be further densified.

Seventhly, after the zirconia sintered body is processed (or machined) to a desired shape, the zirconia sintered body may be burned at a temperature of 1350 degrees Celsius or more again. Thereby, the re-burned surface can be caused to include the cubic system (crystals) again.

In the above explanation of the method of manufacturing the zirconia sintered body, although the desired amounts of the element phosphorus, the element boron, aluminum oxide and silicon dioxide are not included in the zirconia crystal particles, at least one of them may be originally included in the zirconia crystal particles, or a part of the desired amounts of them may be included in the zirconia crystal particles. In such case, each additive amount is adjusted considering the content rates of the element phosphorus, the element boron, aluminum oxide and silicon dioxide in the zirconia crystal particles. If the desired amount of silicon dioxide is included in the zirconia crystal particles, for example, only the compounds including the element phosphorus is added when the composition for sintering is made. If a part of the desired amount of silicon dioxide is included in the zirconia crystal particles, the remnant of the desired amount of silicon dioxide in addition to the compound including the element phosphorus may be added when the composition for sintering is made. A method other than this is same as the above method.

EXAMPLES

Examples 1-24

Zirconia sintered bodies which have different content rates of each element and different sintering temperatures were made, a hydrothermal treatment that is an acceleration test of the low-temperature degradation was performed in each zirconia sintered body, the peak ratios of the monoclinic system in the zirconia sintered bodies were confirmed after the hydrothermal treatment. Values of the flexural strength and the fracture toughness in each zirconia sintered body were also measured.

In the Examples, yttrium oxide (yttria) was used as a stabilizing agent. Phosphoric acid was used as a compound including phosphorus to add phosphorus. Boron oxide or boric acid was used as a compound including boron to add boron. In Examples 1 to 24, a partially-stabilized zirconia crystal powder having one kind of the content rate of a stabilizing agent(s) was used without using several kinds of the partially-stabilized zirconia crystal powders having different content rates of the stabilizing agent(s). In Examples 1 to 22, the partially-stabilized zirconia crystal powder including 3 mol % of yttria was used (in Table 1, shown as [$3YZrO_2$]), in Example 23, the partially-stabilized zirconia crystal powder including 2.5 mol % of yttria was used (in Table 2, shown as [$2.5YZrO_2$]), in Example 24, the partially-stabilized zirconia crystal powder including 2 mol % of yttria was used (in Table 3, shown as [$2YZrO_2$]). As Comparative Example 1, a zirconia sintered body without adding phosphorus, boron and silicon dioxide was also made, in the same way as in Examples, the peak ratio of the monoclinic system after the hydrothermal treatment, and values of the flexural strength and the fracture toughness were measured. In Comparative Example 1, the partially-stabilized zirconia crystal powder including 3 mol % of yttria was used.

[Manufacture of Zirconia Sintered Body]

Blend ratios of raw materials in each Example are shown in Tables 1 to 3. A zirconia crystal powder used as a raw material is a partially-stabilized zirconia powder (made by Noritake Co., Ltd) including a predetermined content of yttrium oxide in the crystal particle(s). In Tables 1 to 3, [$Al_2O_3$] means aluminum oxide. Aluminum oxide used as a raw material is alpha-alumina in which its aspect ratio is about 1. [$B_2O_3$] means boron oxide, [P] means the element phosphorus, [$SiO_2$] means silicon dioxide, and [Binder] means an organic binder (for example, acrylic type binder) which is added in order to improve formability.

Each value in Tables 1 to 3 will be explained. Values in [Base] column show each content rate (mass %) of the partially-stabilized zirconia and aluminum oxide to the total mass(weight) of the partially-stabilized zirconia and aluminum oxide in a composition for sintering. Values in [addition rate] column show an addition rate to the total mass (base) of the partially-stabilized zirconia and aluminum oxide in a composition for sintering. For example, in Example 4, the base includes 92.6 mass % of $3YZrO_2$ and 7.4 mass % of aluminum oxide (total 100 mass %) in the composition for sintering. Boron oxide is added so that the mass(weight) of boron oxide corresponds to 0.1% of the total mass (100 mass %) of the base. Phosphoric acid is added so that the mass (weight) of the element phosphorus in phosphoric acid corresponds to 0.1% of the total mass (100 mass %) of the base. The same applies to silicon dioxide and a binder.

A manufacturing method of the zirconia sintered body will be explained. First, a composition for sintering were made by pulverizing partially-stabilized zirconia crystal particles, adding each raw material at combinations shown in Tables 1-3, and then mixing them in water.

Next, the solvent was removed by a spray drier and the zirconia particles were granulated. Next, the compositions for sintering were shaped by the press at a pressure of 30 MPa to compacts having a diameter of 19 mm and thickness of 2 mm. Next, each composition for sintering was burned at each temperature shown in Tables for 1.5 hours to make the zirconia sintered body. In the Examples, although the HIP treatment was not applied to the sintered bodies, if it is applied, the HIP treatment may be applied at 1400 degrees Celsius at 175 MPa to densify the sintered bodies, for example.

TABLE 1

| | Base/mass % | | Addition Rate to Base/% | | | |
|---|---|---|---|---|---|---|
| | $3YZrO_2$ | $Al_2O_3$ | $B_2O_3$ | P | $SiO_2$ | Binder |
| Example 1 | 100 | 0 | 0.2 | 0.1 | 0.2 | 6 |
| Example 2 | 99.8 | 0.2 | 0.2 | 0.1 | 0.2 | 6 |
| Example 3 | 92.6 | 7.4 | 0.1 | 0.05 | 0.2 | 6 |
| Example 4 | 92.6 | 7.4 | 0.1 | 0.1 | 0.2 | 6 |
| Example 5 | 92.6 | 7.4 | 0.1 | 0.15 | 0.2 | 6 |
| Example 6 | 92.6 | 7.4 | 0.1 | 0.2 | 0.2 | 6 |
| Example 7 | 92.6 | 7.4 | 0.1 | 0.3 | 0.2 | 6 |
| Example 8 | 92.6 | 7.4 | 0.15 | 0.1 | 0.2 | 6 |
| Example 9 | 92.6 | 7.4 | 0.2 | 0.05 | 0.2 | 6 |
| Example 10 | 92.6 | 7.4 | 0.2 | 0.1 | 0.2 | 6 |
| Example 11 | 92.6 | 7.4 | 0.2 | 0.15 | 0.2 | 6 |
| Example 12 | 92.6 | 7.4 | 0.2 | 0.2 | 0.2 | 6 |

TABLE 1-continued

| | Base/mass % | | Addition Rate to Base/% | | | |
|---|---|---|---|---|---|---|
| | 3YZrO$_2$ | Al$_2$O$_3$ | B$_2$O$_3$ | P | SiO$_2$ | Binder |
| Example 13 | 92.6 | 7.4 | 0.2 | 0.3 | 0.2 | 6 |
| Example 14 | 92.6 | 7.4 | 0.25 | 0.1 | 0.2 | 6 |
| Example 15 | 92.6 | 7.4 | 0.25 | 0.15 | 0.2 | 6 |
| Example 16 | 98.0 | 2.0 | 0.2 | 0.1 | 0.2 | 6 |
| Example 17 | 96.2 | 3.8 | 0.2 | 0.1 | 0.2 | 6 |
| Example 18 | 94.3 | 5.7 | 0.2 | 0.1 | 0.2 | 6 |
| Example 19 | 90.9 | 9.1 | 0.2 | 0.1 | 0.2 | 6 |
| Example 20 | 87.0 | 13.0 | 0.2 | 0.1 | 0.2 | 6 |
| Example 21 | 80.0 | 20.0 | 0.2 | 0.1 | 0.2 | 6 |
| Example 22 | 75.0 | 25.0 | 0.2 | 0.1 | 0.2 | 6 |
| Comparative Example 1 | 92.6 | 7.4 | 0 | 0 | 0 | 6 |

TABLE 2

| | Base/mass % | | Addition Rate to Base/% | | | |
|---|---|---|---|---|---|---|
| | 2.5YZrO$_2$ | Al$_2$O$_3$ | B$_2$O$_3$ | P | SiO$_2$ | Binder |
| Example 23 | 92.6 | 7.4 | 0.2 | 0.1 | 0.2 | 6 |

TABLE 3

| | Base/mass % | | Addition Rate to Base/% | | | |
|---|---|---|---|---|---|---|
| | 2YZrO$_2$ | Al$_2$O$_3$ | B$_2$O$_3$ | P | SiO$_2$ | Binder |
| Example 24 | 92.6 | 7.4 | 0.2 | 0.1 | 0.2 | 6 |

[Hydrothermal Treatment]

The hydrothermal treatment which is an acceleration test of low-temperature degradation was applied to each zirconia sintered body in the Examples. The test method was in conformity with ISO13356 other than temperature, pressure and processing time. Pure water for applying heat and pressure is put into a heat-resistant and pressure-resistant container (autoclave), and a sample is set in the container so as not to be soaked in the water. Next, after a lid was fixed to the container with bolts, the temperature in the container was increased to 180 degrees Celsius and the pressure was increased to about 1.0 MPa (10 atmospheric pressure). Each sample was kept in this state for 5 hours in the container.

[X-Ray Diffraction Measurement]

Next, in order to confirm a peak ratio of the monoclinic system of the sample of each Example after the hydrothermal treatment, an X-ray diffraction pattern of a surface of each sample after the hydrothermal treatment was measured. The X-ray diffraction pattern was measured with Cu-target, at 50 kV and 50 mA, using RINT-TTR III made by Rigaku Corporation. Tables 4-6 show the peak ratios of the monoclinic system of each sample for every sintering temperature (degree Celsius). The peak ratio of the monoclinic system shown in Tables 4-6 is a value that is 100 times multiplied of a ratio of a height of a peak existing near a position around 28° of 2θ where a monoclinic [11-1] peak appears to a height of a peak existing near a position around 30° of 2θ where a tetragonal [111] peak appears.

After all diffraction patterns were smoothed with Jade 6 which is an analytical software of an X-ray diffraction pattern, provided by Rigaku Corporation, the peak ratios were measured. In a background processing, a background threshold value a was set to 10.0. In the Examples of the present invention, the peak ratios were measured in the same manner.

[Test Result]

In each Example, the peak ratios of the monoclinic system could be lower than that in Comparative Example 1 even though the sintering temperature was 1350 degrees Celsius. In particular, the peak ratios of the monoclinic system could be further lowered if the burning temperature was 1425 degrees Celsius or more. Since in Examples of Japanese patent application No. 2009-192287, the effect of the decrease of the peak ratio of monoclinic system was high when the sintering temperature was 1525 degrees Celsius, it is considered that the sintering temperature which is necessary for the high phase transition inhibitive effect can be decreased by about 100 degrees Celsius or more by adding boron in addition to phosphorus. That is, in the present invention, a production cost can be further reduced.

In the Examples, it was found that the addition rate of boron oxide can be, at least, 0.1% to 0.25% to the total mass(weight) of partially-stabilized zirconia and alumina. In this case, $4.0 \times 10^{-3}$ mol to $1.0 \times 10^{-2}$ mol of the element boron was added to 1 mol of zirconium oxide. According to Examples 3 to 15, it was found that even though the addition rate of phosphorus was varied, at least, in a range of 0.05% to 0.3%, the high phase transition inhibitive effect can be obtained at low sintering temperature. In this case, $2.3 \times 10^{-3}$ mol to $1.4 \times 10^{-2}$ mol of the element phosphorus was added to 1 mol of zirconium oxide. According to Examples 16 to 22, it was found that even though the content rate of alumina in the base was varied, at least, in a range of 2 mass % to 25 mass %, the high phase transition inhibitive effect can be obtained at low sintering temperature. In this case, $2.6 \times 10^{-2}$ mol to 4.3 mol of alumina was added to 1 mol of zirconium oxide. According to Examples 23 and 24, it was found that even though the content of yttria in partially-stabilized zirconia was varied, at least, in a range of 2 mol % to 3 mol %, the high phase transition inhibitive effect can be obtained at low sintering temperature. According to Examples 1 and 2, it was found that even though aluminum oxide was not added or the addition rate of aluminum oxide was low, the phase transition inhibitive effect can be obtained at low sintering temperature.

TABLE 4

| | Burning Temperature | | | | | |
|---|---|---|---|---|---|---|
| | 1350 degrees Celsius | 1375 degrees Celsius | 1400 degrees Celsius | 1425 degrees Celsius | 1450 degrees Celsius | 1500 degrees Celsius |
| Example 1 | 35 | 6 | 4 | 0 | 0 | 0 |
| Example 2 | 35 | 6 | 4 | 0 | 0 | 0 |
| Example 3 | 18 | 10 | 9 | 5 | 4 | 0 |
| Example 4 | 15 | 10 | 10 | 5 | 4 | 0 |
| Example 5 | 16 | 9 | 7 | 4 | 2 | 0 |
| Example 6 | 16 | 9 | 6 | 4 | 2 | 0 |
| Example 7 | 15 | 8 | 6 | 4 | 2 | 0 |
| Example 8 | 18 | 7 | 6 | 2 | 0 | 0 |
| Example 9 | 20 | 6 | 3 | 3 | 0 | 0 |
| Example 10 | 21 | 6 | 3 | 4 | 0 | 0 |
| Example 11 | 23 | 5 | 2 | 0 | 0 | 0 |
| Example 12 | 24 | 6 | 3 | 0 | 0 | 0 |
| Example 13 | 25 | 7 | 4 | 0 | 0 | 0 |
| Example 14 | 25 | 7 | 2 | 0 | 0 | 0 |
| Example 15 | 24 | 9 | 3 | 0 | 0 | 0 |
| Example 16 | 33 | 6 | 4 | 0 | 0 | 0 |
| Example 17 | 31 | 4 | 3 | 0 | 0 | 0 |
| Example 18 | 28 | 5 | 3 | 0 | 0 | 0 |
| Example 19 | 16 | 6 | 3 | 0 | 0 | 0 |
| Example 20 | 15 | 7 | 2 | 0 | 0 | 0 |
| Example 21 | 12 | 7 | 2 | 0 | 0 | 0 |
| Example 22 | 10 | 5 | 0 | 0 | 0 | 0 |
| Comparative Example 1 | 56 | 66 | 134 | 255 | 211 | |

TABLE 5

| | Burning Temperature | | | | | |
|---|---|---|---|---|---|---|
| | 1350 degrees Celsius | 1375 degrees Celsius | 1400 degrees Celsius | 1425 degrees Celsius | 1450 degrees Celsius | 1500 degrees Celsius |
| Example 23 | 25 | 9 | 6 | 0 | 0 | 0 |

TABLE 6

| | Burning Temperature | | | | | |
|---|---|---|---|---|---|---|
| | 1350 degrees Celsius | 1375 degrees Celsius | 1400 degrees Celsius | 1425 degrees Celsius | 1450 degrees Celsius | 1500 degrees Celsius |
| Example 24 | 32 | 14 | 11 | 0 | 0 | 0 |

[Strength Measurement Test]

A flexural strength test was performed on the zirconia sintered bodies according to Examples 1 to 24 and Comparative Example 1. The hydrothermal treatment was not applied to measurement samples. The flexural strength test was performed in conformity to JISR1601. The test results are shown in Tables 7-9. The unit of the values of Tables 7-9 is MPa.

Even though boron was added, a decrease in the flexural strength was not observed. According to the present invention, the zirconia sintered body in which the progress of the phase transition is inhibited without decreasing the flexural strength can be obtained.

As compared with the strengths in Examples 1 and 2, those in Example 3 and subsequent Examples were higher. It is considered to be an effect caused by increasing the addition amount of aluminum oxide. In particular, it is considered that aluminum oxide whiskers formed in the zirconia sintered bodies (see FIGS. 1 to 15) contribute to the increase in the strength.

TABLE 7

| | Burning Temperature | | | | | |
|---|---|---|---|---|---|---|
| | 1350 degrees Celsius | 1375 degrees Celsius | 1400 degrees Celsius | 1425 degrees Celsius | 1450 degrees Celsius | 1500 degrees Celsius |
| Example 1 | | | 851 | | 901 | |
| Example 2 | | | 862 | | 914 | |
| Example 3 | | | 1124 | | | |
| Example 4 | 1049 | | 1134 | | 1194 | 970 |
| Example 5 | | | | | 1189 | |
| Example 6 | | | | | 1335 | |
| Example 7 | | | | | 1316 | |
| Example 8 | | | 1144 | 1221 | 1187 | 1031 |
| Example 9 | 1003 | 1034 | 1123 | 1211 | 1195 | 1001 |
| Example 10 | | | 1145 | 1192 | 1175 | 1054 |
| Example 11 | | | 1133 | 1179 | 1144 | |
| Example 12 | 942 | | 1093 | 1132 | 1099 | |
| Example 13 | 869 | | 1082 | 1079 | 1065 | 916 |
| Example 14 | | | 1054 | 1066 | 1138 | |
| Example 15 | | | 1012 | 1013 | 1108 | |
| Example 16 | | | 996 | | 1071 | |
| Example 17 | | | 1008 | | 1044 | |
| Example 18 | | | 1097 | | 1088 | |
| Example 19 | | | 1179 | | 1217 | |
| Example 20 | | | 1065 | | 1088 | |
| Example 21 | | | 1044 | | 1061 | |
| Example 22 | | | 970 | | 986 | |
| Comparative Example 1 | 987 | 1099 | 1056 | 1065 | | |

TABLE 8

| | Burning Temperature | | | | | |
|---|---|---|---|---|---|---|
| | 1350 degrees Celsius | 1375 degrees Celsius | 1400 degrees Celsius | 1425 degrees Celsius | 1450 degrees Celsius | 1500 degrees Celsius |
| Example 23 | | 1145 | 1153 | 1213 | 1198 | |

TABLE 9

| | Burning Temperature | | | | | |
|---|---|---|---|---|---|---|
| | 1350 degrees Celsius | 1375 degrees Celsius | 1400 degrees Celsius | 1425 degrees Celsius | 1450 degrees Celsius | 1500 degrees Celsius |
| Example 24 | | 1051 | 1066 | 1061 | 1037 | |

[Fracture Toughness Measurement Test]

A fracture toughness test was performed on the zirconia sintered bodies according to Examples 1 to 24 and Comparative Example 1. The hydrothermal treatment was not applied to the measurement samples. The fracture toughness test was performed in conformity to JISR1607. The test results are shown in Tables 10 to 12. The unit of the values of Tables 10 to 12 is $MPa \cdot m^{1/2}$.

A decrease in the value of the fracture toughness was not observed even though boron was added. In Examples 1 to 19 in which the content rate of alumina was 10 mass % or less in the base, the values of the fracture toughness higher than that in Comparative Example 1 were obtained. Thus, in the present invention, the zirconia sintered body, in which the progress of the phase transition is inhibited and the value of the fracture toughness is rather increased than not decreased, can be obtained.

TABLE 10

| | Burning Temperature | | | | | |
|---|---|---|---|---|---|---|
| | 1350 degrees Celsius | 1375 degrees Celsius | 1400 degrees Celsius | 1425 degrees Celsius | 1450 degrees Celsius | 1500 degrees Celsius |
| Example 1 | | | 10.3 | | 10.5 | |
| Example 2 | | | 10.2 | | 10.4 | |
| Example 3 | | | | | 8.3 | |
| Example 4 | 10.2 | | 10.1 | | 8.6 | 6.3 |
| Example 5 | | | | | 8.6 | |
| Example 6 | | | | | 8.9 | |
| Example 7 | | | | | 9.4 | |
| Example 8 | | | 9.9 | 9.9 | 8.4 | 8.1 |
| Example 9 | 10.2 | 10.1 | 10.3 | 10.2 | 10.1 | 9.7 |
| Example 10 | | | 9.8 | 10.2 | 9.7 | 9.2 |
| Example 11 | | | 10.2 | 10.1 | 9.9 | |
| Example 12 | 9.9 | | 9.9 | 10.2 | 10.3 | |
| Example 13 | 10.2 | | 10.3 | 10.1 | 9.7 | 9.4 |
| Example 14 | | | 10.1 | 10.2 | 8.2 | |
| Example 15 | | | 9.9 | 9.8 | 8.1 | |
| Example 16 | | | 10.2 | | 10.4 | |
| Example 17 | | | 10.3 | | 10.2 | |
| Example 18 | | | 9.9 | | 10.2 | |
| Example 19 | | | 9.2 | | 9.3 | |
| Example 20 | | | 8.1 | | 8.2 | |
| Example 21 | | | 7.6 | | 7.1 | |
| Example 22 | | | 7.1 | | 7.2 | |
| Comparative Example 1 | 8.6 | 8.8 | 7.9 | 5.5 | | |

TABLE 11

| | Burning Temperature | | | | | |
|---|---|---|---|---|---|---|
| | 1350 degrees Celsius | 1375 degrees Celsius | 1400 degrees Celsius | 1425 degrees Celsius | 1450 degrees Celsius | 1500 degrees Celsius |
| Example 23 | | 10.4 | 10.2 | 10.3 | 10.4 | |

TABLE 12

| | Burning Temperature | | | | | |
|---|---|---|---|---|---|---|
| | 1350 degrees Celsius | 1375 degrees Celsius | 1400 degrees Celsius | 1425 degrees Celsius | 1450 degrees Celsius | 1500 degrees Celsius |
| Example 24 | | 10.2 | 10.1 | 10.2 | 10.2 | |

According to Examples 1 to 24, a condition for obtaining the more preferred zirconia sintered body is that the addition rate of boron oxide is 0.2%, the addition rate of phosphorus is 0.1% to 0.15%, the sintering temperature is at 1425 degrees Celsius or more. For example, a product burned at 1425 degrees Celsius in Example 11 is the more preferred zirconia sintered body.

[Surface Observation]

Figure 2:
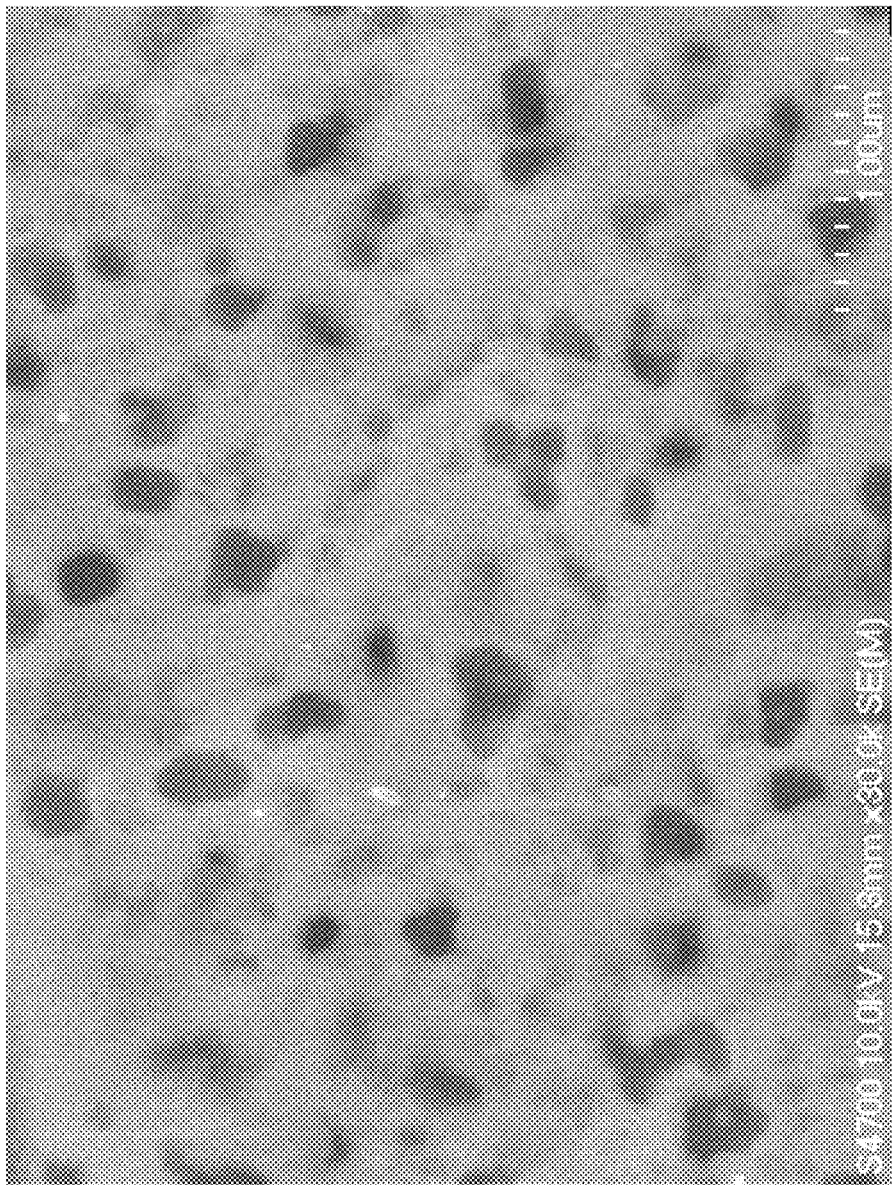
FIG. 2 is a SEM picture of a zirconia sintered body burned at 1350 degrees Celsius at 30,000 magnification, in Example 10.
Figure 3:
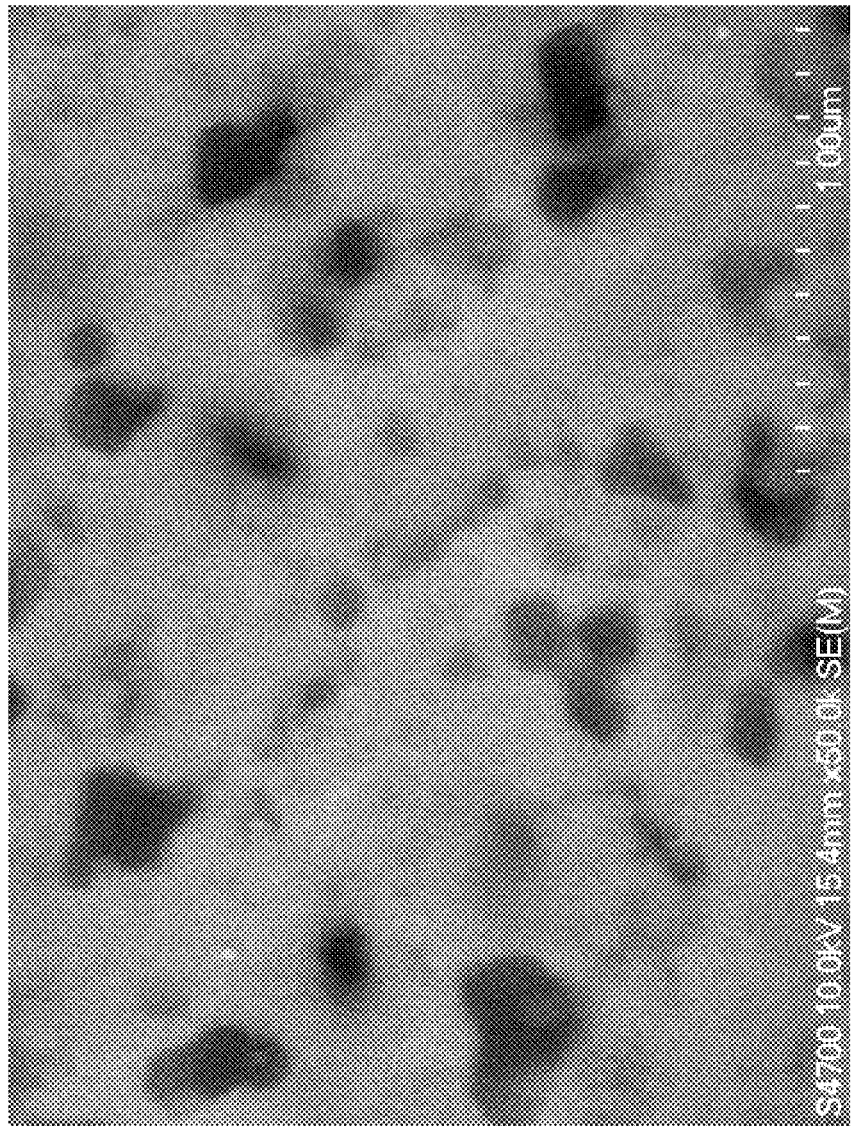
FIG. 3 is a SEM picture of a zirconia sintered body burned at 1350 degrees Celsius at 50,000 magnification, in Example 10.
Figure 4:
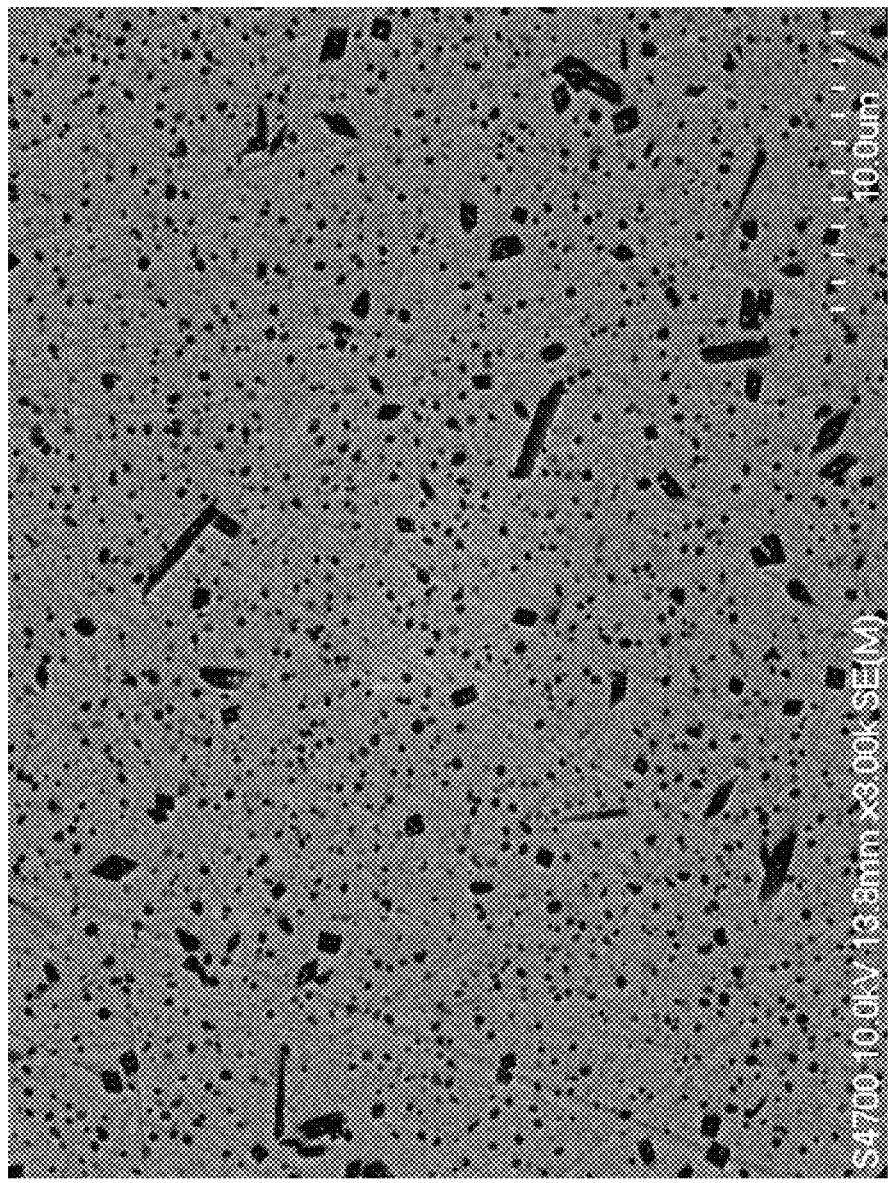
FIG. 4 is a SEM picture of a zirconia sintered body burned at 1375 degrees Celsius at 3,000 magnification, in Example 10.
Figure 5:
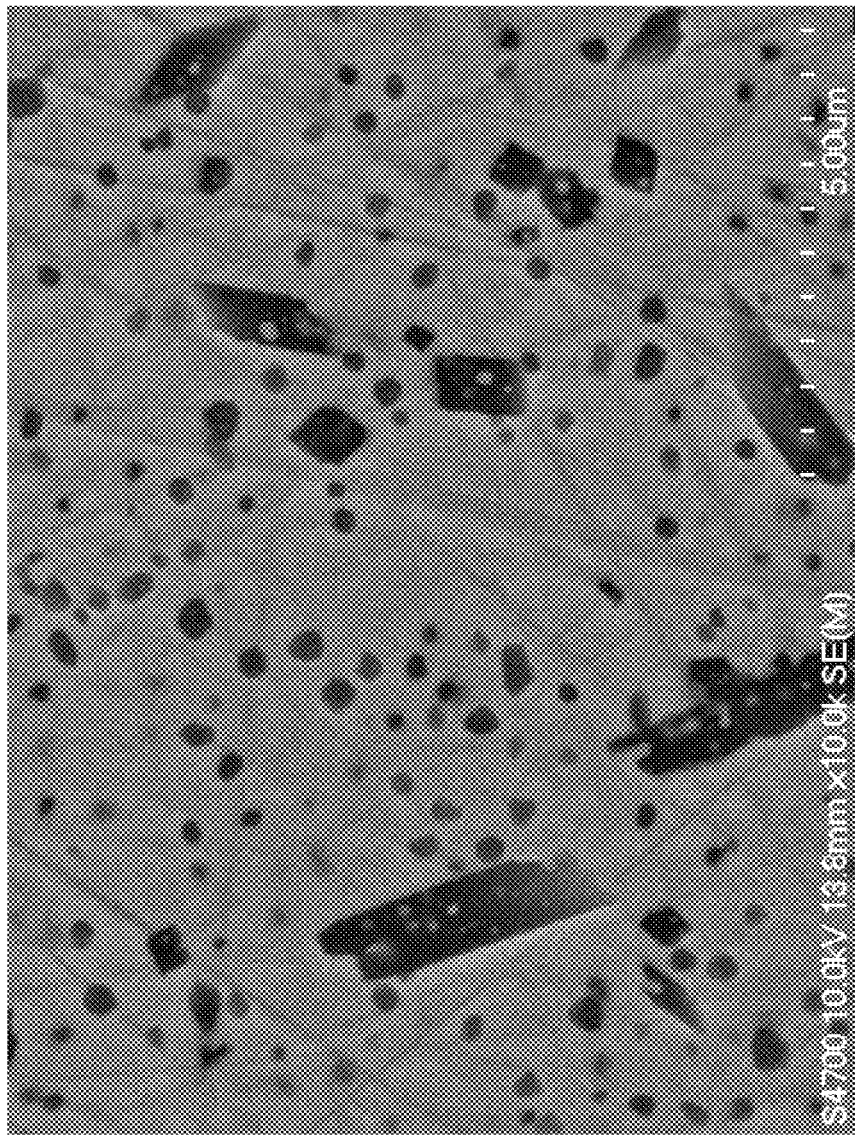
FIG. 5 is a SEM picture of a zirconia sintered body burned at 1375 degrees Celsius at 10,000 magnification, in Example 10.
Figure 6:
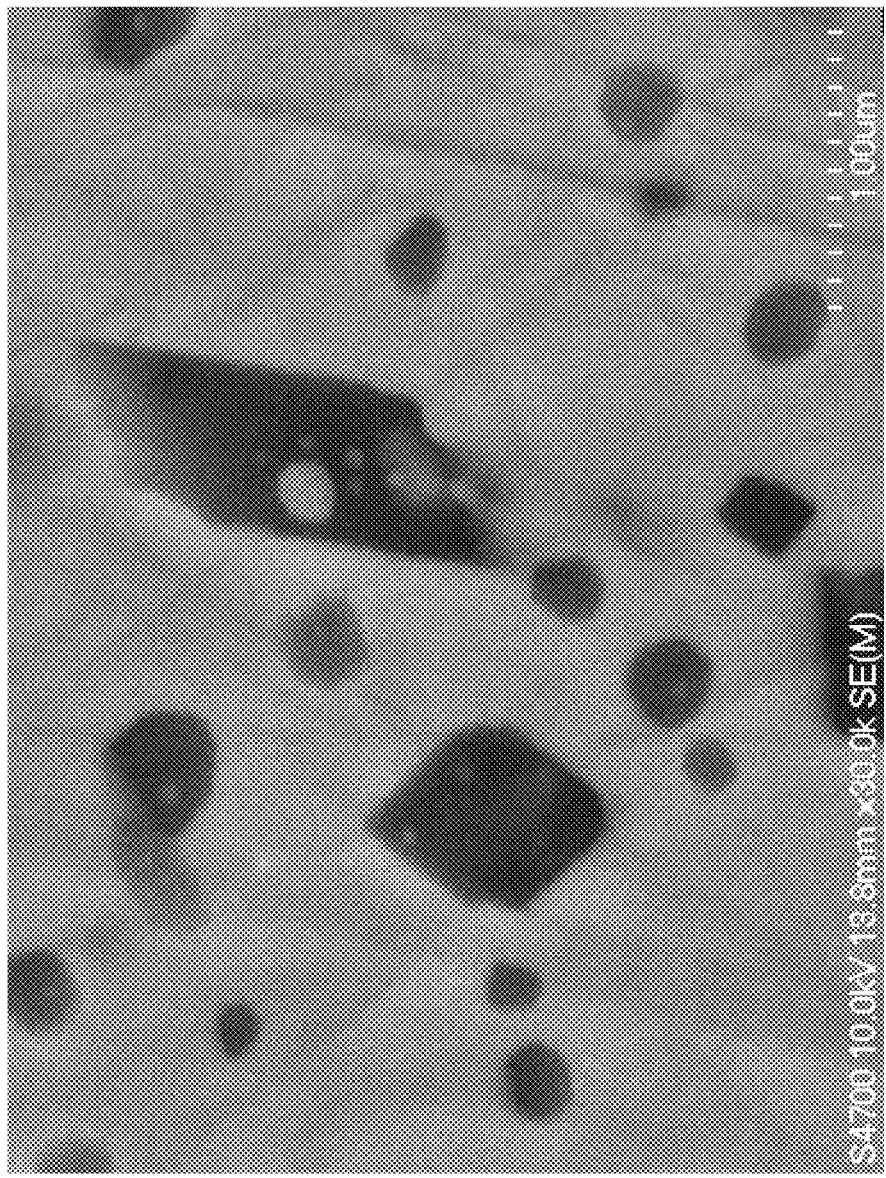
FIG. 6 is a SEM picture of a zirconia sintered body burned at 1375 degrees Celsius at 30,000 magnification, in Example 10.
Figure 7:
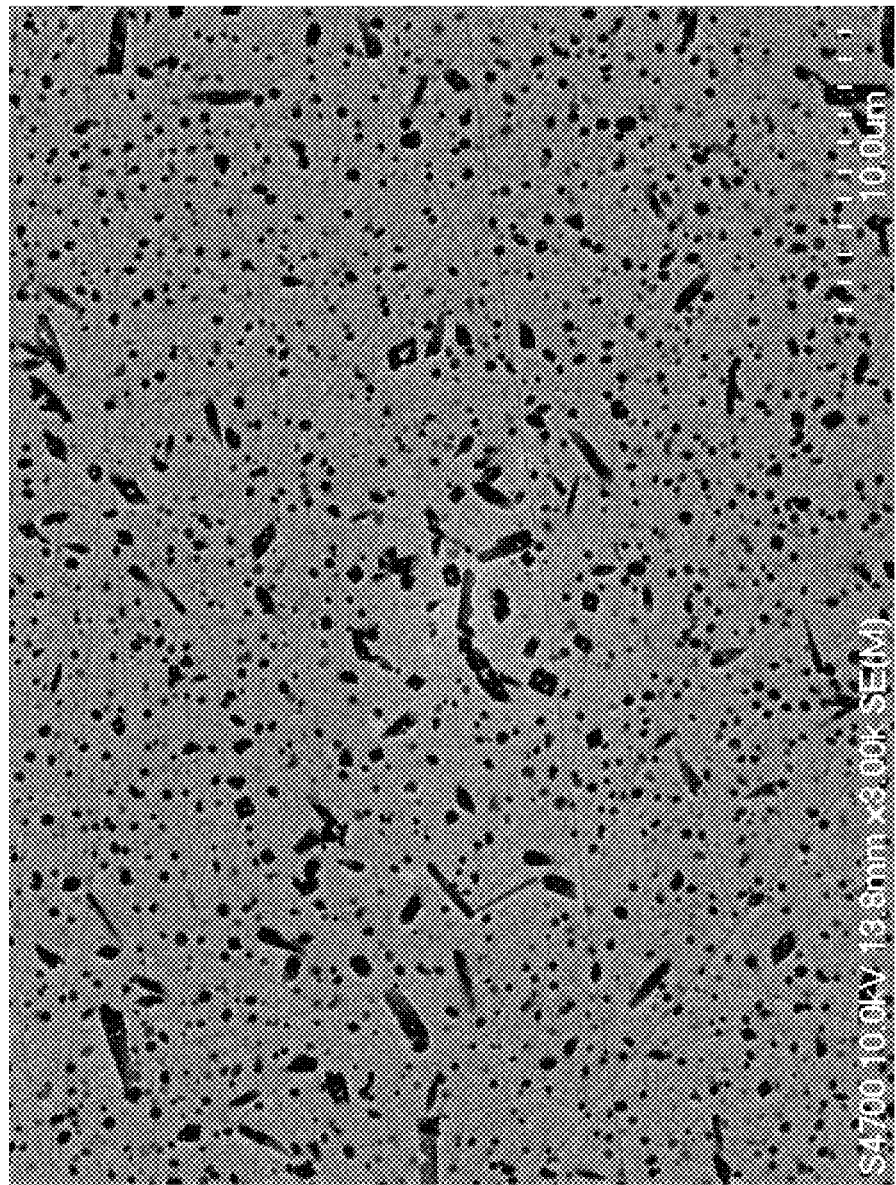
FIG. 7 is a SEM picture of a zirconia sintered body burned at 1400 degrees Celsius at 3,000 magnification, in Example 10.
Figure 8:
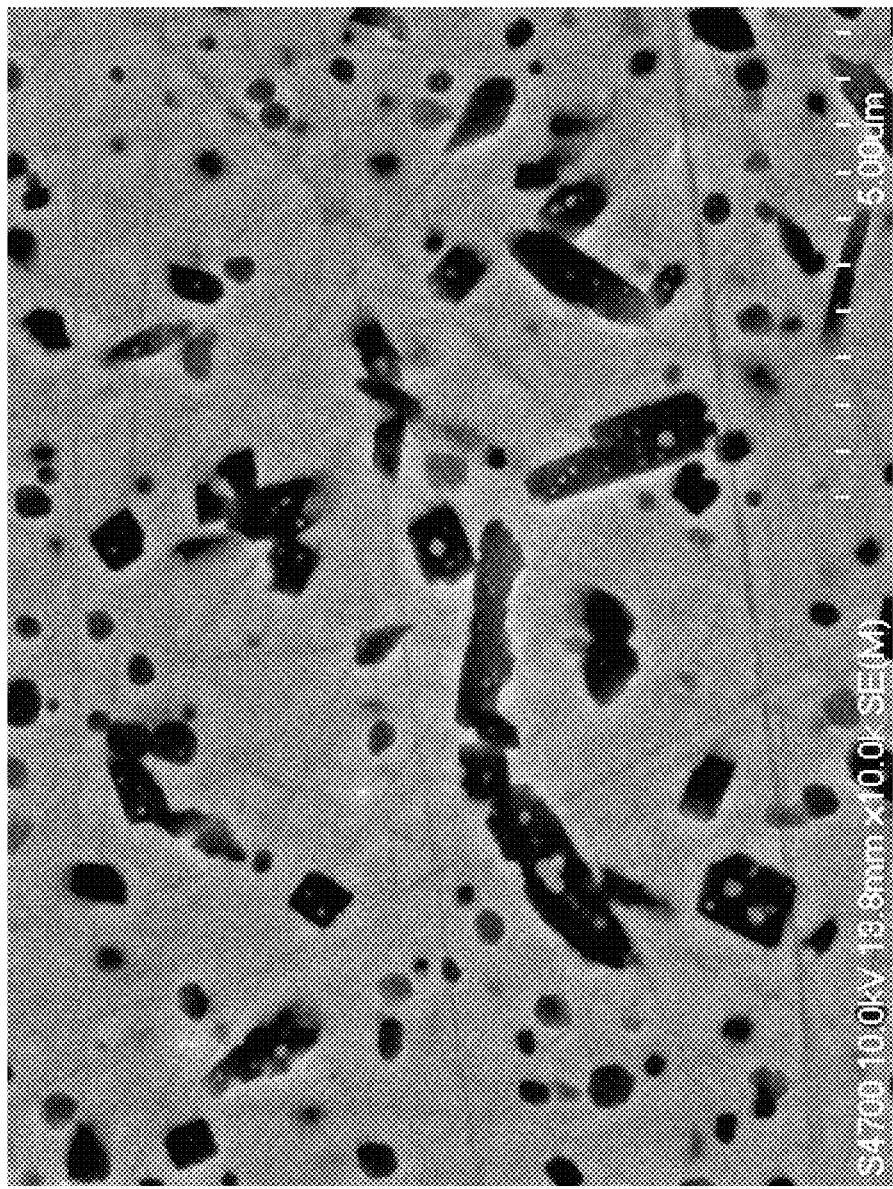
FIG. 8 is a SEM picture of a zirconia sintered body burned at 1400 degrees Celsius at 10,000 magnification, in Example 10.
Figure 9:
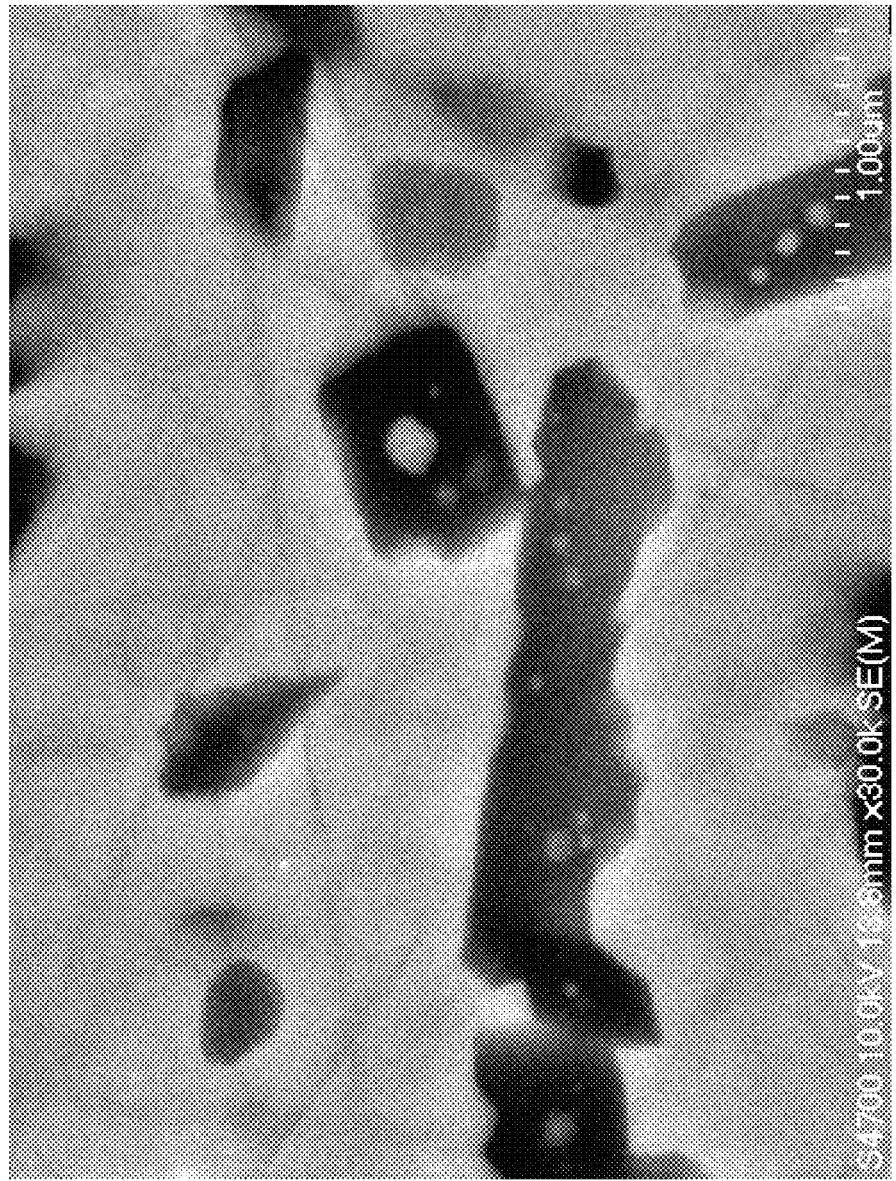
FIG. 9 is a SEM picture of a zirconia sintered body burned at 1400 degrees Celsius at 30,000 magnification, in Example 10.
Figure 10:
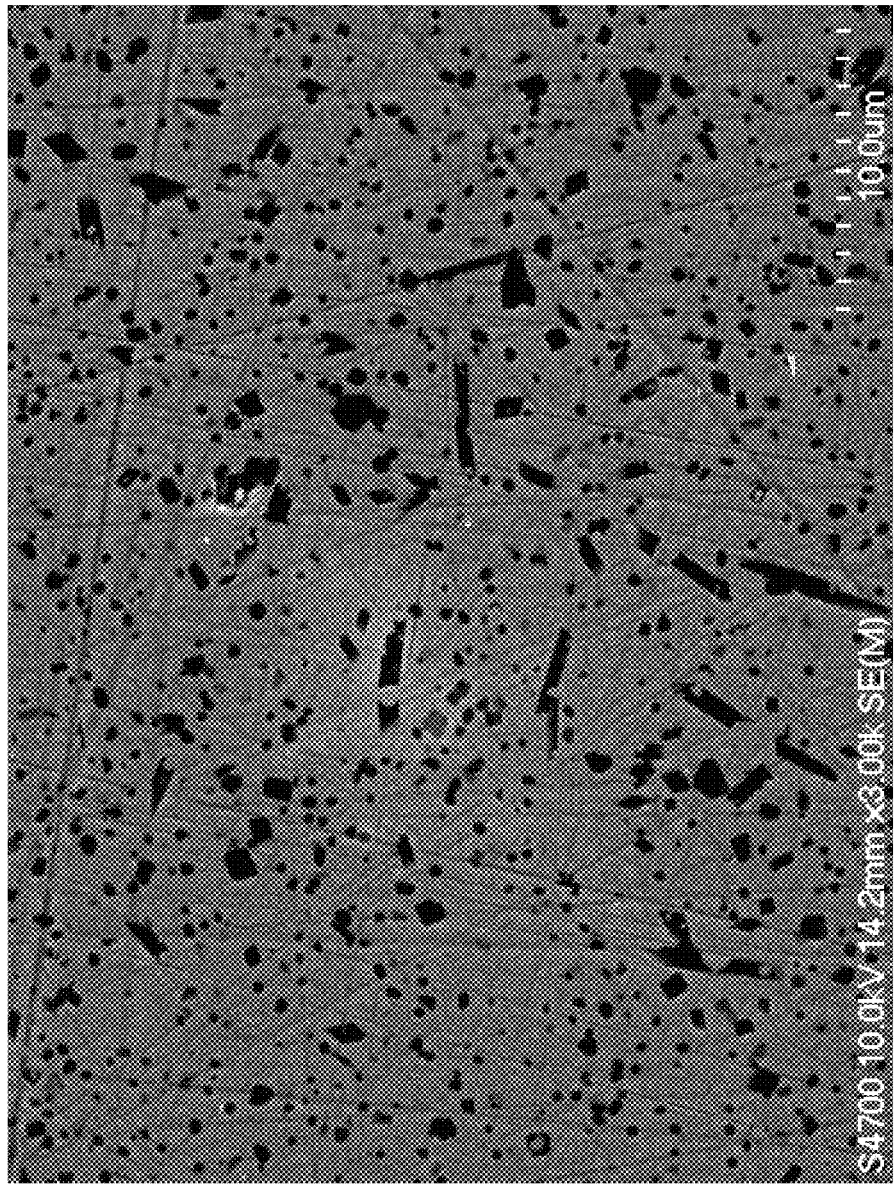
FIG. 10 is a SEM picture of a zirconia sintered body burned at 1450 degrees Celsius at 3000 magnification, in Example 10.
Figure 11:
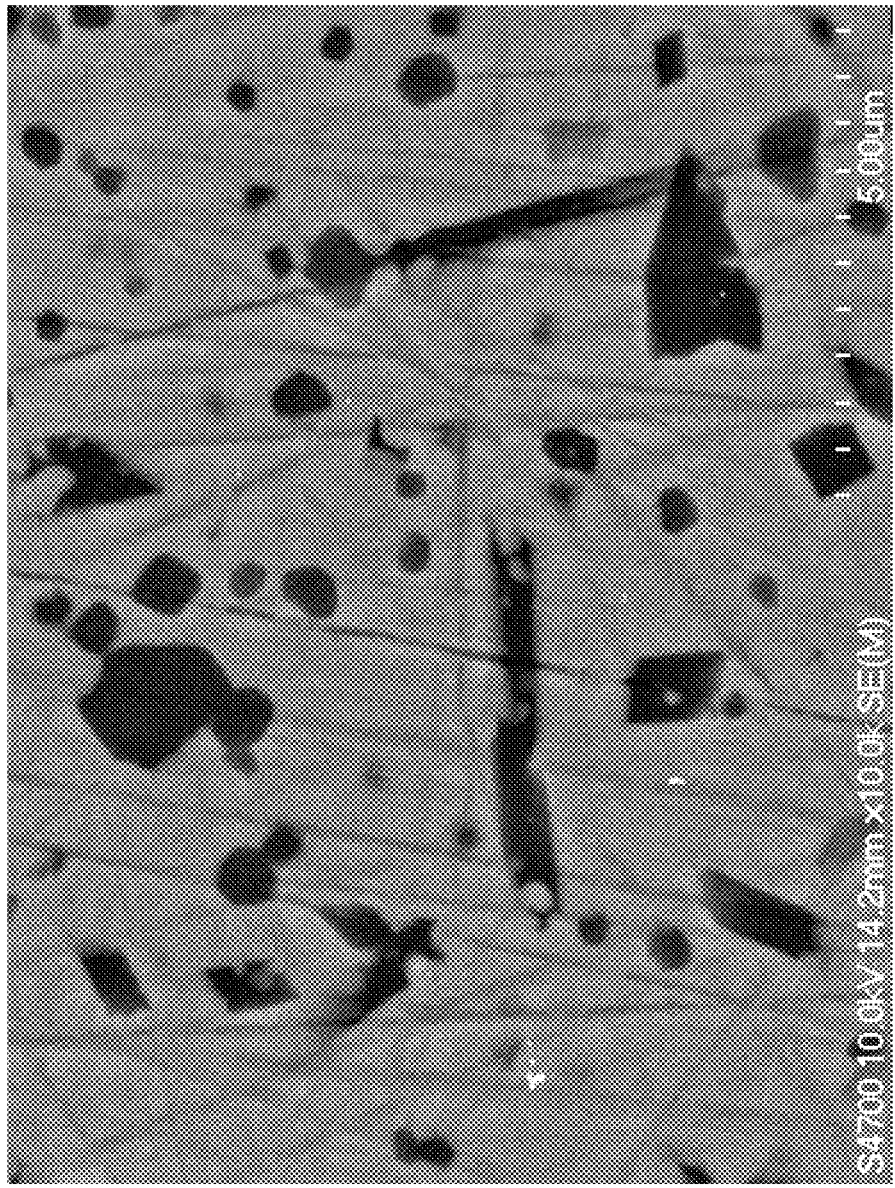
FIG. 11 is a SEM picture of a zirconia sintered body burned at 1450 degrees Celsius at 10000 magnification, in Example 10.
Figure 12:
FIG. 12 is a SEM picture of a zirconia sintered body burned at 1450 degrees Celsius at 30,000 magnification, in Example 10.
Figure 13:
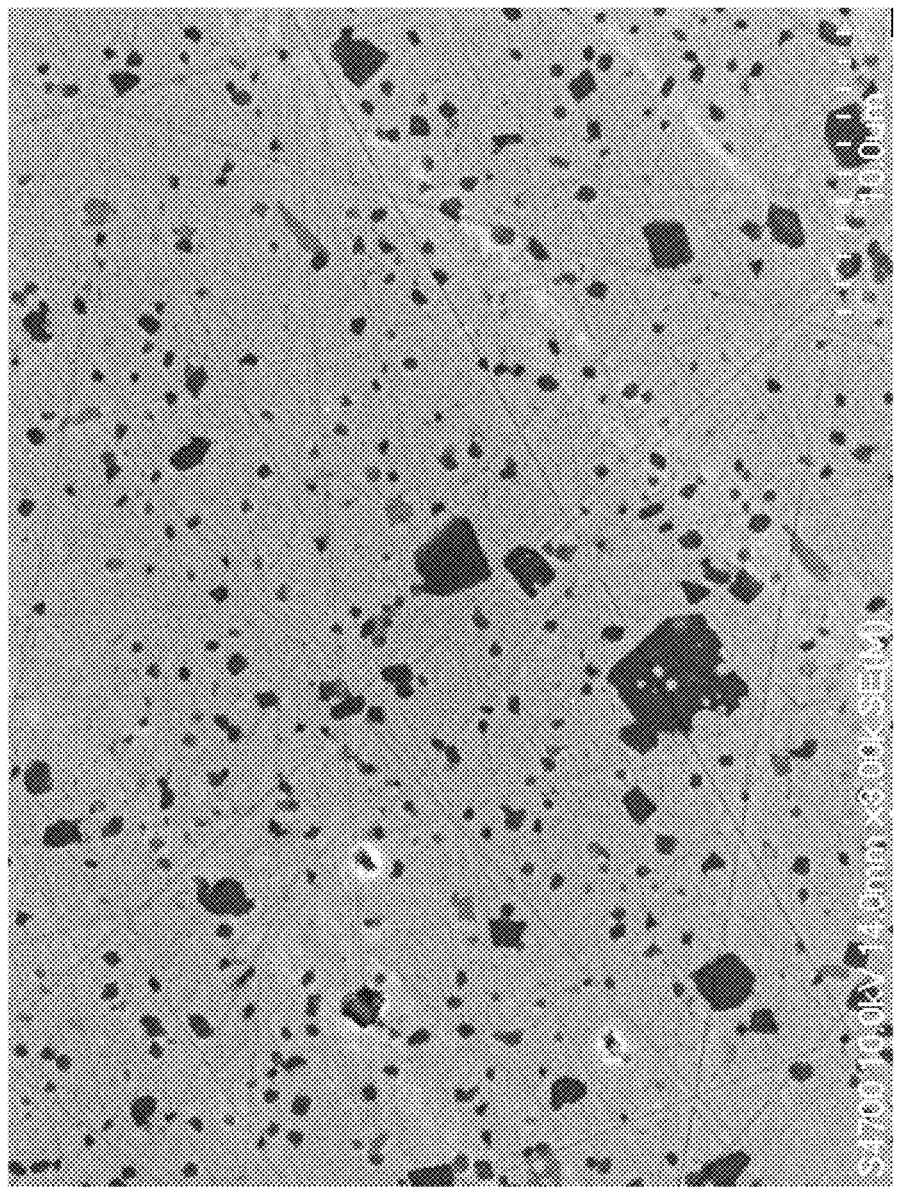
FIG. 13 is a SEM picture of a zirconia sintered body burned at 1500 degrees Celsius at 3,000 magnification, in Example 10.
Figure 14:
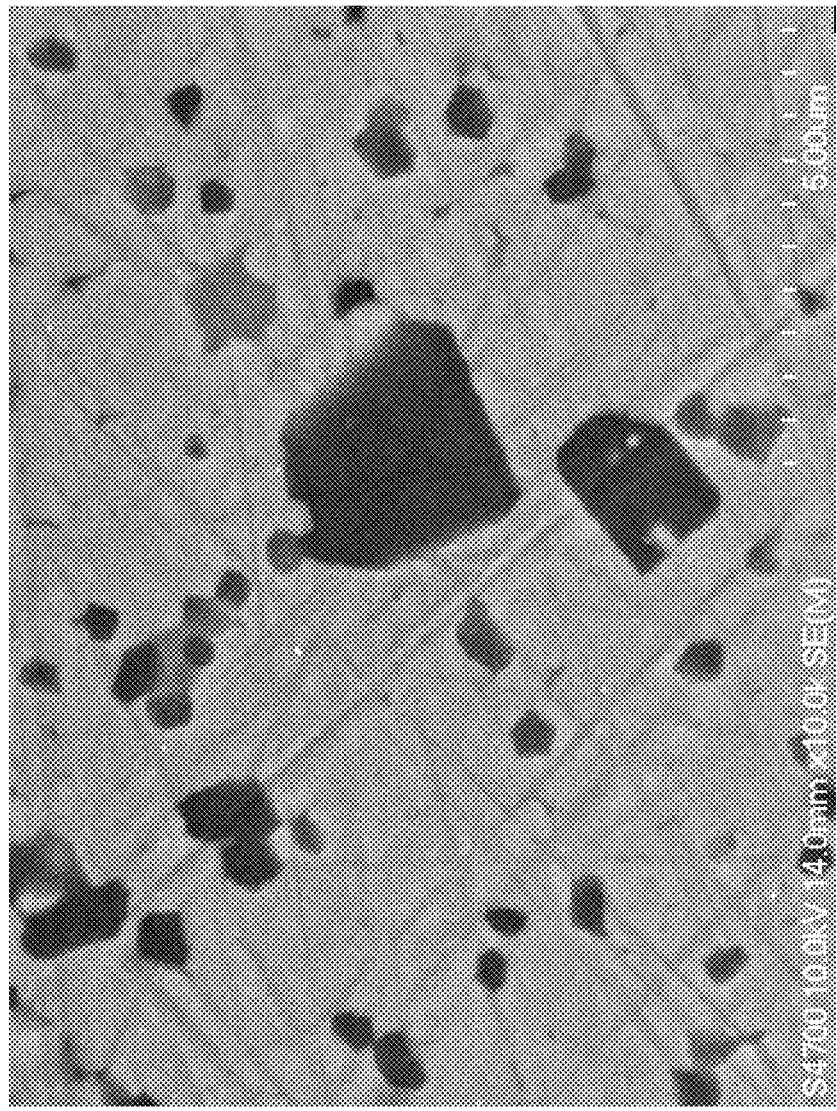
FIG. 14 is a SEM picture of a zirconia sintered body burned at 1500 degrees Celsius at 10,000 magnification, in Example 10.
Figure 15:
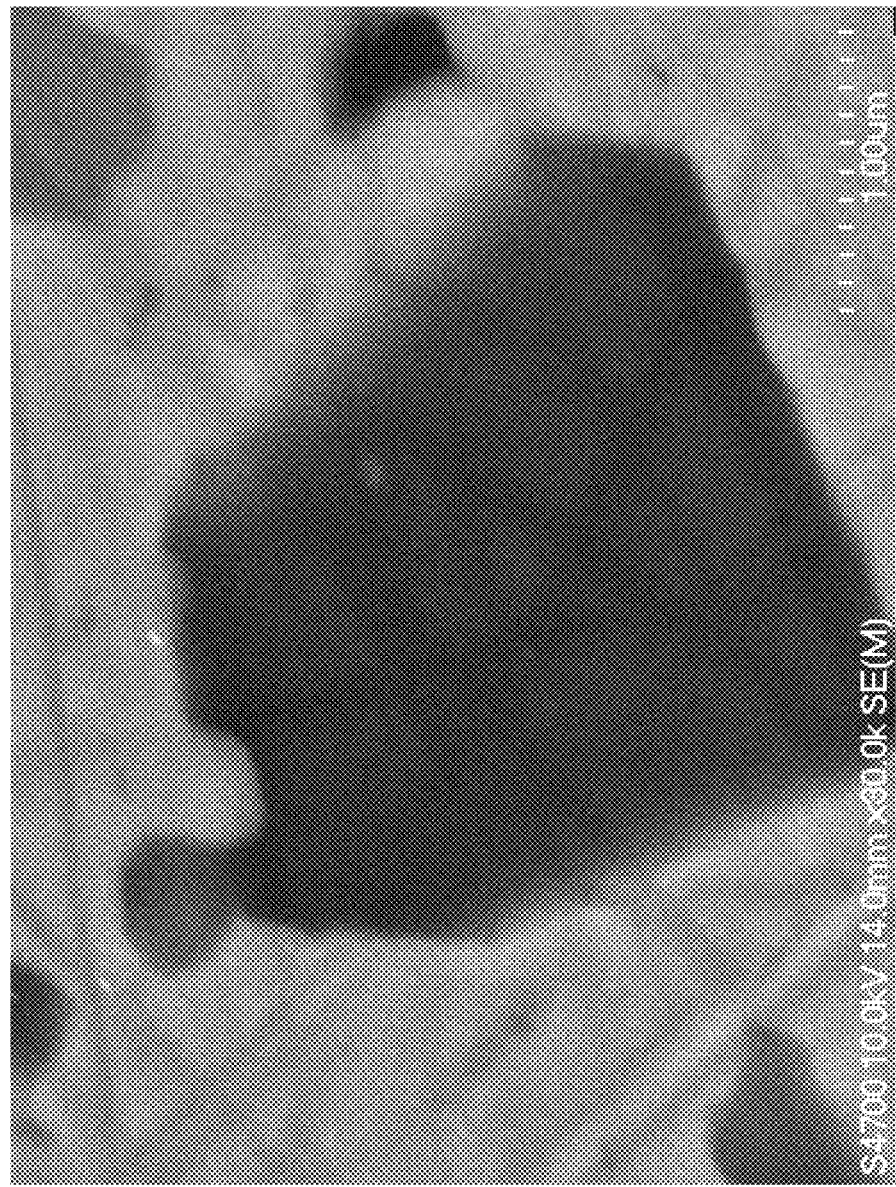
FIG. 15 is a SEM picture of a zirconia sintered body burned at 1500 degrees Celsius at 30,000 magnification, in Example 10.

In Example 10, a surface of each sample of zirconia sintered bodies which were burned at 1300 degrees Celsius, 1375 degrees Celsius, 1400 degrees Celsius, 1450 degrees Celsius and 1500 degrees Celsius was observed by Scanning Electron Microscope (SEM). Pictures by SEM are shown in FIGS. 1 to 15. The SEM pictures of surfaces of samples were taken with Field Emission Scanning Electron Microscope made by Hitachi, Ltd (model number S-4700) after lapping the surface of samples to be observed, with #2000 of abrasive grains. FIGS. 1 to 3 show SEM pictures of the sintered bodies burned at 1350 degrees Celsius, FIGS. 4 to 6 show SEM pictures of the sintered bodies burned at 1375 degrees Celsius, FIGS. 7 to 9 show SEM pictures of the sintered bodies which burned at 1400 degrees Celsius, FIGS. 10 to 12 show SEM pictures of the sintered bodies burned at 1450 degrees Celsius and FIGS. 13 to 15 show SEM pictures of the sintered bodies burned at 1500 degrees Celsius. FIGS. 4, 7, 10 and 13 are pictures at 3,000 magnification, FIGS. 1, 5, 8, 11 and 14 are pictures at 10,000 magnification, FIGS. 2, 6, 9, 12 and 15 are pictures at 30,000 magnification and FIG. 3 is a picture at 50,000 magnification.

In the sintered body burned at 1350 degrees Celsius, a presence of spherical crystals with small aspect ratios is confirmed. These crystals were found to be alpha-alumina by analyzing them with the X-ray diffraction. In the sintered body burned at 1375 degrees Celsius, in addition to grown spherical crystals, columnar or needle crystals were confirmed. These crystals were found to be alpha-alumina by analyzing them with the X-ray diffraction. Since such columnar crystals are not included in aluminum oxide used as a raw material, it is considered that aluminum oxide grew to be a columnar shape or a needle shape by the sintering under a presence of boron. When the burning temperature was 1375 degrees Celsius or more, the crystal shape of alumina grew in a direction of increasing the aspect ratio, and when the burning temperature was 1400 degrees Celsius or more, the ratio of the columnar crystal was further increased. However, it was found that once the burning temperature reached 1500 degrees Celsius, the aspect ratio of the columnar crystal tended to decrease. As far as the observation was performed by the electron microscope, the aspect ratio of the columnar crystal was 2 or more, the large aspect ratio was 10 or more.

According to the observation by the electron microscope, the columnar crystals had a length of 1 μm to 5 μm.

Figure 16:
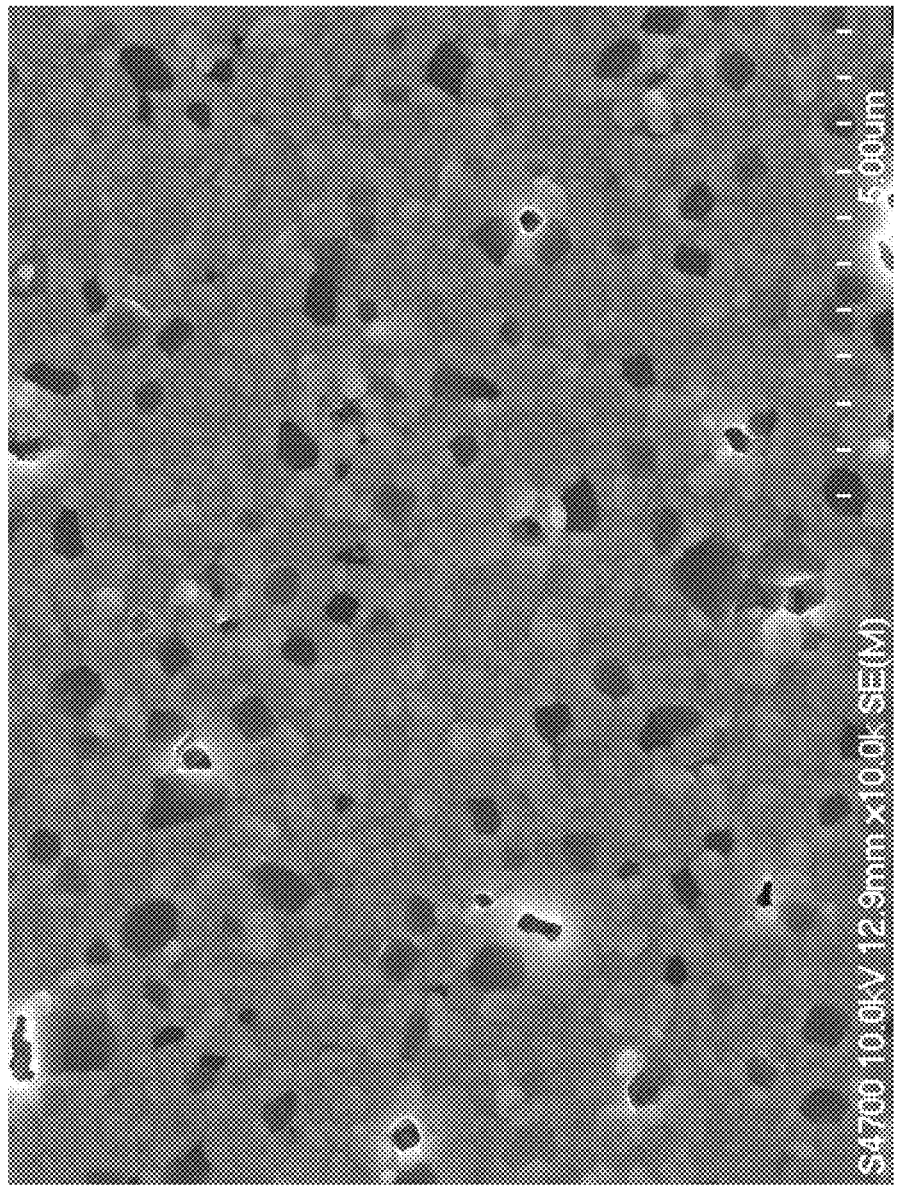
FIG. 16 is a SEM picture of a zirconia sintered body after thermal etching process at 10,000 magnification.
Figure 17:
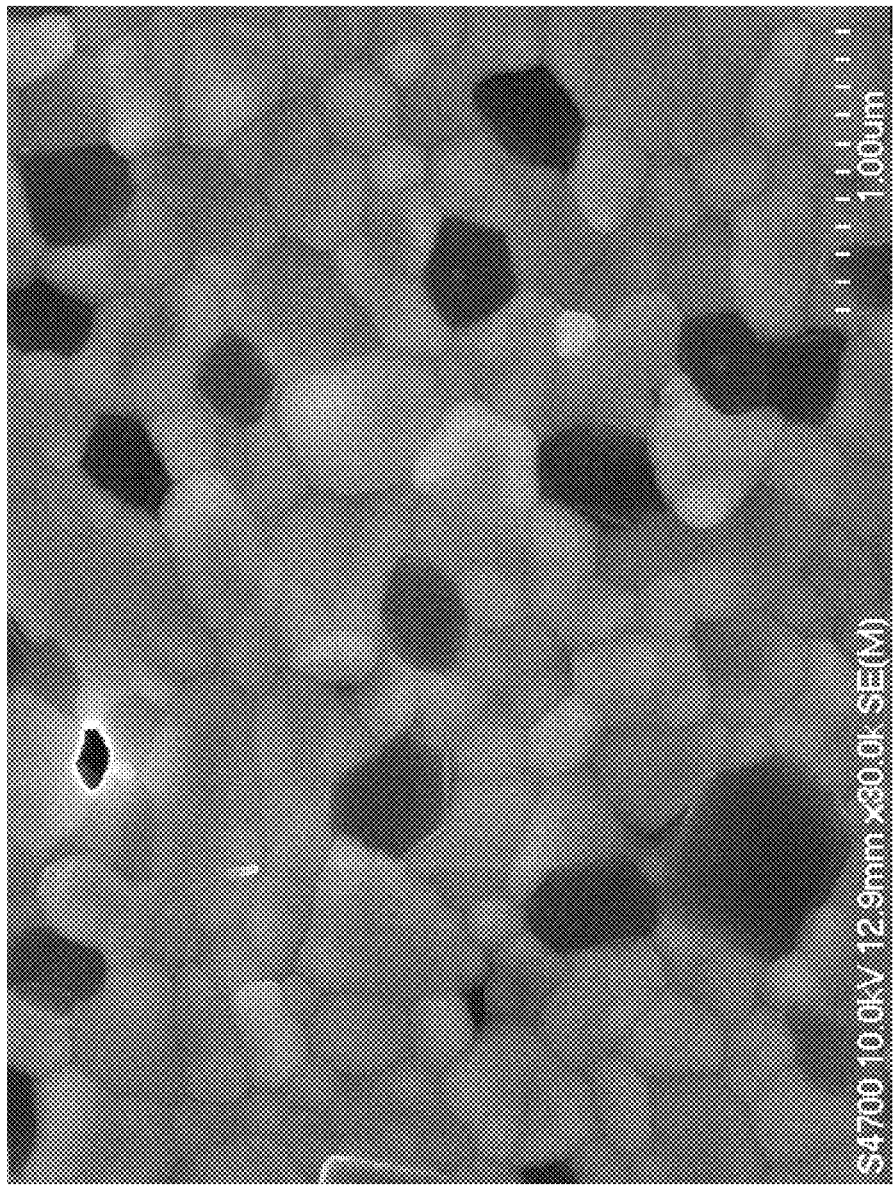
FIG. 17 is a SEM picture of a zirconia sintered body after thermal etching process at 30,000 magnification.

In the zirconia sintered body in which the composition of the base was 92.6 mass % of 3 mol % zirconia and 7.4 mass % of aluminum oxide, the addition rate of boron oxide to the base is 0.1%, the addition rate of phosphorus is 0.25%, the addition rate of silicon dioxide is 0.2% and the addition rate of a binder is 6%, and that is made by being sintered at 1450 degrees Celsius for 2 hours, SEM pictures of the surface thereof after the thermal etching treatment at 1350 degrees Celsius for 0.5 hours were taken. The SEM pictures are shown in FIGS. 16 to 17. The used microscope is the above mentioned device. In the zirconia sintered body in the present invention, it was found that the zirconia crystals had a particle size of 1 μm or less.

Examples 25-32

In order to confirm the effect of the addition of boron, in the zirconia sintered bodies including constant amounts of phosphorus and silicon dioxide, the peak ratios of the monoclinic system after the hydrothermal treatment were confirmed with varying only the addition rate of boron oxide, in the same way as in Examples 1 to 24. A manufacturing method of the zirconia sintered body, a hydrothermal treatment method and a measuring method of X-ray diffraction are the same way as in Examples 1 to 24. As Comparative Example 2, the peak ratio of the monoclinic system in the zirconia sintered body in which phosphorus was not added was also confirmed. In the zirconia sintered bodies according to each Example and Comparative Example 2, conditions excepting the addition rates of phosphorus and boron oxide were as follows in the composition for sintering: the content rate of zirconia (content of Yttria is 3 mol %) was 92.6 mass % and the content rate of alumina was 7.4 mass % in the base, the addition rate of $SiO_2$ was 0.2%, the addition rate of the binder was 6% to the base and the sintering temperature was 1450 degrees Celsius. The measurement results of the peak ratios of the monoclinic system are shown in Table 13. The values shown in Table 13 are of the same meaning as in Tables 1 to 6.

According to Examples 25 to 32, while the effect of inhibiting the low-temperature degradation was found only by adding phosphorus (that is, the addition rate of boron was zero), the low-temperature degradation was greatly improved only by adding 0.01% of boron oxide ($4.0 \times 10^{-4}$ mol of the element boron to 1 mol of zirconium oxide). In particular, when the additional ratio of boron oxide was 0.2% or more, even after the hydrothermal treatment, the progress of the phase transition was not observed. See Comparative Example 2 only, it was found that even though phosphorus is not included, the phase transition inhibitive effect was obtained by merely increasing the additional rate of boron. Therefore, it was revealed that the addition of boron also has the phase transition inhibitive effect. The phase transition inhibitive effect could be confirmed also by adding 1% of boron oxide ($4 \times 10^{-2}$ mol of the element boron to 1 mol of zirconium oxide).

TABLE 13

| | Addition Rate of P/% | Addition Rate of $B_2O_3$/% | | | | | | | |
|---|---|---|---|---|---|---|---|---|---|
| | | 0 | 0.01 | 0.05 | 0.1 | 0.2 | 0.3 | 0.4 | 0.5 | 1.0 |
| Example 25 | 0.01 | 79 | 9 | 7 | 4 | 0 | 0 | 0 | 0 | 0 |
| Example 26 | 0.05 | 80 | 9 | 6 | 4 | 0 | 0 | 0 | 0 | 0 |
| Example 27 | 0.1 | 80 | 6 | 4 | 2 | 0 | 0 | 0 | 0 | 0 |
| Example 28 | 0.2 | 52 | 4 | 4 | 2 | 0 | 0 | 0 | 0 | 0 |
| Example 29 | 0.3 | 41 | 5 | 2 | 4 | 0 | 0 | 0 | 0 | 0 |
| Example 30 | 0.4 | 44 | 4 | 2 | 2 | 0 | 0 | 0 | 0 | 0 |

TABLE 13-continued

| | Addition Rate of P/% | Addition Rate of B$_2$O$_3$/% | | | | | | | | |
|---|---|---|---|---|---|---|---|---|---|---|
| | | 0 | 0.01 | 0.05 | 0.1 | 0.2 | 0.3 | 0.4 | 0.5 | 1.0 |
| Example 31 | 0.5 | 42 | 3 | 2 | 2 | 0 | 0 | 0 | 0 | 0 |
| Example 32 | 1.0 | 41 | 3 | 2 | 2 | 0 | 0 | 0 | 0 | 0 |
| Comparative Example 2 | 0 | 77 | 70 | 63 | 51 | 5 | 2 | 2 | 2 | 2 |

Examples 33-40

In order to confirm the effect of the addition of silicon dioxide, in the zirconia sintered bodies which included constant amounts of phosphorus and boron, the peak ratios of the monoclinic system after the hydrothermal treatment were confirmed with varying the addition rate of silicon dioxide only, in the same way as in Examples 1 to 24. The manufacturing method of the zirconia sintered body, hydrothermal treatment method and measuring method of X-ray diffraction are the same way as in Examples 1 to 24. In the zirconia sintered bodies according to each Example, conditions excepting the addition rates of phosphorus and boron oxide were as follows in the composition for sintering: the content rate of zirconia (content of yttria is 3 mol %) was 92.6 mass % and the content rate of alumina was 7.4 mass % in the base, the addition rate of a binder to the base was 6% and the sintering temperature was 1450 degrees Celsius. The measurement results of the peak ratios of the monoclinic system are shown in Table 14. The values shown in Table 14 are of the same meaning as in Tables 1 to 6.

According to Examples 33 to 40, it was found that the phase transition inhibitive effect is obtained even though the addition rate of boron oxide was fixed and the content rates of phosphorus and silicon dioxide were varied. According to Examples 34 and 37 to 40, it was found that the phase transition inhibitive effect was obtained even though the addition rate of phosphorus was fixed and the content rates of boron oxide and silicon dioxide were varied. Therefore, it was found that the phase transition inhibitive effect can be further enhanced without relying on the addition rates of phosphorus and boron, if the addition rate of silicon dioxide to the base was at least 0.03% to 3% ($7.0 \times 10^{-4}$ mol to $7 \times 10^{-2}$ mol of silicon dioxide to 1 mol of zirconium oxide), preferably 0.1% or more.

TABLE 14

| | Addition Rate of P/% | Addition Rate of B$_2$O$_3$/% | Addition Rate of SiO$_2$/% | | | | | |
|---|---|---|---|---|---|---|---|---|
| | | | 0.03 | 0.1 | 0.2 | 1 | 2 | 3 |
| Example 33 | 0.01 | 0.2 | 6 | 0 | 0 | 0 | 0 | 0 |
| Example 34 | 0.1 | 0.2 | 4 | 0 | 0 | 0 | 0 | 0 |
| Example 35 | 0.5 | 0.2 | 2 | 0 | 0 | 0 | 0 | 0 |
| Example 36 | 1 | 0.2 | 0 | 0 | 0 | 0 | 0 | 0 |
| Example 37 | 0.1 | 0.01 | 9 | 0 | 0 | 0 | 0 | 0 |
| Example 38 | 0.1 | 0.1 | 6 | 0 | 0 | 0 | 0 | 0 |
| Example 39 | 0.1 | 0.5 | 3 | 0 | 0 | 0 | 0 | 0 |
| Example 40 | 0.1 | 1 | 1 | 0 | 0 | 0 | 0 | 0 |

Examples 41-42

Measurement of X-Ray Diffraction Pattern of Burned Surface and Interior

Figure 18:
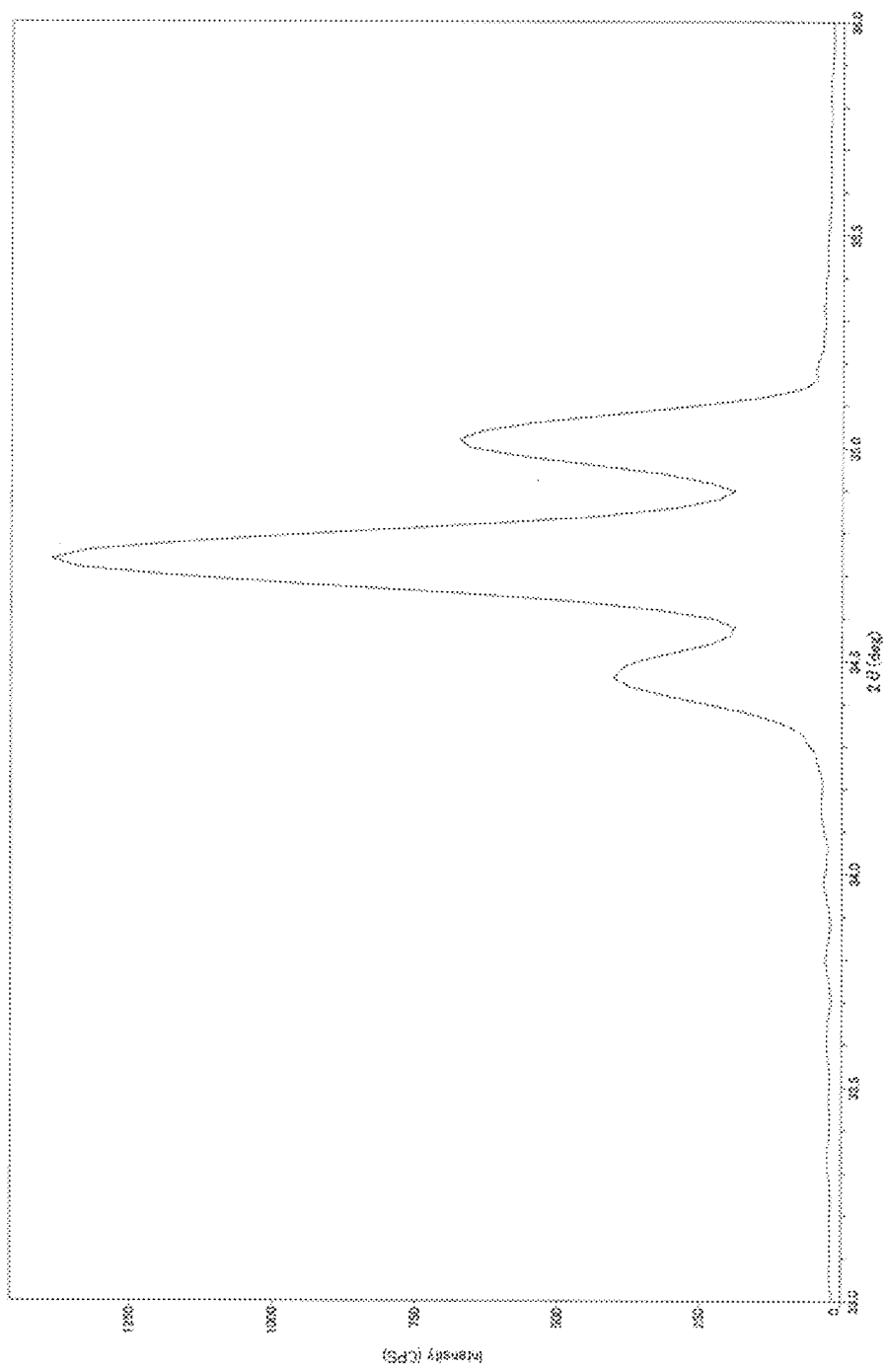
FIG. 18 is an X-ray diffraction pattern of a burned surface of a zirconia sintered body of the present invention in Example 41.
Figure 19:
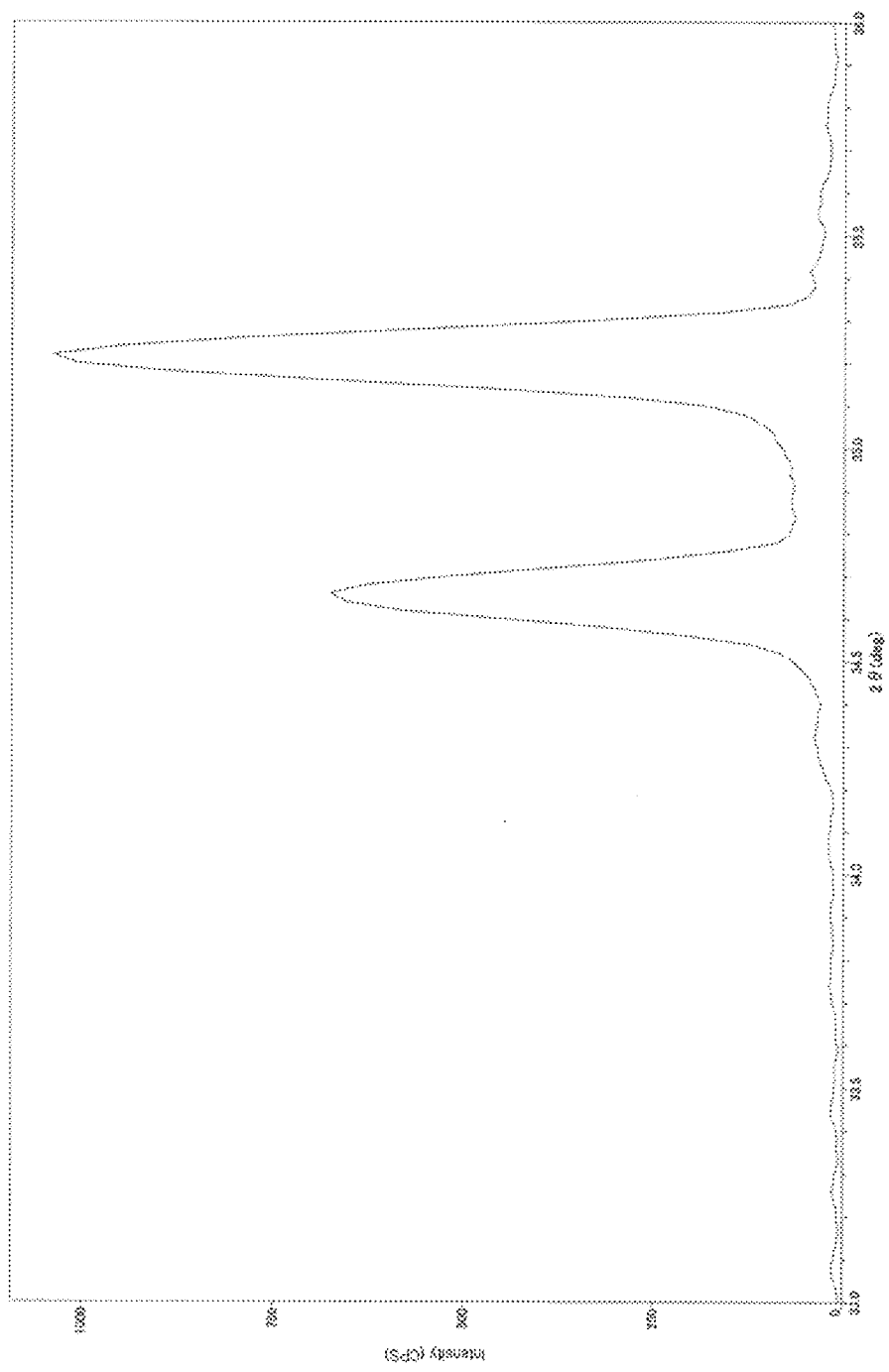
FIG. 19 is an X-ray diffraction pattern of an interior (ground surface) of a zirconia sintered body of the present invention in Example 41.
Figure 20:
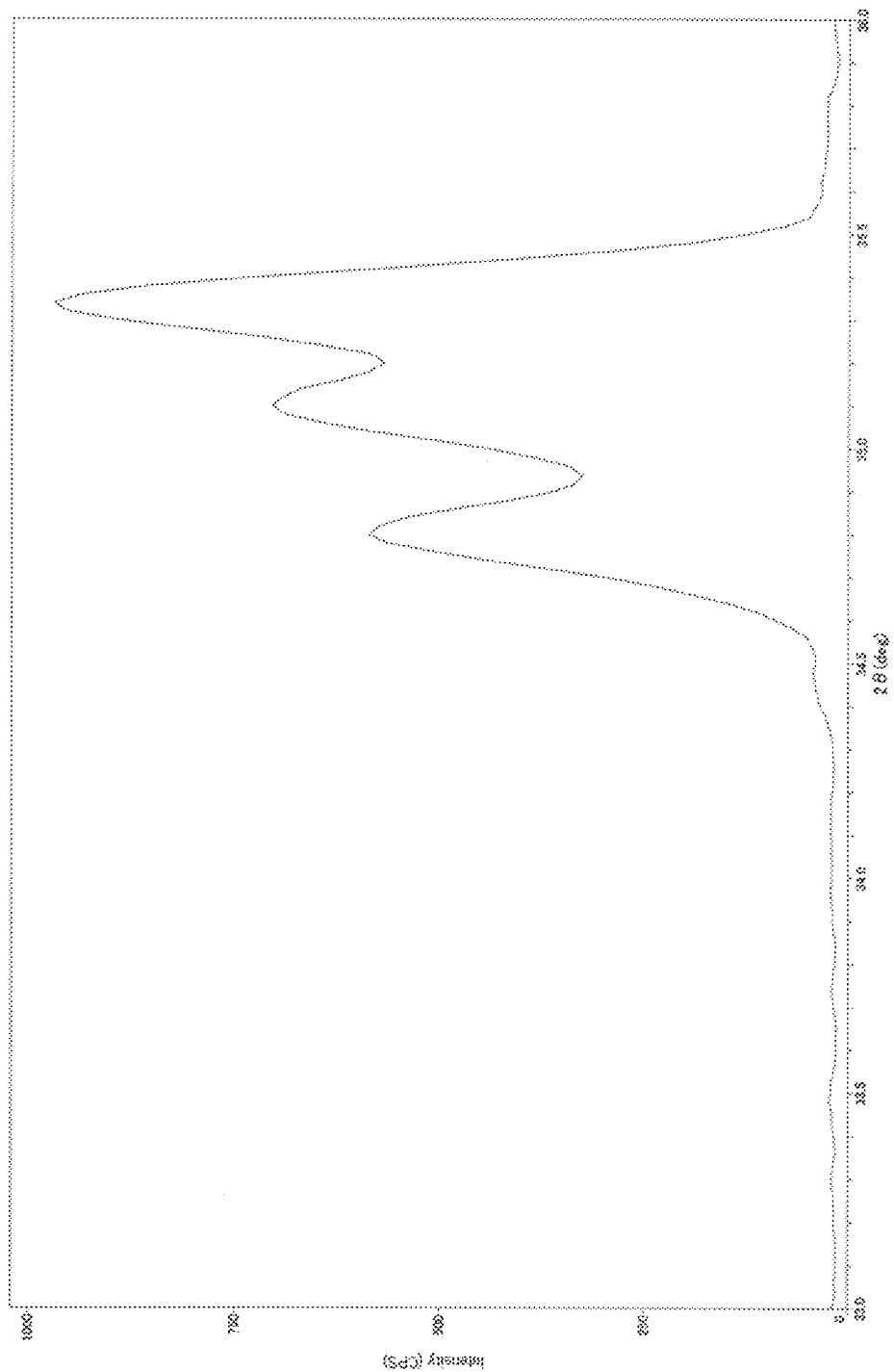
FIG. 20 is an X-ray diffraction pattern of a burned surface of a zirconia sintered body of the present invention in Comparative Example 42.
Figure 21:
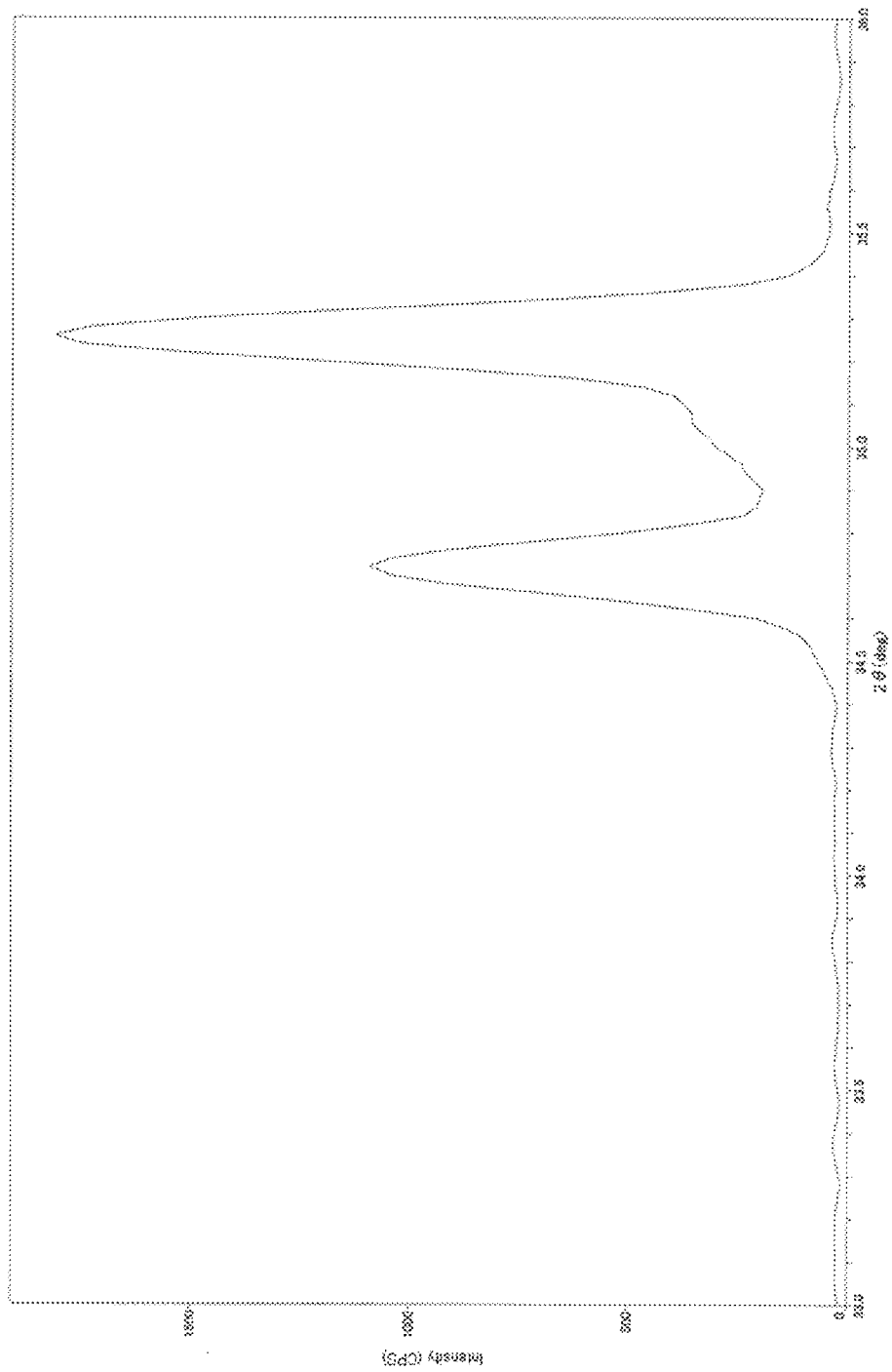
FIG. 21 is an X-ray diffraction pattern of an interior (ground surface) of a zirconia sintered body of the present invention in Comparative Example 42.
Figure 22:
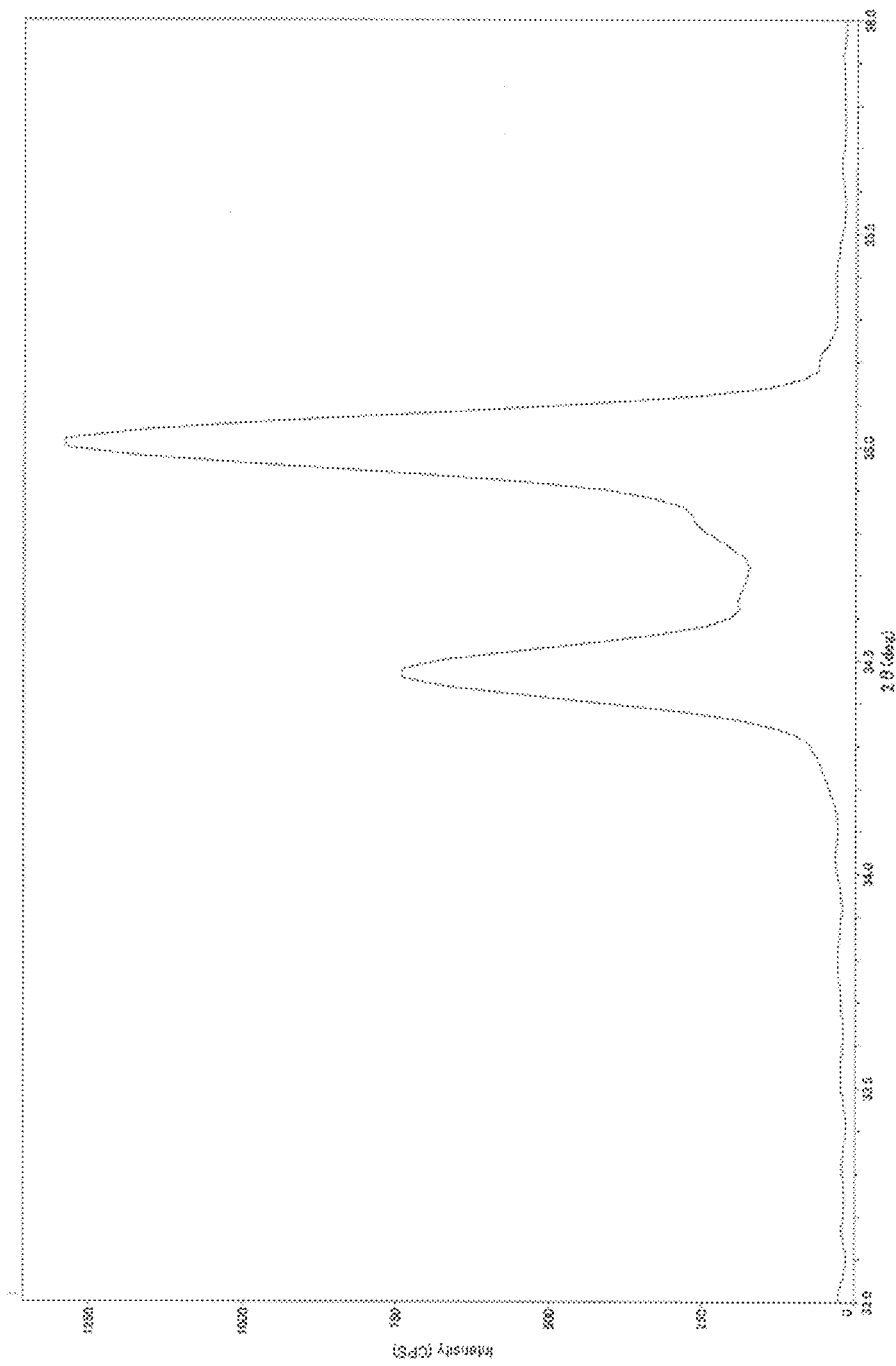
FIG. 22 is an X-ray diffraction pattern of a burned surface of a zirconia sintered body in Comparative Example 3.
Figure 23:
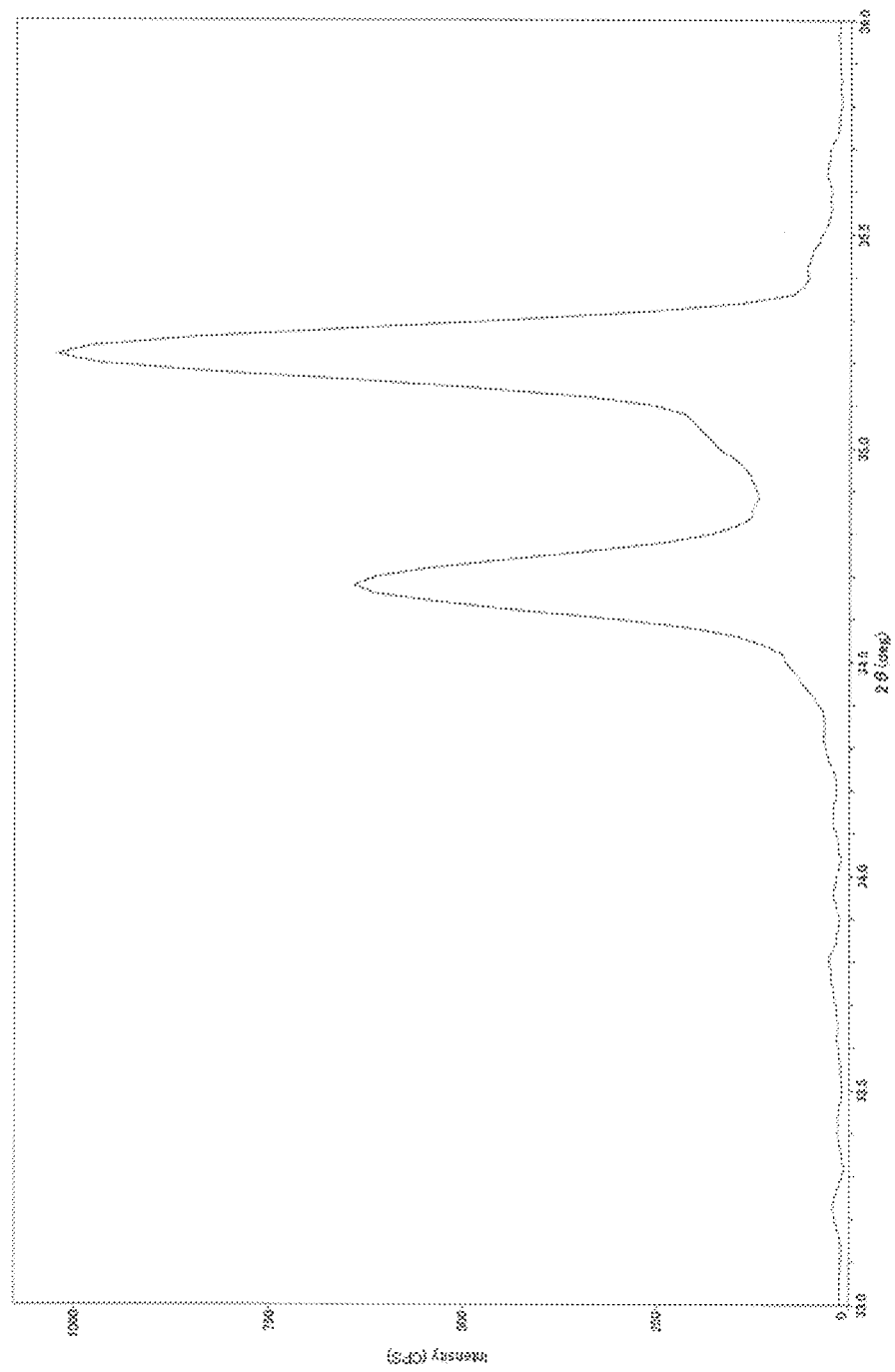
FIG. 23 is an X-ray diffraction pattern of an interior (ground surface) of a zirconia sintered body in Comparative Example 3.

In order to confirm a crystal structure of the zirconia sintered body in the present invention, the X-ray diffraction pattern (XRD) of the burned surface (the exposed surface after the sintering) was measured, and the interior (the surface exposed by grinding the burned surface) was also measured. The addition rates of ingredients on the compositions for sintering of the measurement samples were shown in Table 15. The sample according to Example 41 includes phosphorus and boron, and the sample according to Comparative Example 42 does not include phosphorus but boron. As Comparative Example 3, XRD was measured also on the sample including no phosphorus and no boron. All samples were the sintered bodies burned at 1450 degrees Celsius for 1.5 hours. The burned surface was ground by at least 100 μm or more from the burned surface by grinding the burned surface with #400 of diamond grinding wheel and then grinding it with #2000 of diamond paste (numerical values are based on the JIS). The X-ray diffraction patterns were measured with Cu-target at 50 kV and 50 mA using RINT-TTRIII (made by Rigaku Corporation). The X-ray diffraction pattern of the burned surface of the zirconia sintered body of the present invention in Example 41 is shown in FIG. 18. The X-ray diffraction pattern of the interior (the ground surface) of the zirconia sintered body of the present invention in Example 41 is shown in FIG. 19. The X-ray diffraction pattern of the burned surface of the zirconia sintered body of the present invention in Comparative Example 42 is shown in FIG. 20. The X-ray diffraction pattern of the interior (the ground surface) of the zirconia sintered body of the present invention in Comparative Example 42 is shown in FIG. 21. The X-ray diffraction pattern of the burned surface of the zirconia sintered body in Comparative Example 3 is shown in FIG. 22. The X-ray diffraction pattern of the interior (the ground surface) of the zirconia sintered body in Comparative Example 3 is shown in FIG. 23.

In the X-ray diffraction pattern of the burned surface of the zirconia sintered body to which phosphorus and boron were not added, shown in FIG. 22, there are two high peaks between about 34.5° and 35.5° of 2θ, and both of these two peaks belong to the tetragonal system. A peak of the cubic system was merely slightly observed between two peaks. This is the same as the X-ray diffraction pattern of the interior of the sintered body shown in FIG. 23. Accordingly, it was found that in the zirconia sintered body to which phosphorus and boron were not added, the tetragonal system was the principle crystal system in any of the burned surface, interior and re-burned surface, and the cubic crystal was substantially not formed.

On the other hand, in the X-ray diffraction patterns of the burned surface of the zirconia sintered body of the present invention, shown in FIGS. 18 and 20, three peaks were observed. The left peak is a tetragonal [002] peak, the right peak is a tetragonal [200] peak, and the middle peak at about 34.8° in FIG. 18 is a cubic [200] peak. It was found that the cubic crystal was formed in the burned surface of the zirconia sintered body of the present invention. Comparing FIG. 18 to FIG. 20, the peak ratio of the cubic system in FIG. 18 is higher than that in FIG. 20. It is indicated that although the cubic crystals can be formed even only by the addition of boron, if boron is added in combination with phosphorus, the formation effect of the cubic crystal is further enhanced by the synergistic effect.

However, in the X-ray diffraction patterns of the interiors of the zirconia sintered bodies of the present invention, shown in FIGS. 19 and 21, the cubic crystal was substantially not observed. That is, it was found that a main crystal system in the interior of the sintered body is the tetragonal system. Therefore, it is found that the cubic crystals are concentrated and formed on the neighborhood (vicinity) of the burned surface by the addition of boron and phosphorus.

TABLE 15

| | Base/mass % | | Addition Rate to Base/% | | | |
|---|---|---|---|---|---|---|
| | $3YZrO_2$ | $Al_2O_3$ | $B_2O_3$ | P | $SiO_2$ | Binder |
| Example 41 | 92.6 | 7.4 | 0.1 | 0.2 | 0.2 | 6 |
| Comparative Example 42 | 92.6 | 7.4 | 0.1 | 0 | 0.2 | 6 |
| Comparative Example 3 | 92.6 | 7.4 | 0 | 0 | 0.2 | 6 |

Examples 43-46

Thin Film XRD Measurement

Based on the results from Example 41, whether the cubic system exists in the vicinity of the burned surface was confirmed by measuring the X-ray thin film diffraction (thin film XRD) in a region from the burned surface up to a depth of about 2.6 μm in the zirconia sintered bodies having different compositions shown in Table 16. The samples of which the thin film XRD were measured were the zirconia sintered bodies that were made by burning the compositions for sintering shown in Table 16 at 1450 degrees Celsius for 1.5 hours. As Comparative Example 4, the thin film XRD was measured on the zirconia sintered body to which phosphorus and boron were not also added. The thin film XRD were measured with Cu-target, at 40 kV and 200 mA, using RINT-TTR III (made by Rigaku Corporation).

When an incident angle of the X-ray ("incident angle" means an angle of the X-ray to the burned surface in this description) is 3° (penetration depth of the X-ray is 2.6 μm), a height of a peak existing around a position where a cubic [311] peak is observed at about 70.5° of 2θ and a height of a peak existing around a position where a tetragonal [211] peak is observed at about 71.0° of 2θ were measured, and the peak ratios of the burned surfaces were calculated. Table 17 shows the results.

Although the peak [sic. the peak ratios] of the burned surfaces of the zirconia sintered bodies of the present invention were 1 or more, the peak ratio of the burned surface of Comparative Example 4 was 0.4. Thereby, it was found that the zirconia sintered bodies of the present invention include more cubic crystals in the surfaces (burned surfaces) than the sintered body to which phosphorus and boron are not added.

TABLE 16

| | Base/mass % | | Addition Rate to Base/% | | | |
|---|---|---|---|---|---|---|
| | $3YZrO_2$ | $Al_2O_3$ | $B_2O_3$ | P | $SiO_2$ | Binder |
| Example 43 | 92.6 | 7.4 | 0.1 | 0.1 | 0.2 | 6 |
| Example 44 | 92.6 | 7.4 | 0.2 | 0.1 | 0.2 | 6 |

TABLE 16-continued

| | Base/mass % | | Addition Rate to Base/% | | | |
|---|---|---|---|---|---|---|
| | $3YZrO_2$ | $Al_2O_3$ | $B_2O_3$ | P | $SiO_2$ | Binder |
| Example 45 | 92.6 | 7.4 | 0.2 | 0.2 | 0.2 | 6 |
| Example 46 | 92.6 | 7.4 | 0.3 | 0.2 | 0.2 | 6 |
| Comparative Example 4 | 92.6 | 7.4 | 0 | 0 | 0.2 | 6 |

TABLE 17

| | Incident Angle/° | Penetration Depth of X-ray/μm | Peak Ratio of the Burned Surface |
|---|---|---|---|
| Example 43 | 3 | 2.6 | 1.1 |
| Example 44 | | | 4.3 |
| Example 45 | | | 2.5 |
| Example 46 | | | 2.7 |
| Comparative Example 4 | | | 0.4 |

Example 47

Thin Film XRD Measurement

Based on the results from Examples 43 to 46, in the zirconia sintered body in Example 44, XRD was measured while the incident angle was varied in a range of 1° to 30° and a change of the crystal structure in a region from the burned surface to a depth of about 30 μm was confirmed. The penetration depth of the X-ray is considered to be, for example, 2.6 μm when the incident angle is 3°, 5.7 μm when the incident angle is 7°, 8.3 μm when the incident angle is 11°, 10.4 μm when the incident angle is 15°, 14.9 [sic. μm] when the incident angle is 30°. Therefore, according to the thin film XRD, a crystal structure in a region up to a penetration depth of the X-ray can be investigated.

Figure 24:
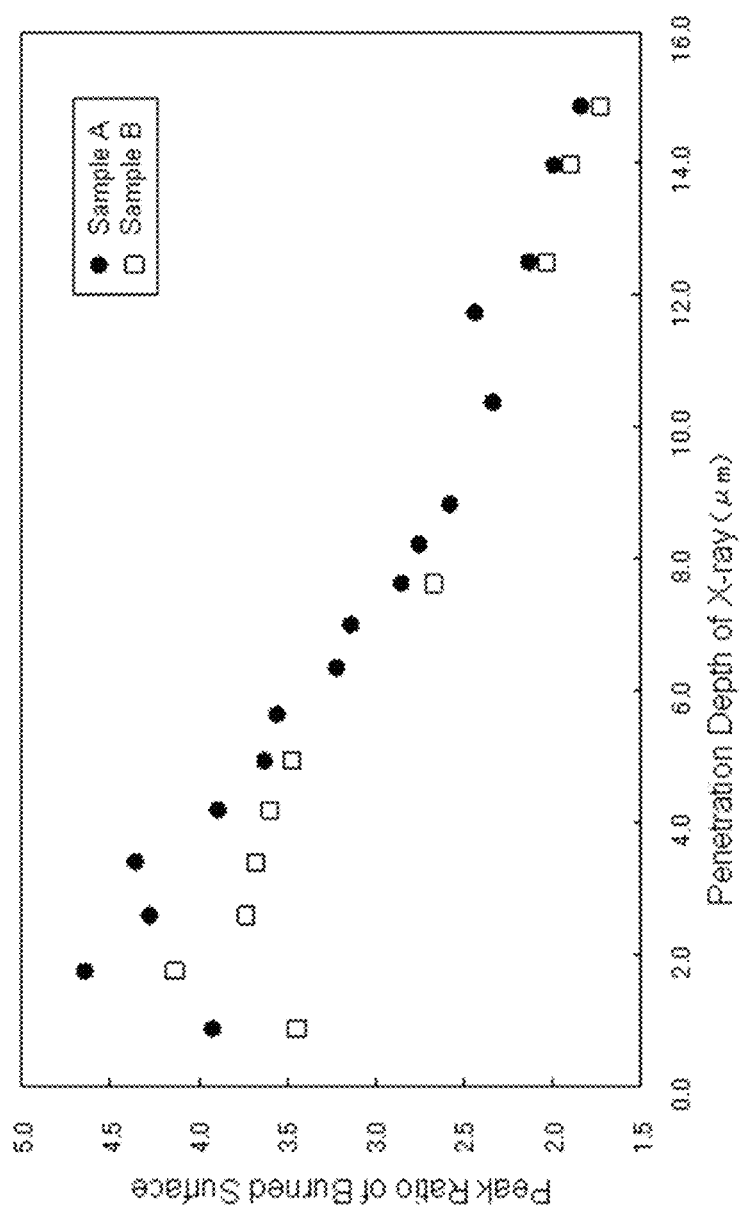
FIG. 24 is a graph that peak ratios of a burned surface are plotted versus penetration depth of X-ray in Example 47.

The peak ratios of the burned surface at each incident angle were calculated. The results are shown in Table 18. Two samples having the same compositions were measured, these are shown as [sample A] and [sample B] in Table 18. FIG. 24 shows a graph that the peak ratios of the burned surfaces versus the penetration depth of the X-ray are plotted. As the penetration depth of the X-ray becomes deeper, the peak ratios of the burned surfaces are also decreased. That is, a large amount of the cubic system exists in a region in the vicinity of the burned surface (exposed surface) and decreases toward the interior of the sintered body. In particular, it is considered that a most amount of the cubic system exists in a region from the burned surface to the depth of 5 μm. Since the peak ratios of the burned surface have a tendency to decrease at least up to 15 μm of the penetration depth of the X-ray, it is considered that a region ranging from the burned surface to the depth of 15 μm includes the cubic system more than in the interior (for example, a region of the depth of 100 μm or more).

TABLE 18

| Incident Angle/° | Penetration Depth of X-ray/μm | Peak Ratio of Burned Surface | |
|---|---|---|---|
| | | Sample A | Sample B |
| 1 | 0.9 | 3.92 | 3.44 |
| 2 | 1.8 | 4.64 | 4.13 |
| 3 | 2.6 | 4.27 | 3.72 |
| 4 | 3.4 | 4.35 | 3.67 |
| 5 | 4.2 | 3.89 | 3.59 |
| 6 | 5.0 | 3.62 | 3.47 |
| 7 | 5.7 | 3.55 | — |
| 8 | 6.4 | 3.22 | — |
| 9 | 7.0 | 3.13 | — |
| 10 | 7.7 | 2.85 | 2.67 |
| 11 | 8.3 | 2.75 | — |
| 12 | 8.8 | 2.57 | — |
| 15 | 10.4 | 2.33 | — |
| 18 | 11.7 | 2.43 | — |
| 20 | 12.5 | 2.13 | 2.03 |
| 25 | 14.0 | 1.99 | 1.89 |
| 30 | 14.9 | 1.84 | 1.73 |

Examples 48-49

Composition Analyses of Burned Surface and Interior by XPS

In order to make it clear the difference between the composition of the burned surface and that of the interior, the compositions of the burned surface and interior were measured by XPS (X-ray Photoelectron Spectroscopy). Addition rates of ingredients of the compositions for sintering of the measurement samples are shown in Table 19. The sintering was performed at 1450 degrees Celsius for 1.5 hours. The measurement was performed with Quantera SXM (made by ULVAC-PHI, Inc.), at 90° of an extracting angle of a photoelectron from the surface of the sample (about 8 nm of detection depth). The measuring results are shown in Table 20. In Table 20, the term "interior" means a surface of about 500 μm in depth exposed by grinding the burned surface with #400 of diamond (grinding) wheel and then grinding #2000 of diamond paste. Values of upper rows mean content rates detected as an element, and values in parentheses of lower rows mean content rates converted into an oxide based on the values of the upper rows. In the values of upper rows, values of elements other than the elements shown in the Table are omitted.

As Comparative Example 5, the composition analysis was performed on the sintered body to which phosphorus, boron and silicon dioxide were not added. Yttria and silicon dioxide were uniformly mixed in the entire compact for sintering, and the compact was not shaped in such a manner that the surface would have a high concentration.

When the composition of the burned surface is compared with the composition of the interior, it was found that there are more yttria and silicon dioxide in the burned surface than in the interior. It is considered that yttria in a raw material migrated to the vicinity of the burned surface by the burning for sintering because the stabilizing agent(s) was evenly dispersed in the entire of the compact before the sintering. It is presumed that only the burned surface is fully-stabilized, that is, becomes the cubic crystal because of high content of yttria. The migration of the stabilizing agent(s) was not observed in the sintered body of Comparative Example 5. Accordingly, it is considered that the addition of phosphorus and boron contributes to the migration of the stabilizing agent(s) to the burned surface.

A lower limit of detecting an element by the XPS is 1 atomic % though depending on a subject element. "No Detected" in Table 20 means to be less than the lower limit in a region ranging from the burned surface to about 8 nm of depth, and does not mean that there is no existence of the element in the interior of the sintered body. Quantitative precision of the XPS is ±1 atomic %. The values in Table were calculated after removing C atoms such as an organic compound adhered to the surface of the measurement sample. Based on a problem of the measurement precision, there is a possibility that the values in Table 20 are different from an actual composition. The same holds for Table 24 shown below.

TABLE 19

| | Base/mass % | | Addition Rate to Base/% | | | |
|---|---|---|---|---|---|---|
| | 3YZrO$_2$ | Al$_2$O$_3$ | B$_2$O$_3$ | P | SiO$_2$ | Binder |
| Example 48 | 100 | 0 | 0.2 | 0.1 | 0.2 | 6 |
| Example 49 | 100 | 0 | 0.2 | 0.2 | 0.2 | 6 |
| Comparative Example 5 | 100 | 0 | 0 | 0 | 0 | 6 |

TABLE 20

| | | Zr/ atomic % (ZrO$_2$/ mol %) | Y/ atomic % (Y$_2$O$_3$/ mol %) | P/ atomic % (P$_2$O$_5$/ mol %) | Si/ atomic % (SiO$_2$/ mol %) | B/ atomic % | O/ atomic % |
|---|---|---|---|---|---|---|---|
| Ex. 48 | Burned Surface | 21.8 (80.3) | 4.8 (9.1) | 1.6 (3.0) | 2.0 (7.6) | Unmeasurable | 70.2 |
| | Interior | 29.5 (96.9) | 1.9 (3.1) | No Detected | No Detected | Unmeasurable | 68.6 |
| Ex. 49 | Burned Surface | 23.0 (79.6) | 5.2 (9.0) | 1.6 (2.8) | 2.5 (8.5) | Unmeasurable | 67.7 |
| | Interior | 29.7 (97.3) | 1.7 (2.7) | No Detected | No Detected | Unmeasurable | 68.7 |
| Comp. Ex. 5 | Burned Surface | 30.3 (96.5) | 2.2 (3.5) | No Detected | No Detected | Unmeasurable | 67.5 |
| | Interior | 30.3 (96.5) | 2.2 (3.5) | No Detected | No Detected | Unmeasurable | 67.5 |

Example 50

Composition Analysis of Burned Surface by SIMS

Figure 25:
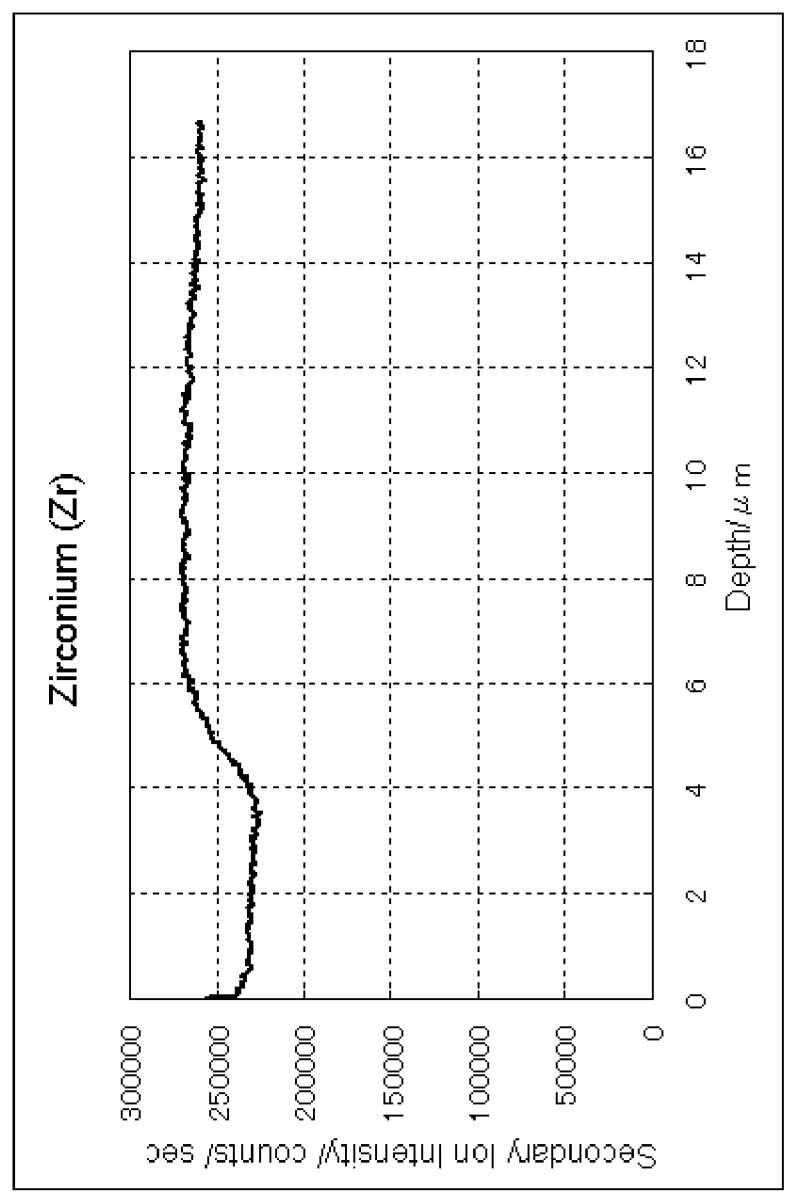
FIG. 25 is a graph that shows content distribution of zirconium versus depth from a burned surface in Example 50.
Figure 26:
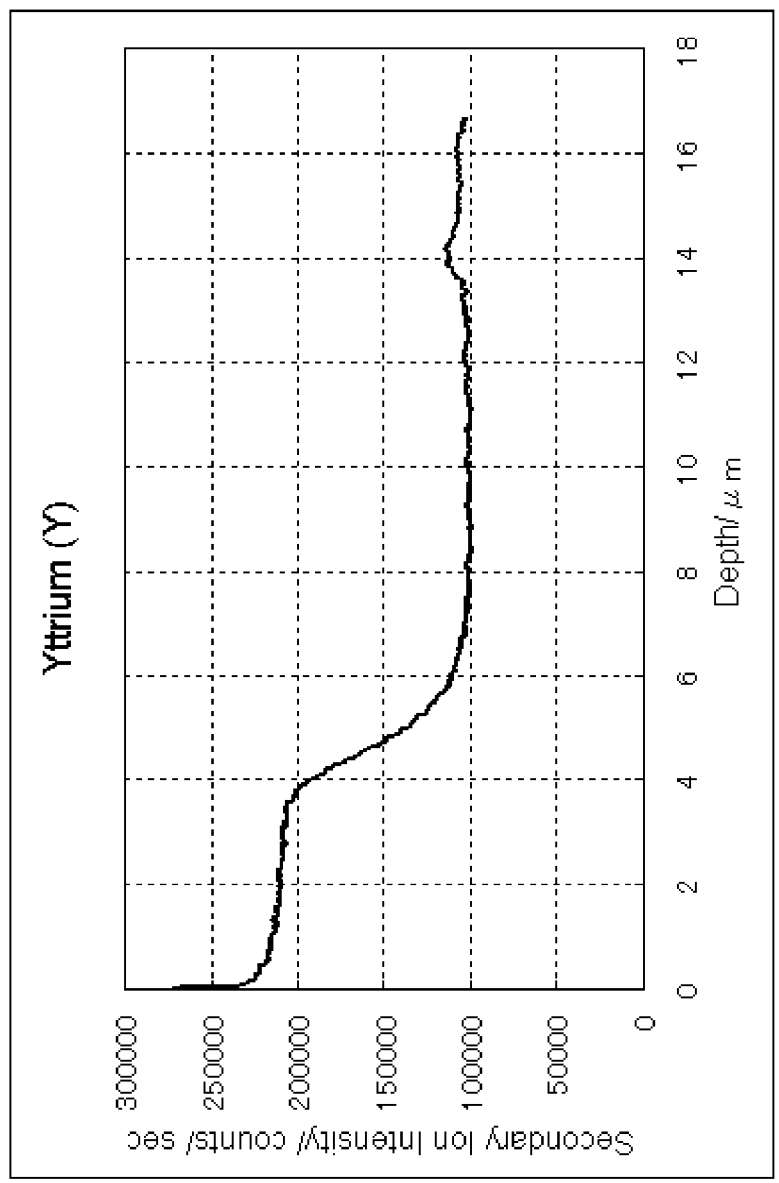
FIG. 26 is a graph that shows content distribution of yttrium versus depth from a burned surface in Example 50.
Figure 27:
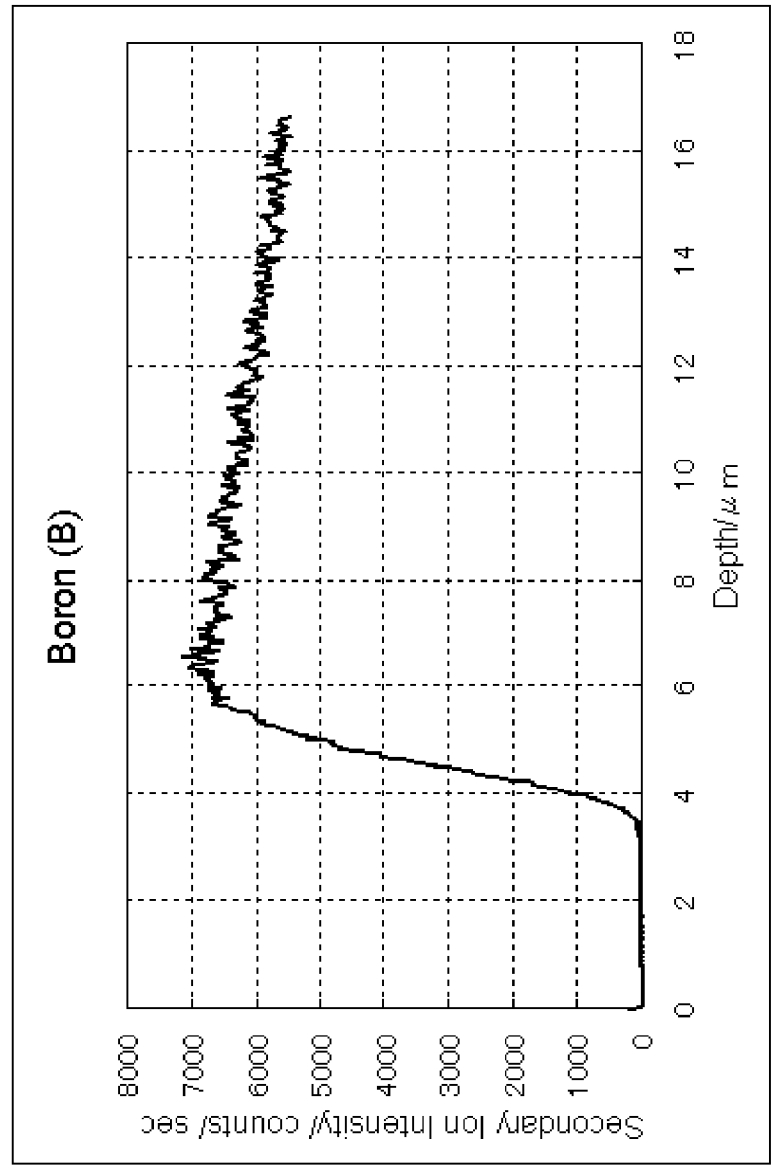
FIG. 27 is a graph that shows content distribution of boron versus depth from a burned surface in Example 50.
Figure 28:
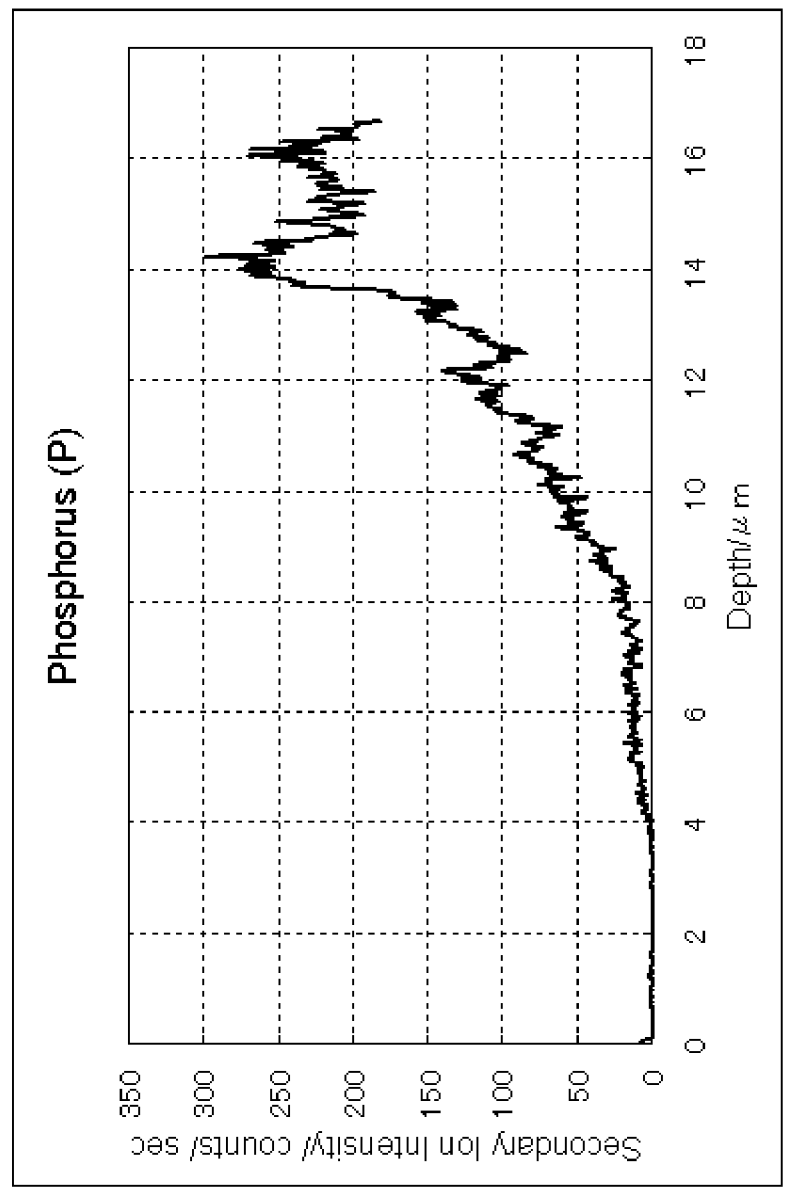
FIG. 28 is a graph that shows content distribution of phosphorus versus depth from a burned surface in Example 50.
Figure 29:
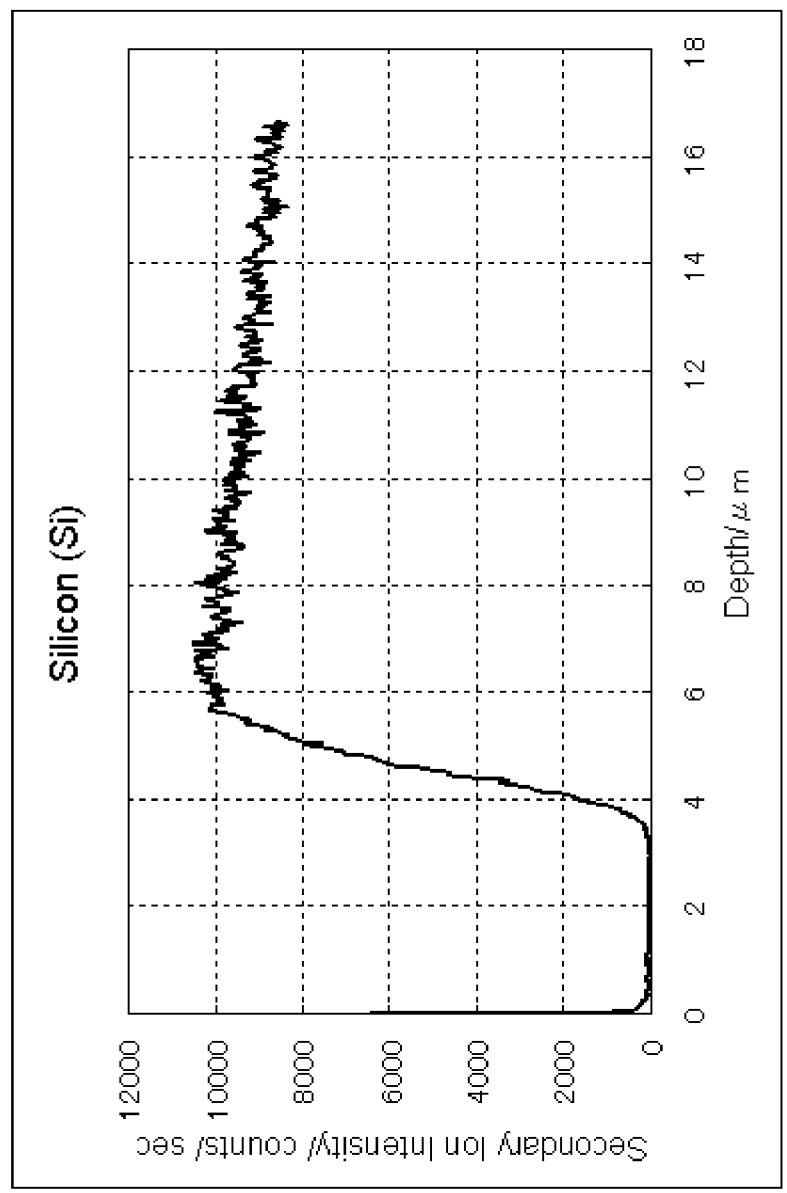
FIG. 29 is a graph that shows content distribution of silicon versus depth from a burned surface in Example 50.

In order to investigate a distribution status of each element of zirconium (Zr), yttrium (Y), boron (B), phosphorous (P) and silicon (Si) in the vicinity of the burned surface, a content distribution of each element in the burned surface was measured by using Secondary ion mass spectrometry (SIMS). Measurement samples were the zirconia sintered bodies according to Example 49. ADEPT1010 (made by PHI) was used as a measuring device, $O_2^+$ was used as a primary ion species. Measurement results are shown in FIGS. 25 to 29. FIG. 25 is a content distribution of zirconium to depth from the burned surface. FIG. 26 is a content distribution of yttrium versus depth from the burned surface. FIG. 27 is a content distribution of boron versus depth from the burned surface. FIG. 28 is a content distribution of phosphorus versus depth from the burned surface. FIG. 29 is a content distribution of silicon versus depth from the burned surface.

According to FIG. 25, the content rate of zirconium is low in a region of the depth of 0 μm to 4 μm from the burned surface, the content rate increases in a region of the depth of 4 μm to 6 μm, the content rate has a tendency to moderately decrease in a region of the depth of 6 μm or more. On the other hand, according to FIG. 26, the content rate of yttrium is high in a region of the depth of 0 μm to 4 μm from the burned surface, however, the content rate decreases drastically in a region of the depth of 4 μm to 6 μm, the content rate decreases moderately in a region of the depth of 6 μm to 8 μm, and the content rate remains substantially constant in a region of the depth of 8 μm or more. Therefore, since yttrium is included in a large amount in a region ranging from the burned surface to the depth of 4 μm, it is considered that the cubic system is also included in a large amount in a region of the depth up to 4 μm from the burned surface. Further, it is considered that in a region of at least the depth of 8 μm or more from the burned surface, the tetragonal system is the principle crystal system. The above results are consistent with the results of the distribution of the cubic system by the thin film XRD and the composition analysis by XPS.

According to FIGS. 27 to 29, boron, phosphorus, and silicon are hardly detected in a region ranging from the burned surface to the depth of 4 μm where it is considered that a large amount of the cubic system is formed. Boron and silicon show the same behavior. The content rates of boron and silicon sharply increase in a region of the depth of 4 μm to 6 μm, and they decrease gradually in a region of the depth of 6 μm or more. The content rate of phosphorus starts to increase gradually from the depth of 4 μm, and, in a region of the depth of 14 μm or more, it remains substantially constant. Although, in the measurement results of XPS, phosphorus and silicon are detected in a region from the burned surface to the depth of 8 nm, the measurement by SIMS now performed can obtain steady measurement results in a region of the depth of 100 nm or more, in addition, since phosphorus and silicon are detected in an extreme surface also by SIMS, the measurement results of SIMS are not inconsistent with the measurement results of XPS.

All elements have a common feature that they show a large distribution change in a region of the depth of 4 μm to 6 μm from the burned surface, and it is presumed that boron and phosphorus affect the formation of the cubic system in the vicinity of the burned surface.

Examples 51-54

Confirmation Test of Influence of Cubic Cover Layer to Hydrothermal Degradation In order to investigate an influence of the cubic system included in the burned surface on the hydrothermal degradation, zirconia sintered bodies in which the presence ratio of the cubic system in the burned surface (cover layer) was varied by varying the addition rates of phosphorus and boron were made, the hydrothermal treatment test was performed on each sintered body and each peak ratio of the monoclinic system was measured. As Comparative Example 6, the same measurement was performed on the zirconia sintered body to which phosphorus was not added. The addition rates of ingredients in the composition for sintering of the samples used for the measurement are shown in Table 21. The peak ratios of the cubic system and the peak ratios of the monoclinic system of each sample are shown in Table 22. Values of "(A)" in Table 22 correspond to the addition rate of P in Table 21, values of "(B)" in Table 22 correspond to the addition rate of $B_2O_3$ in Table 21. In Table 22, "∞" means that since the peak of the tetragonal system was very small, the presence of the tetragonal system could not be substantially confirmed, and only the cubic system could be confirmed.

As the addition rate of boron oxide increases in a range of 0% to 0.3% with keeping the addition rate of phosphorus constant, the peak ratio of the cubic system becomes high. That is, the presence ratio of the cubic crystals becomes high in the burned surface.

According to a variation of the peak ratio of the monoclinic system after the hydrothermal treatment relative to a variation of the peak ratio of the tetragonal system, as the peak ratio of the tetragonal system becomes higher, the peak ratio of the monoclinic system has a tendency to lower. That is, as the presence ratio of the cubic crystals in the burned surface becomes higher, the hydrothermal degradation-resistance has been enhanced. In particular, when the peak ratio of the cubic system is 2 or more (height of the peak is 2 times or more), the peak ratio of the monoclinic system has a tendency to be 0. In a range of the peak ratio of the cubic system is 1 or less, an increase in the cubic crystals greatly contributes to the improvement of the hydrothermal degradation-resistance. Thereby, it was found that, by increasing the content rate of the cubic crystals in a region from the burned surface to the depth of 20 μm, the progress of the low-temperature degradation can be inhibited.

Figure 30:
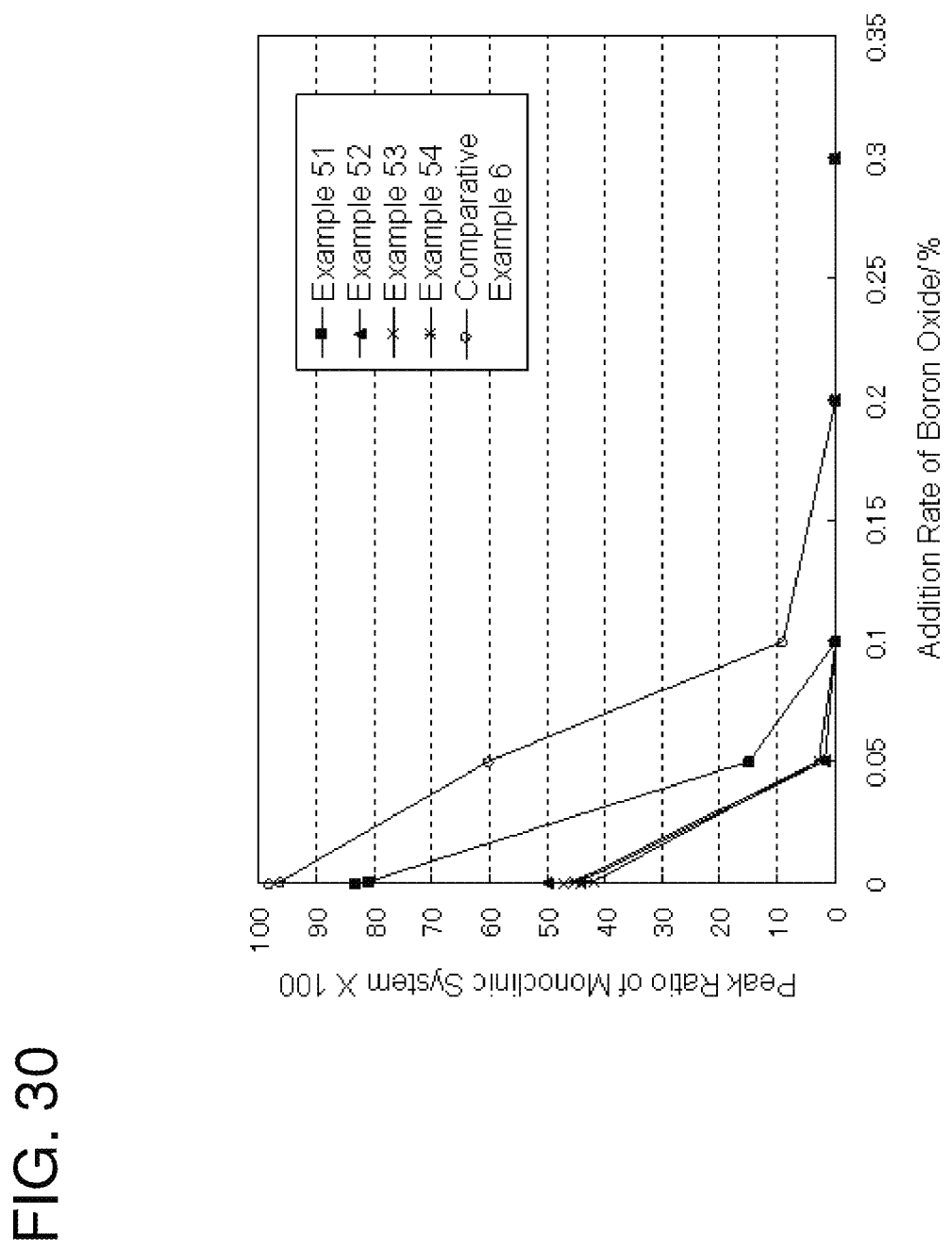
FIG. 30 is a graph that peak ratios of a monoclinic system are plotted versus addition rate of boron oxide in Examples 51-54.

A graph in which the peak ratios of the monoclinic system versus the addition rate of boron oxide are plotted is shown in FIG. 30. Comparing Example 51 to Comparative Example 6, the peak ratio of the monoclinic system decreases only by adding 0.001% of phosphorus. In Examples 52 to 54 in which 0.05% or more of phosphorus was added, the hydrothermal degradation-resistance was clearly enhanced compared with that in Comparative Example 6. Therefore, it was found that the addition of phosphorus can further enhance the hydrothermal degradation-resistance by the synergistic effect with boron.

TABLE 21

| | Base/mass % | | Addition Rate to Base/% | | | |
|---|---|---|---|---|---|---|
| | 3YZrO$_2$ | Al$_2$O$_3$ | P | B$_2$O$_3$ | SiO$_2$ | Binder |
| Example 51~54 | 100 | 0 | (A) | (B) | 0.2 | 6 |

TABLE 22

| | P (A) | $B_2O_3$ (B) | Peak Ratio of Cubic System × 100 | Peak Ratio of Monoclinic System × 100 |
|---|---|---|---|---|
| Example 51 | 0.001 | 0 | 15 | 83 |
| | | 0.001 | 18 | 81 |
| | | 0.05 | 34 | 15 |
| | | 0.1 | 214 | 0 |
| | | 0.2 | 1453 | 0 |
| | | 0.3 | ∞ | 0 |
| Example 52 | 0.05 | 0 | 24 | 50 |
| | | 0.001 | 26 | 44 |
| | | 0.05 | 77 | 2 |
| | | 0.1 | 421 | 0 |
| | | 0.2 | ∞ | 0 |
| | | 0.3 | ∞ | 0 |
| Example 53 | 0.1 | 0 | 41 | 47 |
| | | 0.001 | 41 | 42 |
| | | 0.05 | 86 | 3 |
| | | 0.1 | 205 | 0 |
| | | 0.2 | ∞ | 0 |
| | | 0.3 | ∞ | 0 |
| Example 54 | 0.2 | 0 | 78 | 44 |
| | | 0.001 | 81 | 45 |
| | | 0.05 | 133 | 3 |
| | | 0.1 | 207 | 0 |
| | | 0.2 | ∞ | 0 |
| | | 0.3 | ∞ | 0 |
| Comparative Example 6 | 0 | 0 | 0 | 98 |
| | | 0.001 | 0 | 96 |
| | | 0.05 | 25 | 60 |
| | | 0.1 | 70 | 9 |
| | | 0.2 | 845 | 0 |
| | | 0.3 | ∞ | 0 |

Examples 55-56

X-Ray Diffraction Pattern Measurement of Re-Burned Surface

Figure 31:
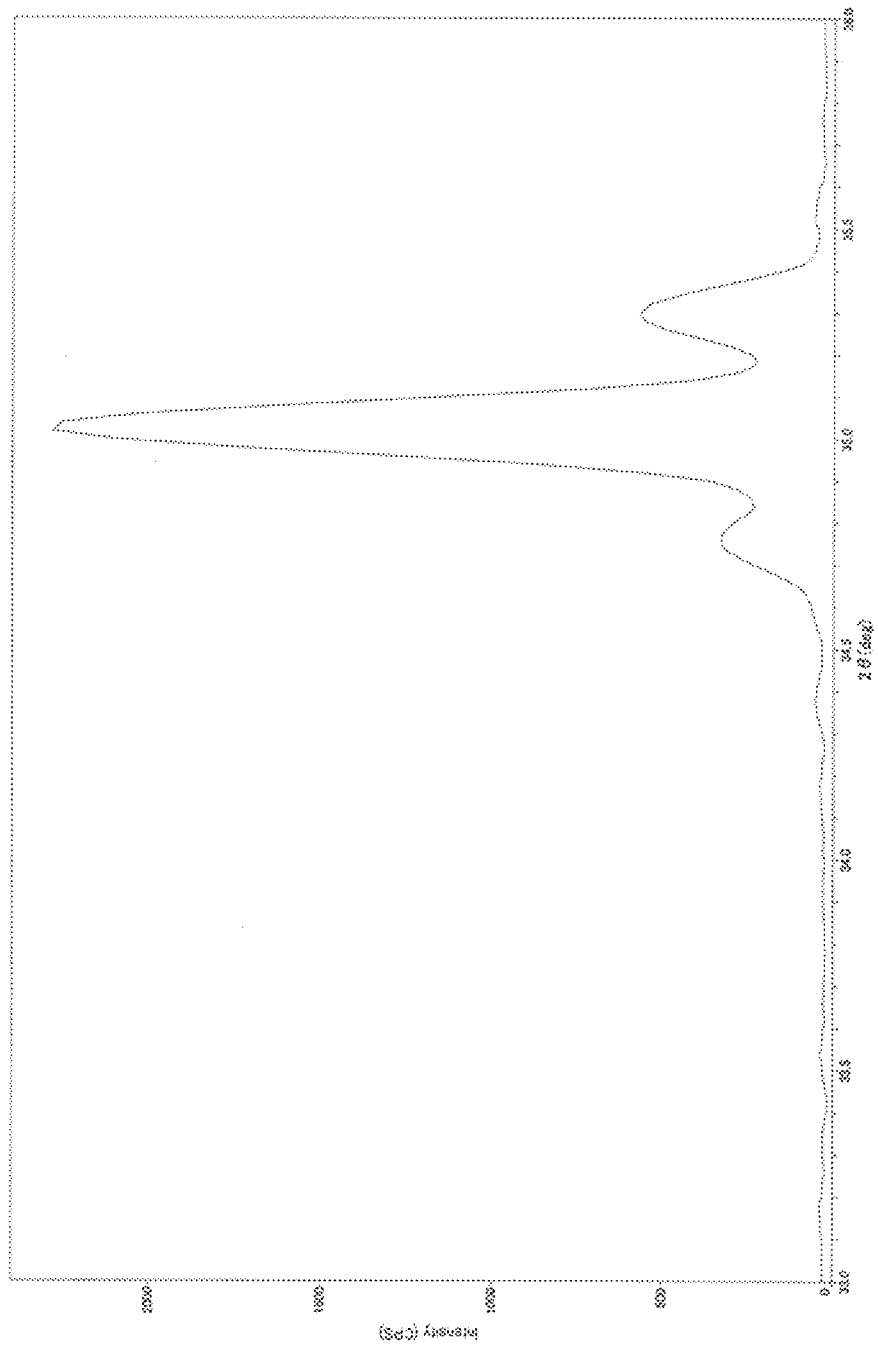
FIG. 31 is an X-ray diffraction pattern of a re-burned surface of a zirconia sintered body, which is ground in Example 41, of the present invention in Example 55.
Figure 32:
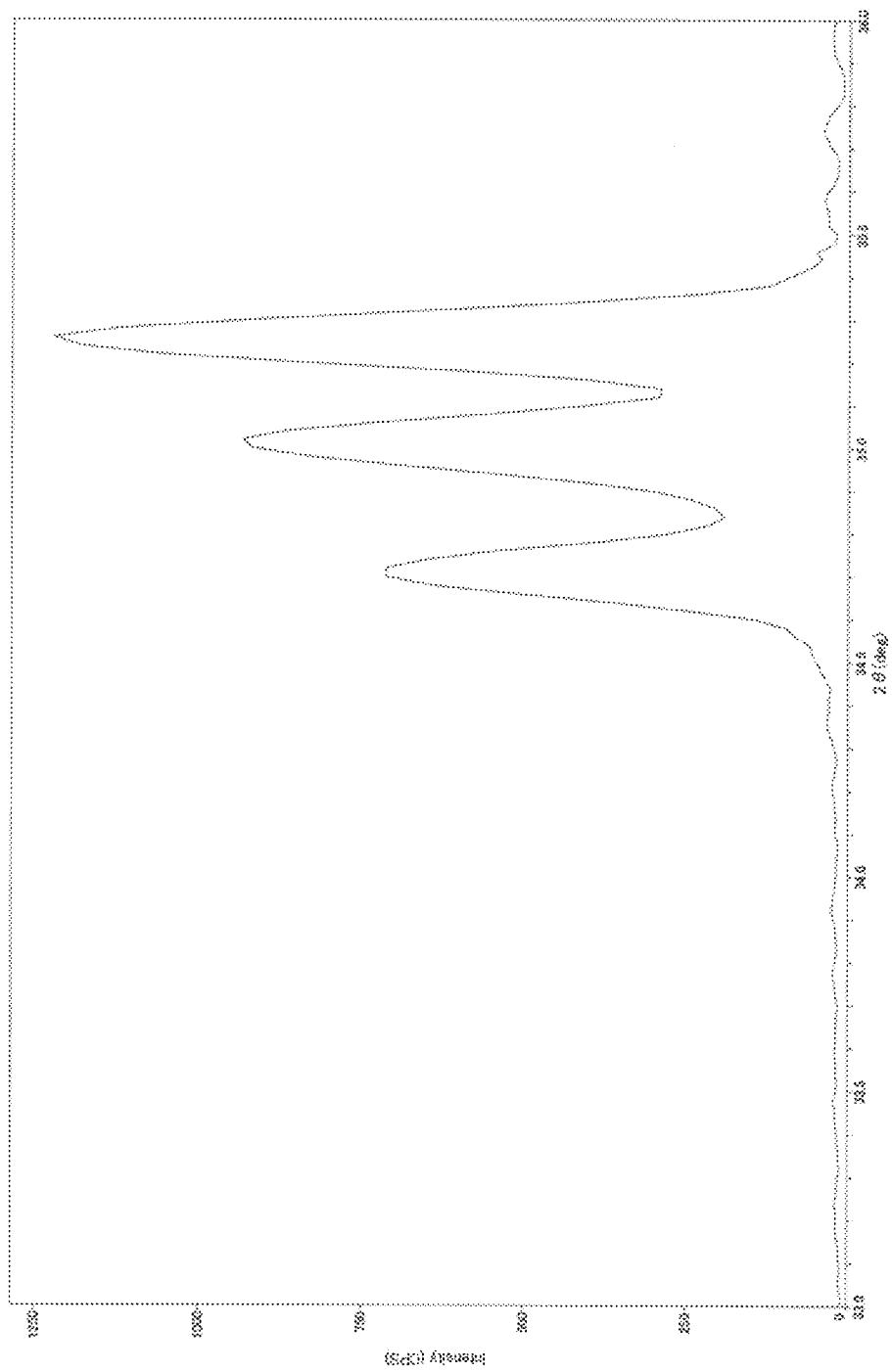
FIG. 32 is an X-ray diffraction pattern of a re-burned surface of a zirconia sintered body, which is ground in Comparative Example 42, of the present invention in Example 56.
Figure 33:
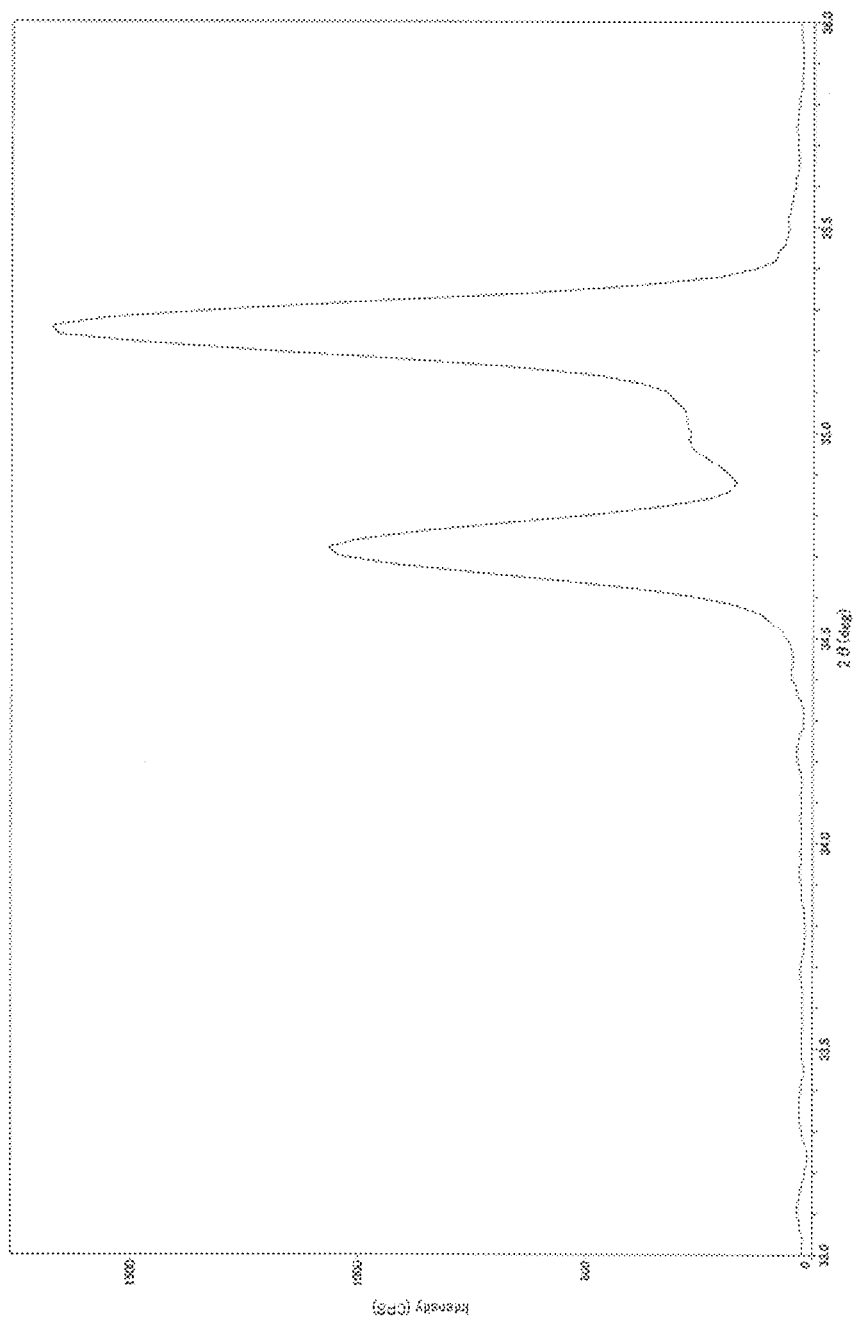
FIG. 33 is an X-ray diffraction pattern of a re-burned surface of a zirconia sintered body, which is ground in Comparative Example 3, in Comparative Example 7.

The zirconia sintered bodies in which the interior were exposed by grinding the burned surfaces in Examples 41 to 42 and Comparative Example 3 were re-burned and then the X-ray diffraction pattern on the re-burned surface were measured. The ground sintered bodies were re-burned at the temperature of 1450 degrees Celsius for 1.5 hours. At the time of the re-burning, any treatment of applying the stabilizing agent to the ground surface of the sintered body was not performed. The X-ray diffraction patterns were measured with Cu-target at 50 kV and 50 mA using RINT-TTRIII (made by Rigaku Corporation). As Example 55, the X-ray diffraction pattern of the re-burned surface of the zirconia sintered body of the present invention which was ground in Example 41 is shown in FIG. 31. As Example 56, the X-ray diffraction pattern of the re-burned surface of the zirconia sintered body of the present invention which was ground in Comparative Example 42 is shown in FIG. 32. As Comparative Example 7, the X-ray diffraction pattern of the re-burned surface of the zirconia sintered body which was ground in Comparative Example 3 is shown in FIG. 33.

Although, as shown in FIGS. 19 and 21, in the sintered bodies before the re-burning, in which the burned surfaces were ground, that is, the interiors were exposed, the peak of the cubic system had not been confirmed, the peak of the cubic system was confirmed again by the re-burning. On the other hand, in the zirconia sintered body to which phosphorus and boron were not added, the peak of the cubic system was not confirmed even though the zirconia sintered body was re-burned. Therefore, in the zirconia sintered body of the present invention, even if the burned surface is ground and a surface in which the principle crystal system is the tetragonal system is exposed, the sintered body can be re-covered with a layer including a large amount of the cubic system by re-burning it without any especial treatment such as applying the stabilizing agent. This reason is considered to be due to a phenomenon that a part of the stabilizing agent(s) included in the sintered body is migrated to the exposed surface by adding phosphorus and boron. Accordingly, by re-burning the zirconia sintered body of the present invention processed to a desired shape, a product with high hydrothermal degradation-resistance can be manufactured.

Example 57

Composition Analysis of Re-Burned Surface

In order to confirm whether a migration of a stabilizing agent(s) occurs by the re-burning, in the same way as in Examples 48 to 49, the composition of the re-burned surface was analyzed by the XPS. The addition rates in the composition for sintering of the sample used for the measurement are shown in Table 23. The composition analysis was performed on the surface which was made by burning the composition for sintering shown in Table 23 at 1450 degrees Celsius for 1.5 hours to make the sintered body, grinding it with #400 of diamond grinding wheel and then grinding with #2000 of diamond paste, and on the re-burned surface in which the ground sintered body was re-burned at 1450 degrees Celsius for 1.5 hours. The measuring method of the XPS and the like are the same way as in Examples 48 to 49. Results of analysis are shown in Table 24. The values shown in Table 24 are of the same meaning as in Table 20. At the time of the re-burning, any treatment of applying the stabilizing agent to the ground surface of the sintered body was not performed.

When the composition of the ground surface is compared with the composition of the re-burned surface, in the same fashion as the relation between the burned surface and the interior in Examples 48 to 49, it was found that there are more yttria and silicon dioxide in the re-burned surface than in the ground surface. Therefore, also by the re-burning, it is presumed that yttria in the sintered body migrates to the vicinity of the exposed surface and the exposed surface is fully stabilized, that is, becomes the cubic crystal.

TABLE 23

| | Base/mass % | | Addition Rate to Base/% | | | |
|---|---|---|---|---|---|---|
| | $3YZrO_2$ | $Al_2O_3$ | $B_2O_3$ | P | $SiO_2$ | Binder |
| Example 57 | 100 | 0 | 0.2 | 0.2 | 0.2 | 6 |

TABLE 24

| | | Zr/ atomic % ($ZrO_2$/ mol %) | Y/ atomic % ($Y_2O_3$/ mol %) | P/ atomic % ($P_2O_5$/ mol %) | Si/ atomic % ($SiO_2$/ mol %) | B/ atomic % | O/ atomic % |
|---|---|---|---|---|---|---|---|
| Example 57 | Interior | 29.7 (97.3) | 1.7 (2.7) | No Detected | No Detected | Unmeasurable | 68.7 |
| | Re-burned Surface | 21.9 (76.5) | 6.1 (10.6) | No Detected | 3.7 (12.8) | Unmeasurable | 68.3 |

Examples 58-65

Making of Sintered Body in which Stabilizing Agent is Unevenly Dispersed

In order to increase the fracture toughness, the zirconia sintered bodies were made by adding boron and phosphorus and mixing the low-stabilized zirconia particles and the high-stabilized zirconia particles mentioned above so that the content of the stabilizing agent(s) was uneven, and then the flexural strength, the fracture toughness, the peak ratio of the cubic system and the peak ratio of the monoclinic system after the hydrothermal treatment were measured. Further, after applying the HIP treatment to the zirconia sintered body, the flexural strength and the fracture toughness were measured.

Figure 34:
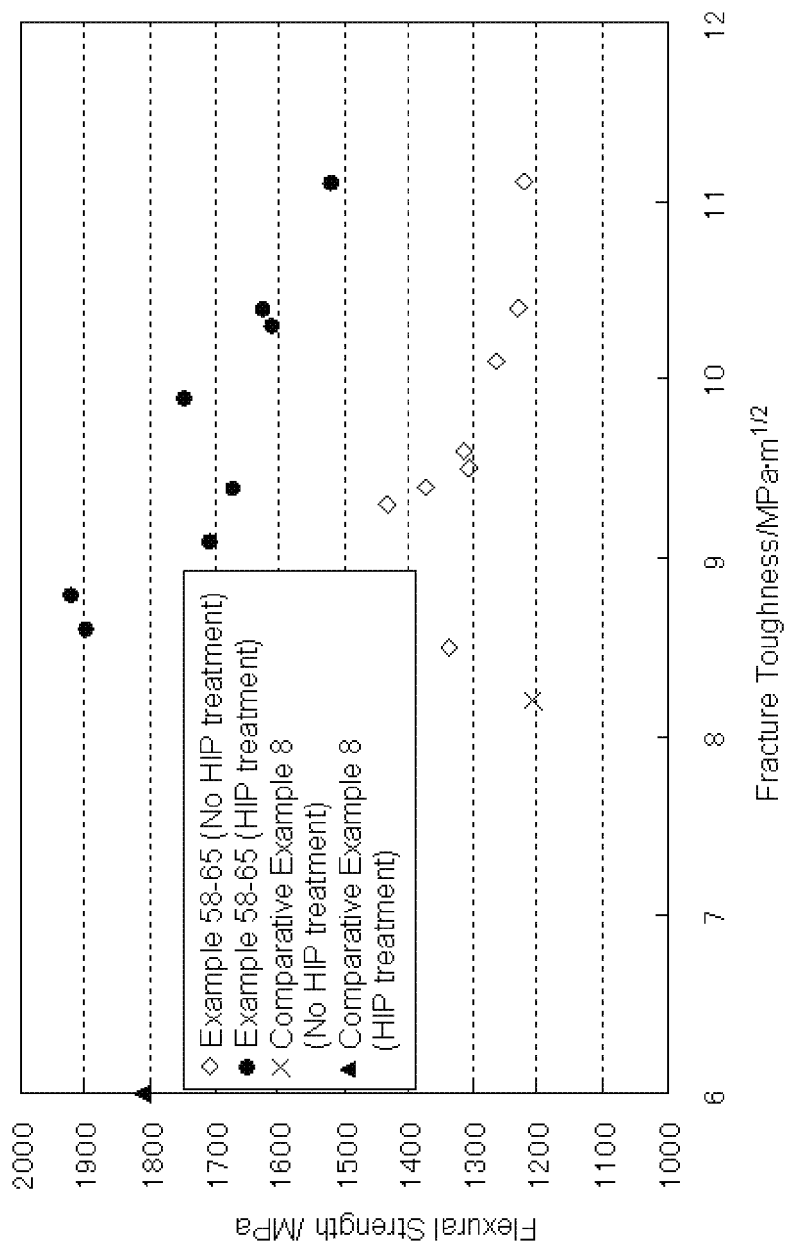
FIG. 34 is a graph that flexural strengths are plotted versus fracture toughness in Examples 58-65.

The compositions of the compositions for sintering of the zirconia sintered bodies used for the measurement are shown in Table 25. In the Examples which differ from the above Example, 1 mol % of zirconia ([1YZrO$_2$], shown in Table 25) was added 20% to the mass(weight) of the base as the low-stabilized zirconia particles. The zirconia sintered bodies were made by burning these compositions for sintering at 1450 degrees Celsius for 2 hours. As Comparative Example 8, the zirconia sintered body to which the low-stabilizing zirconia particles were added while boron and phosphorus were not added were also made. The measurement results of each zirconia sintered body are shown in Table 26. A graph in which the flexural strength to the fracture toughness is plotted is shown in FIG. 34. The measuring methods of the flexural strength, the fracture toughness, the peak ratio of the cubic system and the peak ratio of the monoclinic system after the hydrothermal treatment are the same way as in the above Examples. The HIP treatment was performed at a temperature of 1400 degrees Celsius and a pressure of 175 MPa.

Not only in Examples 58 to 65, but also in Comparative Example 8, the zirconia sintered body with high fracture toughness could be obtained by increasing variations in the contents of a stabilizing agent(s) by mixing the high-stabilized zirconia particles and low-stabilized zirconia particles. However, as shown in Examples 58 to 65, the zirconia sintered body with high flexural strength could be obtained by adding boron and phosphorus, and the flexural strength could be further enhanced by the HIP treatment. Therefore, both the flexural strength and the fracture toughness generally having a trade-off relation with each other could be enhanced. Concretely, the fracture toughness could be enhanced to be 8 MPa·m$^{1/2}$ to 12 MPa·m$^{1/2}$ and the flexural strength could be 1220 MPa or more in this range of the fracture toughness, while the flexural strength could be 1500 MPa or more when the HIP treatment was performed. In particular, the zirconia sintered body having the fracture toughness of 8 MPa·m$^{1/2}$ and less than 9 MPa·m$^{1/2}$ and the flexural strength of 1800 Mpa or more could be obtained. Further, the zirconia sintered body having the fracture toughness of 9 MPa·m$^{1/2}$ to 10 MPa·m$^{1/2}$ and the flexural strength of 1600 Mpa or more could be obtained.

TABLE 25

| | Base/mass % | | Addition Rate to Base/% | | | | |
|---|---|---|---|---|---|---|---|
| | 3YZrO$_2$ | Al$_2$O$_3$ | 1YZrO$_2$ | B$_2$O$_3$ | P | SiO$_2$ | Binder |
| Example 58 | 99.8 | 0.2 | 20 | 0.1 | 0.25 | 0.2 | 6 |
| Example 59 | 98.0 | 2.0 | 20 | 0.1 | 0.25 | 0.2 | 6 |
| Example 60 | 96.2 | 3.8 | 20 | 0.1 | 0.25 | 0.2 | 6 |
| Example 61 | 94.3 | 5.7 | 20 | 0.1 | 0.25 | 0.2 | 6 |
| Example 62 | 93.9 | 6.1 | 20 | 0.1 | 0.25 | 0.2 | 6 |
| Example 63 | 93.5 | 6.5 | 20 | 0.1 | 0.25 | 0.2 | 6 |
| Example 64 | 92.6 | 7.4 | 20 | 0.1 | 0.25 | 0.2 | 6 |
| Example 65 | 92.6 | 7.4 | 20 | 0.05 | 0.25 | 0.2 | 6 |
| Comparative Example 8 | 99.8 | 0.2 | 20 | 0 | 0 | 0.2 | 6 |

TABLE 26

| | Peak Ratio of Cubic System × 100 | Peak Ratio of Monoclinic System × 100 | No HIP Treatment | | HIP Treatment | |
|---|---|---|---|---|---|---|
| | | | Flexural Strength/ MPa | Fracture Toughness/ MPa·m$^{1/2}$ | Flexural Strength/ MPa | Fracture Toughness/ MPa·m$^{1/2}$ |
| Example 58 | 85 | 5 | 1221 | 11.1 | 1518 | 11.1 |
| Example 59 | 88 | 4 | 1232 | 10.4 | 1611 | 10.3 |
| Example 60 | 84 | 4 | 1265 | 10.1 | 1623 | 10.4 |
| Example 61 | 81 | 3 | 1313 | 9.6 | 1747 | 9.9 |
| Example 62 | 82 | 1 | 1374 | 9.4 | 1705 | 9.1 |
| Example 63 | 73 | 1 | 1307 | 9.5 | 1670 | 9.4 |
| Example 64 | 71 | 2 | 1431 | 9.3 | 1898 | 8.6 |
| Example 65 | 42 | 39 | 1338 | 8.5 | 1920 | 8.8 |
| Comparative Example 8 | 0 | 86 | 1209 | 8.2 | 1811 | 6.0 |

Examples 66-67

Test on Influence that Method of Forming Partially-Stabilized Zirconia Particle has on Fracture Toughness Whether the fracture toughness is changed according to a method of forming the partially-stabilized zirconia particle was tested. Table 27 shows test conditions and results. "Solid phase method" of Example 66 means the use of $Y_2O_3$-solid solution-$ZrO_2$ made by mixing zirconium oxide with yttrium oxide as the stabilizing agent by a solid phase method. "Liquid phase method" of Example 67 means the use of $Y_2O_3$-solid solution-$ZrO_2$ (made by Tosoh Corporation; Product Number TZ-3Y-E) formed by hydrolysis. In Examples 66 and 67, phosphoric acid was added so that the content rate of the element phosphorus was 0.4 mass % to the mass(weight) of the partially-stabilized zirconia. The measuring methods of the peak ratio and the fracture toughness are same as the above Example(s). As Comparative Examples 9-11, the tests were also performed on the sintered body to which phosphorus was not added. In Comparative Example 11, silicon dioxide was substantially not added, and the values of the table indicate the standard value of the content rates of the commercial product.

According to the liquid phase method of Example 67 and Comparative Examples 10 and 11, the values of the fracture toughness were about 4 MPa·m$^{1/2}$, whereas, according to the solid phase method of Example 66 and Comparative Example 9, the value could be 5 MPa·m$^{1/2}$ or more. According to the liquid phase method, however, the addition of phosphorus did not change the values of the fracture toughness, whereas, according to the solid phase method, Example 66 to which phosphorus was added had the higher value of the fracture toughness than Comparative Example 9 to which no phosphorus was added. Thereby, it is found that a combination of the phosphorus addition and the solid phase method can enhance the value of the fracture toughness as the synergistic effect. It is also found that the material formed by the solid phase method is suitable for the partially-stabilized zirconia particles used in the present invention. In the present Example, although boron was not added, it is considered that the same synergistic effect can be obtained by the addition of boron.

TABLE 27

| | Forming Method | Addition Rate of P/ mass % | Addition Rate of SiO2/ mass % | Peak Ratio × 100 | Fracture Toughness Value/ MPa·m$^{1/2}$ |
|---|---|---|---|---|---|
| Example 66 | Solid Phase Method | 0.4 | 0.1 | 0 | 6.4 |
| Example 67 | Liquid Phase Method | 0.4 | 0.1 | 0 | 4.1 |
| Comparative Example 9 | Solid Phase Method | 0 | 0.1 | 190 | 5.4 |
| Comparative Example 10 | Liquid Phase Method | 0 | 0.1 | 380 | 4.0 |
| Comparative Example 11 | Liquid Phase Method | 0 | ≤0.02 | 372 | 4.0 |

Examples 68-83

The content rates of boron and phosphorus in the zirconia sintered bodies made in Examples 25 to 32 were measured in order to confirm to what extent of boron and phosphorus which are added at the time of making the composition for sintering remains in the zirconia sintered body. The content rate measurement was performed on each sample having different content rates of boron and phosphorus. After dissolving each sample, the measurement was performed by using emission spectroscopic analyzer (SII NanoTechnology Inc.; Product Number SPS3500). The measurement was performed two times including pretreatment of the sample. The averages of measurement results of boron are shown in Table 28, and the averages of measurement results of phosphorus are shown in Table 29. "Addition rate" according to Tables 28 and 29 is the same value shown in Table 13, and it shows the addition rate to the total mass(weight) of the partially-stabilized zirconia and aluminum oxide in the composition for sintering. "Content rate" indicates a content rate in the zirconia sintered body (average of the values of two time measurements). Since the zirconia sintered body is mostly constructed from partially-stabilized zirconia and aluminum oxide, "Addition rate" and "Content rate" can be compared and contrasted. "Residual rate" is a ratio of "Content rate" to "Addition rate".

TABLE 28

| | Boron | | |
|---|---|---|---|
| | Addition Rate/mass % | Content Rate/mass % | Residual Rate/% |
| Example 68 | 0.01 | 0.001 | 10 |
| Example 69 | 0.05 | 0.01 | 20 |
| Example 70 | 0.1 | 0.04 | 40 |
| Example 71 | 0.2 | 0.12 | 60 |
| Example 72 | 0.3 | 0.18 | 60 |
| Example 73 | 0.4 | 0.29 | 73 |
| Example 74 | 0.5 | 0.31 | 62 |
| Example 75 | 1.0 | 0.85 | 85 |

TABLE 29

| | Phosphorus | | |
|---|---|---|---|
| | Addition Rate/mass % | Content Rate/mass % | Residual Rate/% |
| Example 76 | 0.01 | 0.005 | 50 |
| Example 77 | 0.05 | 0.04 | 80 |
| Example 78 | 0.1 | 0.08 | 80 |
| Example 79 | 0.2 | 0.18 | 90 |
| Example 80 | 0.3 | 0.28 | 93 |
| Example 81 | 0.4 | 0.38 | 95 |
| Example 82 | 0.5 | 0.46 | 92 |
| Example 83 | 1.0 | 0.94 | 94 |

In the sintering conditions in Examples 25 to 32, boron has a tendency to be apt to burn out. In particular, it is considered that the lower the additional rate becomes, the lower the residual rate of boron becomes, and thus, boron is apt to burn out (burn to dissipate). It is considered that even if boron burned out finally, due to the presence during the burning, it decreases a sintering temperature which causes the phase transition inhibitive effect. It is considered that due to the presence during the burning, boron contributes to the crystal growth of the aluminum oxide whisker. On the other hand, the burnout of phosphorus is observed, although this is not so great as that of boron, and, likewise as boron, the lower the addition rate of phosphorus becomes, the lower the residual rate of phosphorus becomes. In a case of phosphorus, it is considered that almost all of added phosphorus remains in the sintered body when the addition rate thereof is 0.2 mass % or more. Both boron and phosphorus contribute to the migration of the stabilizing agent(s) to the surface at the time of the burning, that is, it is considered that these contribute to the formation of the cubic system in the surface. It is possible that the residual rates of phosphorus and boron can be further increased according to sintering conditions (for example, maximum temperature, burning curve, burning atmosphere).

In the above description, when the molar number of the element phosphorous to 1 mol of zirconium oxide (molecular weight 123.22) is calculated, the content rate of zirconium oxide in the partially-stabilized zirconia powder including 3 mol % of a stabilizing agent(s) is set to a fixed value of 94.5 mass % (regardless of the content rate of other elements) giving consideration to the existence of the stabilizing agent(s) (yttrium oxide, for example) and other compounds.

In the above description, values indicating an upper limit and lower limit in a range shown by "to" or "-" are included in that range.

Although the zirconia sintered body of the prevent invention, and the composition for sintering and the calcined body of the zirconia sintered body are explained based on the above embodiments and Examples, the present invention is not limited to the above embodiments and Examples, and may include any modification, change and improvement to the embodiments and Examples based on the basic technical idea within the scope of the present invention (including each element in the claims, description and drawings). Within the scope of the present invention (including each element in the claims, description and drawings), various combinations, replacements or substitutions and selections of disclosed elements are available.

A further problem, object and embodiment of the present invention become clear from the entire disclosure of the present invention including the claims, description and drawings.

Examples of the modes of the present invention are shown below.

[Mode 1]
A zirconia sintered body,
wherein in an X-ray diffraction pattern in a burned surface, a first peak ratio is 0.4 or more, the first peak ratio being a ratio of a height of a peak existing near a position where a cubic [200] peak appears to a height of a peak existing near a position where a tetragonal [200] peak appears; and
in an X-ray diffraction pattern of a region having a depth of 100 μm or more from the burned surface, a second peak ratio is 0.3 or less, the second peak ratio being the ratio of the height of the peak existing near the position where the cubic [200] peak appears to the height of the peak existing near the position where the tetragonal [200] peak appears.

[Mode 2]
A zirconia sintered body,
wherein, when a burned surface or an exposed surface is ground so that a surface, in which a third peak ratio is 0.3 or less, is exposed and then burned again, in an X-ray diffraction pattern, the third peak ratio being a ratio of a height of a peak existing near a position where a cubic [200] peak appears to a height of a peak existing near a position where a tetragonal [200] peak appears,
in an X-ray diffraction pattern of a re-burned surface, a forth peak ratio is 0.4 or more, the forth peak ratio being the ratio of the height of the peak existing near the position where the cubic [200] peak appears to the height of the peak existing near the position where the tetragonal [200] peak appears.

[Mode 3]
The zirconia sintered body according to Mode 2,
wherein in an X-ray diffraction pattern of a region having a depth of 100 μm or more from said re-burned surface, a fifth peak ratio is 0.3 or less, the fifth peak ratio being a ratio of a height of a peak existing near the position where the cubic [200] peak appears to a height of a peak existing near the position where the tetragonal [200] peak appears.

[Mode 4]
A zirconia sintered body,
wherein a value of a fracture toughness measured in conformity with JISR1607 is 8 MPa·m$^{1/2}$ or more; and
a flexural strength measured in conformity with JISR1601 is 1200 MPa or more.

[Mode 5]
The zirconia sintered body according to Mode 4,
wherein the value of the fracture toughness measured in conformity with JISR1607 is 8 MPa·m$^{1/2}$ or more and less than 9 MPa·m$^{1/2}$; and
the flexural strength measured in conformity with JISR1601 is 1700 MPa or more.

[Mode 6]
The zirconia sintered body according to Mode 4,
wherein the value of the fracture toughness measured in conformity with JISR1607 is 9 MPa·m$^{1/2}$ or more and less than 10 MPa·m$^{1/2}$; and
the flexural strength measured in conformity with JISR1601 is 1600 MPa or more.

[Mode 7]
The zirconia sintered body according to Mode 4,
wherein the value of the fracture toughness measured in conformity with JISR1607 is 10 MPa·m$^{1/2}$ or more and less than 12 MPa·m$^{1/2}$; and
the flexural strength measured in conformity with JISR1601 is 1200 MPa or more.

[Mode 8]
A zirconia sintered body, comprising:
partially-stabilized zirconia as a matrix phase;
wherein the zirconia sintered body includes 0.001 mass % to 1 mass % of element phosphorus (P) to the mass(weight) of the zirconia sintered body; and
the zirconia sintered body includes $3\times10^{-4}$ mass % to $3\times10^{-1}$ mass % of element boron (B) to the mass(weight) of the zirconia sintered body.

[Mode 9]
A zirconia sintered body, comprising at least two of characteristics among:
a characteristic of mode 1 or 2;
a characteristic of mode 3 or 4;
a characteristic of any one of modes 5-7; and
a characteristic of mode 8.

[Mode 10]
The zirconia sintered body according to any one of modes 1-9,
wherein when a low-temperature degradation acceleration test is applied to the zirconia sintered body at a temperature of 180 degrees Celsius and a pressure of 1 MPa for 5 hours,
in an X-ray diffraction pattern of a surface of the zirconia sintered body after said low-temperature degradation acceleration test, a sixth peak ratio is 1 or less, the sixth peak ratio being a ratio of a height of a peak existing near a position where a monoclinic [11-1] peak appears to a height of a peak existing near a position where a tetragonal [111] peak appears.

[Mode 11]
The zirconia sintered body according to any one of modes 1-10, comprising:
partially-stabilized zirconia including a stabilizing agent(s), as a matrix phase; wherein
the zirconia sintered body has a region in which a content rate of said stabilizing agent(s) decreases from a burned surface side toward an interior side.

[Mode 12]

The zirconia sintered body according to mode 11, wherein a concentration gradient of said stabilizing agent(s) occurs by the burning.

[Mode 13]

The zirconia sintered body according to any one of modes 1-12, comprising:
partially-stabilized zirconia including a stabilizing agent(s), as a matrix phase;
wherein in a sample surface of the zirconia sintered body, when a region of 10 μm×10 μm is partitioned into a grid pattern of 256×256 squares, and a content of said stabilizing agent(s) in each square in which, expressed as a mass %, a standard deviation of a surface content of said stabilizing agent(s) is 0.8 or more.

[Mode 14]

The zirconia sintered body according to any one of modes 1-13, including 0.2 mass % to 25 mass % of aluminum oxide to the mass(weight) of the zirconia sintered body.

[Mode 15]

The zirconia sintered body according to any one of modes 1-14, further including 0.03 mass % to 3 mass % of silicon dioxide to the mass(weight) of the zirconia sintered body.

[Mode 16]

The zirconia sintered body according to any one of modes 1-15, wherein the zirconia sintered body is sintered at a temperature ranging from 1350 degrees Celsius to 1550 degrees Celsius.

[Mode 17]

A composition for sintering of a zirconia sintered body, including:
a partially-stabilized zirconia powder including a stabilizing agent(s);
$4\times10^{-5}$ mol to $5\times10^{-2}$ mol of element phosphorus (P) to 1 mol of zirconium oxide (IV); and
$4\times10^{-5}$ mol to $5\times10^{-2}$ mol of element boron (B) to 1 mol of zirconium oxide (IV).

[Mode 18]

The composition for sintering of the zirconia sintered body according to mode 17, including 0 mol to 0.2 mol of aluminum oxide to 1 mol of zirconium oxide (IV).

[Mode 19]

The composition for sintering of the zirconia sintered body according to mode 17 or 18, including $7\times10^{-4}$ mol to $7\times10^{-2}$ mol of silicon dioxide to 1 mol of zirconium oxide (IV).

[Mode 20]

The composition for sintering of the zirconia sintered body according to any one of modes 17-19, including:
low-stabilized zirconia particles including a stabilizing agent(s) or not; and
high-stabilized zirconia particles which include the stabilizing agent(s) more than said low-stabilized zirconia particles;
wherein a content rate of the stabilizing agent(s) in said high-stabilized zirconia particles to the total molar number of zirconia [sic. zirconium] oxide and the stabilized agent(s) is by 1 mol % to 6 mol % higher than a content rate of the stabilizing agent(s) in said low-stabilized zirconia particles to the total molar number of zirconium oxide and the stabilized agent(s).

[Mode 21]

The composition for sintering of the zirconia sintered body according to mode 20,
wherein the content rate of the stabilizing agent(s) in said low-stabilized zirconia particles is 0 mol % or more and less than 2 mol % to the total molar number of zirconium oxide and the stabilizing agent(s); and
the content rate of the stabilizing agent(s) in said high-stabilized zirconia particles is 2 mol % or more and less than 8 mol % to the total molar number of zirconium oxide and the stabilizing agent(s).

[Mode 22]

A composition for sintering of a zirconia sintered body, wherein
the composition is turned to the zirconia sintered body of any one of modes 1-16 by being sintered at a temperature ranging from 1350 degrees Celsius to 1550 degrees Celsius.

[Mode 23]

The composition for sintering of the zirconia sintered body according to any one of modes 17-21, becoming the zirconia sintered body of any one of modes 1-16 by sintering the composition at a temperature ranging from 1350 degrees Celsius to 1550 degrees Celsius.

[Mode 24]

A calcined body of a zirconia sintered body including:
zirconia including: a stabilizing agent(s);
$4\times10^{-5}$ mol to $5\times10^{-2}$ mol of element phosphorus (P) to 1 mol of zirconium oxide (IV); and
$4\times10^{-5}$ mol to $5\times10^{-2}$ mol of element boron (B) to 1 mol of zirconium oxide (IV).

[Mode 25]

The calcined body of the zirconia sintered body according to mode 24, including 0 mol to 0.2 mol of aluminum oxide to 1 mol of zirconium oxide (IV).

[Mode 26]

The calcined body of the zirconia sintered body according to mode 24 or 25, including $7\times10^{-4}$ mol to $7\times10^{-2}$ mol of silicon dioxide to 1 mol of zirconium oxide (IV).

[Mode 27]

The calcined body of the zirconia sintered body according to any one of modes 24-26, including:
low-stabilized zirconia particles including a stabilizing agent(s) or not; and
high-stabilized zirconia particles which include the stabilizing agent (s) more than said low-stabilized zirconia particles;
wherein a content rate of the stabilizing agent(s) in said high-stabilized zirconia particles to the total molar number of zirconia [sic. zirconium] oxide and the stabilized agent(s) is higher than a content rate of the stabilizing agent(s) in said low-stabilized zirconia particles to the total molar number of zirconium oxide and the stabilized agent(s) by 1 mol % to 6 mol %.

[Mode 28]

The calcined body of the zirconia sintered body according to mode 27,
wherein the content rate of the stabilizing agent(s) in said low-stabilized zirconia particles is 0 mol % or more and less than 2 mol % to the total molar number of zirconium oxide and the stabilizing agent(s); and
the content rate of the stabilizing agent(s) in said high-stabilized zirconia particles is 2 mol % or more and less than 8 mol % to the total molar number of zirconium oxide and the stabilizing agent(s).

[Mode 29]

A calcined body of a zirconia sintered body, wherein
the calcined body is turned to the zirconia sintered body according to any one of modes 1-16 by being sintered at a temperature ranging from 1350 degrees Celsius to 1550 degrees Celsius.

[Mode 30]

The calcined body of the zirconia sintered body according to any one of modes 24-28, wherein the calcined body is turned to the zirconia sintered body according to any one of modes 1-16 by being sintered at a temperature ranging from 1350 degrees Celsius to 1550 degrees Celsius.

[Mode 31]

A calcined body of a zirconia sintered body, wherein
the calcined body is formed by calcining the composition for sintering according to any one of modes 17-23 at a temperature ranging from 800 degrees Celsius to 1200 degrees Celsius.

The zirconia sintered body of the present invention is applicable to various uses for dental materials such as prosthesis, connectors for optical fibers such as a ferrule and sleeve, various tools (crusher balls, grinding tools, for example), various parts (screws, bolts and nuts, for example), various sensors, elements for electronics, accessories (straps for watch, for example), for example, based on advantages of high strength, high toughness, long durable life, high reliability, little change in size, colorlessness/semi-transparency, for example.

The invention claimed is:

1. A zirconia sintered body,
wherein, when a burned surface or an exposed surface is ground so that a surface, in which a first peak ratio is 0.3 or less, is exposed and then burned again, in an X-ray diffraction pattern, the first peak ratio being a ratio of a height of a peak existing near a position where a cubic [200] peak appears to a height of a peak existing near a position where a tetragonal [200] peak appears,
in an X-ray diffraction pattern of a re-burned surface, a second peak ratio is 0.4 or more, the second peak ratio being the ratio of the height of the peak existing near the position where the cubic [200] peak appears to the height of the peak existing near the position where the tetragonal [200] peak appears.

2. A zirconia sintered body according to claim 1, comprising:
partially-stabilized zirconia as a matrix phase;
wherein the zirconia sintered body includes 0.001 mass % to 1 mass % of element phosphorus (P) to a mass (weight) of the zirconia sintered body; and
the zirconia sintered body includes $3 \times 10^{-4}$ mass % to $3 \times 10^{-1}$ mass % of element boron (B) to a mass(weight) of the zirconia sintered body.

3. The zirconia sintered body according to claim 1,
wherein when a low-temperature degradation acceleration test is applied to the zirconia sintered body at a temperature of 180 degrees Celsius and a pressure of 1 MPa for 5 hours,
in an X-ray diffraction pattern of a surface of the zirconia sintered body after said low-temperature degradation acceleration test, a third peak ratio is 1 or less, the third peak ratio being a ratio of a height of a peak existing near a position where a monoclinic [11-1] peak appears to a height of a peak existing near a position where a tetragonal [111] peak appears.

4. The zirconia sintered body according to claim 1,
wherein in an X-ray diffraction pattern in the burned surface, a fourth peak ratio is 0.4 or more, the fourth peak ratio being a ratio of a height of a peak existing near the position where the cubic [200] peak appears to a height of a peak existing near the position where the tetragonal [200] peak appears; and
in an X-ray diffraction pattern of a region having a depth of 100 μm or more from the burned surface, a fifth peak ratio is 0.3 or less, the fifth peak ratio being the ratio of the height of the peak existing near the position where the cubic [200] peak appears to the height of the peak existing near the position where the tetragonal [200] peak appears.

5. The zirconia sintered body according to claim 1,
wherein in an X-ray diffraction pattern of a region having a depth of 100 μm or more from said re-burned surface, a sixth peak ratio is 0.3 or less, the sixth peak ratio being a ratio of a height of a peak existing near the position where the cubic [200] peak appears to a height of a peak existing near the position where the tetragonal [200] peak appears.

6. The zirconia sintered body according to claim 1,
wherein a value of a fracture toughness measured in conformity with JISR1607 is 8 MPa·m½ or more; and
a flexural strength measured in conformity with JISR1601 is 1200 MPa or more.

7. The zirconia sintered body according to claim 1,
wherein a value of a fracture toughness measured in conformity with JISR1607 is 8 MPa·m$^{1/2}$ or more and less than 9 MPa·m$^{1/2}$; and
a flexural strength measured in conformity with JISR1601 is 1700 MPa or more.

8. The zirconia sintered body according to claim 1,
wherein a value of a fracture toughness measured in conformity with JISR1607 is 9 MPa·m$^{1/2}$ or more and less than 10 MPa·m$^{1/2}$; and
a flexural strength measured in conformity with JISR1601 is 1600 MPa or more.

9. The zirconia sintered body according to claim 1,
wherein a value of a fracture toughness measured in conformity with JISR1607 is 10 MPa·m$^{1/2}$ or more and less than 12 MPa·m$^{1/2}$; and
a flexural strength measured in conformity with JISR1601 is 1200 MPa or more.

10. The zirconia sintered body according to claim 1, comprising:
partially-stabilized zirconia including a stabilizing agent(s), as a matrix phase; wherein
the zirconia sintered body has a burned surface and an interior and further has a region in which a content ratio of said stabilizing agent(s) decreases from the burned surface toward the interior.

11. The zirconia sintered body according to claim 1, comprising 0.2 mass % to 25 mass % of aluminum oxide to the mass(weight) of the zirconia sintered body.

12. The zirconia sintered body according to claim 1, further comprising 0.03 mass % to 3 mass % of silicon dioxide to the mass(weight) of the zirconia sintered body.

13. The zirconia sintered body according to claim 1, wherein the zirconia sintered body is sintered at a temperature ranging from 1350 degrees Celsius to 1550 degrees Celsius.

14. A composition for sintering of a zirconia sintered body, comprising:
a partially-stabilized zirconia powder including a stabilizing agent(s);
$4 \times 10^{-5}$ mol to $5 \times 10^{-2}$ mol of element phosphorus (P) to 1 mol of zirconium oxide (IV); and
$4 \times 10^{-5}$ mol to $5 \times 10^{-2}$ mol of element boron (B) to 1 mol of zirconium oxide (IV).

15. The composition for sintering of the zirconia sintered body according to claim 14, comprising 0 mol to 0.2 mol of aluminum oxide to 1 mol of zirconium oxide (IV).

16. The composition for sintering of the zirconia sintered body according to claim 14, comprising $7 \times 10^{-4}$ mol to $7 \times 10^{-2}$ mol of silicon dioxide to 1 mol of zirconium oxide (IV).

17. A calcined zirconia body comprising:
zirconia including a stabilizing agent(s);
$4\times10^{-5}$ mol to $5\times10^{-2}$ mol of element phosphorus (P) to 1 mol of zirconium oxide (IV); and
$4\times10^{-5}$ mol to $5\times10^{-2}$ mol of element boron (B) to 1 mol of zirconium oxide (IV).

18. The calcined zirconia body according to claim 17, comprising 0 mol to 0.2 mol of aluminum oxide to 1 mol of zirconium oxide (IV).

19. The calcined zirconia body according to claim 17, comprising $7\times10^{-4}$ mol to $7\times10^{-2}$ mol of silicon dioxide to 1 mol of zirconium oxide (IV).

20. A calcined zirconia body, wherein
the calcined zirconia body is formed by calcining the composition for sintering according to claim 14 at a temperature ranging from 800 degrees Celsius to 1200 degrees Celsius.

* * * * *